United States Patent
Kajiwara

(10) Patent No.: US 10,721,401 B2
(45) Date of Patent: Jul. 21, 2020

(54) INPUT APPARATUS, INPUT METHOD OF INPUT APPARATUS, AND OUTPUT APPARATUS

(71) Applicant: Yasuhiro Kajiwara, Kanagawa (JP)

(72) Inventor: Yasuhiro Kajiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/354,714

(22) Filed: Mar. 15, 2019

(65) Prior Publication Data

US 2019/0306419 A1  Oct. 3, 2019

(30) Foreign Application Priority Data

Mar. 29, 2018  (JP) ................. 2018-066142

(51) Int. Cl.
  *H04N 5/232*  (2006.01)
  *G06K 9/00*  (2006.01)
  *H04N 13/117*  (2018.01)

(52) U.S. Cl.
  CPC ..... *H04N 5/23238* (2013.01); *G06K 9/00671* (2013.01); *H04N 5/23229* (2013.01); *H04N 13/117* (2018.05)

(58) Field of Classification Search
  CPC .......... H04N 5/23238; H04N 5/23229; H04N 13/117; H04N 5/2251; H04N 5/232; G06K 9/00671; G06K 9/00
  See application file for complete search history.

(56) References Cited

U.S. PATENT DOCUMENTS

| | | | |
|---|---|---|---|
| 2003/0058283 A1* | 3/2003 | Larsen ................... | G09B 9/003 715/810 |
| 2013/0229413 A1* | 9/2013 | Geggie ................... | G06T 11/60 345/420 |
| 2014/0184821 A1* | 7/2014 | Taneichi ............ | H04N 1/00217 348/207.1 |
| 2015/0203036 A1 | 7/2015 | Kajiwara | |
| 2016/0335332 A1* | 11/2016 | Pimento .................. | H04N 1/00 |

FOREIGN PATENT DOCUMENTS

| | | |
|---|---|---|
| JP | 2018-013877 | 1/2018 |
| JP | 2018-013878 | 1/2018 |

* cited by examiner

*Primary Examiner* — Xilin Guo
(74) *Attorney, Agent, or Firm* — Oblon, McClelland, Maier & Neustadt, L.L.P.

(57) ABSTRACT

An input apparatus for inputting a diagnosis result of a diagnosis target detectable for a structure includes circuitry configured to display a spherical image captured for the structure on a screen, receive an input of a position of the diagnosis target in the spherical image, store position information indicating the received position of the diagnosis target in the spherical image in a memory, display, on the screen, the spherical image and a diagnosis information input field used for inputting diagnosis information of the diagnosis target, receive an input of the diagnosis information of the to diagnosis target input via the diagnosis information input field, and store the diagnosis information and the position information indicating the received position of the diagnosis target in the spherical image, in the memory in association with each other.

14 Claims, 39 Drawing Sheets

FIG. 3A
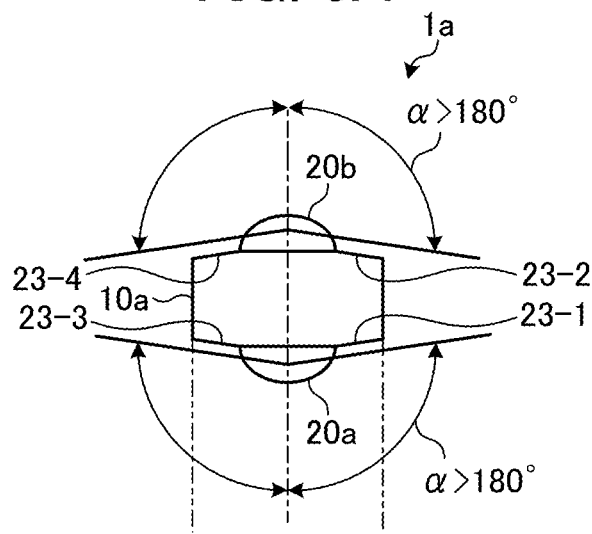
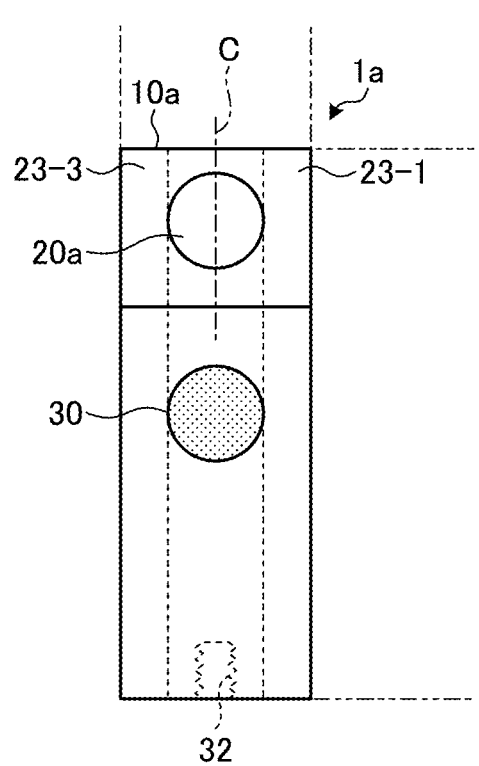
FIG. 3B
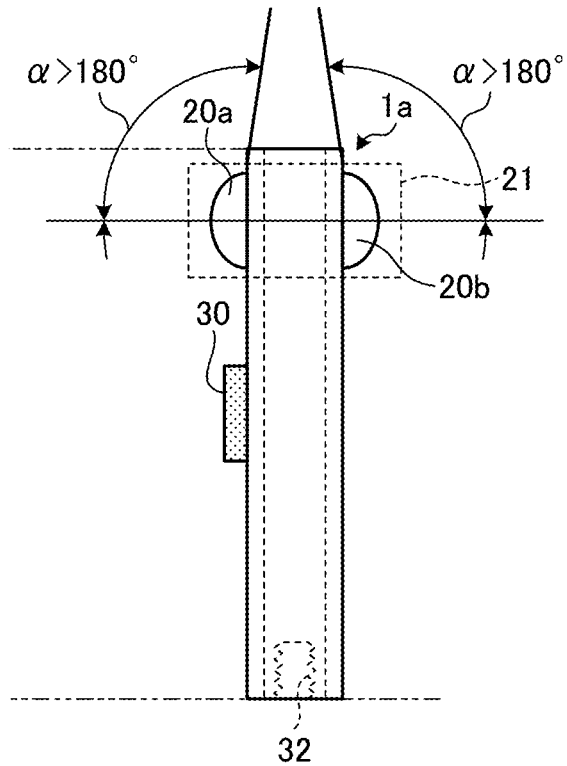
FIG. 3C

| FIG. 16 | FIG. 16A |
|---|---|
|  | FIG. 16B |

FIG. 25

| DIAGNOSIS RESULT REPORT | | | INSPECTION DATE: 2018/2/20 | | INSPECTOR NAME: JOHN SMITH | |
|---|---|---|---|---|---|---|
| No | ROOM NAME | DIAGNOSIS TARGET | FIELD PHOTOGRAPH | CONTENTS | NECESSITY OF ACTION | REMARKS |
| 1 | BUILDING "A" 2F, LOBBY | EXIST SIGN |  | FOUND SMOKED MARK | REPLACE REQUIRED | |
| 2 | BUILDING "A" 2F, LOBBY | WALL FACE |  | FOUND CRACK HAVING 30-cm LENGTH AND 2-mm WIDTH | REPAIR REQUIRED | |

INPUT APPARATUS, INPUT METHOD OF INPUT APPARATUS, AND OUTPUT APPARATUS

CROSS-REFERENCE TO RELATED APPLICATION

This application claims priority pursuant to 35 U.S.C. § 119(a) to Japanese Patent Application No. 2018-066142, filed on Mar. 29, 2018 in the Japan Patent Office, the disclosure of which is incorporated by reference herein in its entirety.

BACKGROUND

Technical Field

This disclosure relates to an input apparatus, an input method of an input apparatus, and an output apparatus.

Background Art

Field inspections and/or surveys at various sites, such as building structures, have become important issues. In particular, the field inspections and/or surveys are required in various cases, such as inspections for determining necessity of repairs, surveys for planning works on construction sites, surveys for renewal of equipment, and surveys for designing constructions. A technique of capturing a target object using an image capture apparatus when a survey is performed on a site and storing image data of the target object is known to save labor works of the inspection and sharing information of inspection services.

When an inspection is performed on a structure to detect some findings, such as crack, results of the inspection may be required to be reported as an inspection report. When the inspection report is to be created by a person, such as an inspector, the inspector can search position information associated with positions of findings on a three-dimensional space model. However, since a task of associating the position information of findings on the three-dimensional space model with the information of findings is performed manually, the report creation work becomes a complicated work, and thereby a longer period of time is required to create the report.

SUMMARY

As one aspect of the present invention, an input apparatus for inputting a diagnosis result of a diagnosis target detectable for a structure is devised. The input apparatus includes circuitry configured to display a spherical image captured for the structure on a screen, receive an input of a position of the diagnosis target in the spherical image, store position information indicating the received position of the diagnosis target in the spherical image in a memory, display, on the screen, the spherical image and a diagnosis information input field used for inputting diagnosis information of the diagnosis target, receive an input of the diagnosis information of the diagnosis target input via the diagnosis information input field, and store the diagnosis information and the position information indicating the received position of the diagnosis target in the spherical image, in the memory in association with each other.

As another aspect of the present invention, a method of inputting a diagnosis result of a diagnosis target detectable for a structure is devised. The method includes displaying a spherical image captured for the structure on a screen, receiving an input of a position of the diagnosis target in the spherical image, storing position information indicating the received position in a memory, displaying, on the screen, the spherical image and a diagnosis information input field used for inputting diagnosis information of the diagnosis target, receiving an input of the diagnosis information of the diagnosis target input via the diagnosis information input field, and storing the diagnosis information and the position information in the memory in association with each other.

As another aspect of the present invention, an output apparatus for outputting a diagnosis result of a diagnosis target detectable for a structure is devised. The output apparatus includes circuitry configured to acquire position information indicating a position of the diagnosis target in a spherical image, captured for the structure, and diagnosis information including a diagnosis result of the diagnosis target stored in a memory in association with each other, from the memory, and output the acquired diagnosis information of the diagnosis target based on the position information associated with the diagnosis information.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 3A, 3B and 3C (FIG. 3) are schematic trihedral views (thee-sided views) of appearance of the image capture apparatus according to the first embodiment;

FIG. 25 is an example of report data according to the first embodiment;

Figure 1:
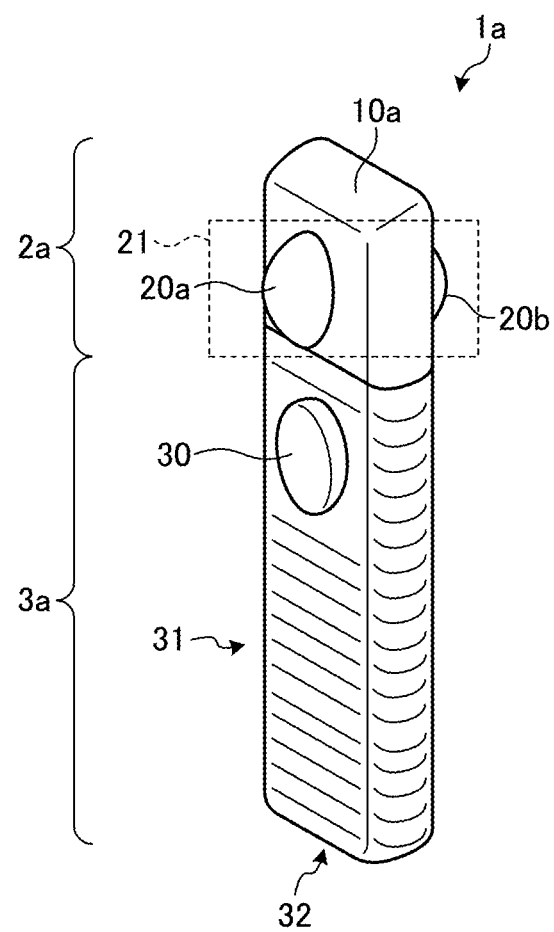
FIG. 1 is an example of an appearance view of an image capture apparatus of a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an input apparatus, an input method of an input apparatus, an output apparatus, and an output method of an output apparatus with reference to the accompanying drawings. In this disclosure, the input apparatus and the output apparatus are described as an example of information processing apparatuses, such as image data processing apparatuses, but not limited thereto.

First Embodiment

As to a first embodiment, a full view spherical image of a diagnosis target object can be captured using an image capture apparatus capable of capturing the full view spherical image, and an annotation can be input for the full view spherical image by designating a position of a target (e.g., diagnosis target) on the full view spherical image. The input annotation is stored in association with position information of the target on the full view spherical image.

By using the full view spherical image to capture an image of the diagnosis target, an image of diagnosis target can be captured completely without missing a part of the diagnosis target by performing a smaller number of image capturing operations. Further, since the annotation can be input by designating a position of the diagnosis target on the full view spherical image, the diagnosis target, input with the annotation, can be intuitively recognized, and thereby input errors can be reduced. Further, since the input annotation is stored in association with information of the position of the diagnosis target on the full view spherical image, the relationship between the annotation and the diagnosis target input with the annotation can be easily recognized, with which a burden of creating a report can be reduced. Therefore, the occurrence of human error when creating the report can be reduced.

The full view spherical image is an image captured with an angle of 360 degrees on orthogonal two planes (e.g., horizontal plane and vertical plane) and an angle of view of $4\pi$ steradians relative to an image capture position. Further, the annotation indicates information based on a result of observing and diagnosing the diagnosis target. The annotation can include one or more items defined in advance, and any comments for each type of diagnosis target. The annotation can further include image data. Further, in this disclosure, the spherical image does not have to be the full-view spherical image of a full 360 degrees in the horizontal direction and/or the vertical direction. For example, the spherical image may be a wide-angle view image having an angle of anywhere from 180 to any amount less than 360 degrees in the horizontal direction.

Image Capture Apparatus of First Embodiment:

FIG. 1 is an example of an appearance view of an image capture apparatus 1a of a first embodiment. As illustrated in FIG. 1, the image capture apparatus 1a includes, for example, a housing 10a having a substantially rectangular shape, and imaging lenses 20a and 20b, in which the imaging lens 20a is provided on a first surface of the housing 10a and the imaging lens 20b is provided on a second surface of the housing 10a, which is an opposite position corresponding to a position of the imaging lens 20a. The imaging lens can be also referred to as image capture lens, image-capturing lens, or image capture lens. Further, an image capture element corresponding to each of the imaging lenses 20a and 20b is provided in the housing 10a. Hereinafter, the imaging lenses 20a and 20b may be simply referred to as the imaging lens 20.

Light incident on the imaging lens 20a is irradiated onto the corresponding image capture element via an image-focusing optical system including the imaging lens 20a provided for the housing 10a, and light incident on the imaging lens 20b is irradiated onto the corresponding image capture element via an image-focusing optical system including the imaging lens 20b provided for the housing 10a, respectively. The image capture element employs, for example, a charge coupled device (CCD), which is a light receiving element that converts irradiated light into electric charges, but not limited thereto. For example, the image capture element can be a complementary metal oxide semiconductor (CMOS) image sensor.

Although details are to be described later, each drive unit for driving each of the image capture elements performs a shutter control for each of the image capture elements based on a trigger signal, and reads electric charges converted from the light, from each of the image capture elements. Each drive unit converts the electric charges received from each of the image capture elements into electrical signals, converts the electric signals into digital image data, and outputs the digital image data. The digital image data of each captured image output from each drive unit can be stored in, for example, a memory.

In the following description, a configuration including a pair of the imaging lens 20a and imaging lens 20b, and the image-focusing optical system and the image capture element corresponding to the set of imaging the imaging lens 20a and imaging lens 20b is to be described as an image capture unit 21. For example, an operation of outputting captured image data based on light incident on the imaging lenses 20a and 20b in accordance with the trigger signal will be described as an image capture operation by the image capture unit 21 for the convenience of description. If the imaging lenses 20a and 20b are required to be distinguished with each other, it is described, for example, that the imaging lens 20a performs the image capture operation.

The image capture apparatus 1a includes a shutter button 30, which is used for instructing an image capture operation by the image capture unit 21 in response to an operation to the shutter button 30. When the shutter button 30 is operated, the image capture operation using each of the imaging lenses 20a and 20b is performed in a synchronized manner in the image capture unit 21.

As illustrated in FIG. 1, the housing 10a of the image capture apparatus 1a includes, for example, an image capture portion 2a, in which the image capture unit 21 is disposed, and an operation portion 3a, in which the shutter button 30 is disposed. The operation portion 3a includes, for example, a grip portion 31 for holding the image capture apparatus 1a by a user. The grip portion 31 is formed so that its surface is less slippery so that the user can hold and manipulate the grip portion 31. Further, a fixing portion 32 for fixing the image capture apparatus 1a to a tripod or the like is provided on a bottom of the grip portion 31.

Figure 2:
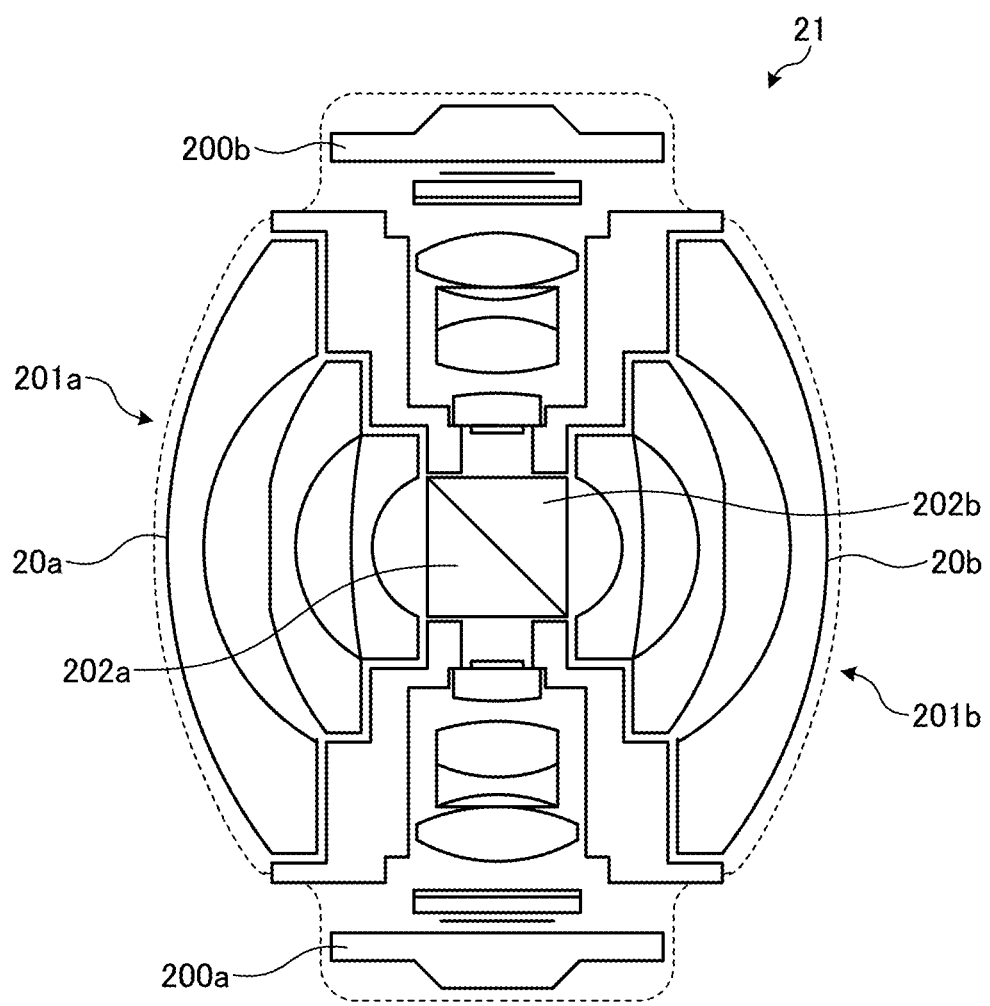
FIG. 2 illustrates an example of a structure of an image capture unit according to the first embodiment.

Hereinafter, a description is given of a structure of the image capture unit 21 with reference to FIG. 2. FIG. 2 illustrates an example of a structure of the image capture unit 21 according to the first embodiment. As illustrated in FIG. 2, the image capture unit 21 includes, for example, image-focusing optical systems 201a and 201b including the imaging lenses 20a and 20b, and image capture elements 200a and 200b using, for example, charged-coupled device (CCD) sensor or complementary metal-oxide-semiconductor (CMOS) sensor. Each of the image-focusing optical systems 201a and 201b is composed of, for example, seven fisheye lenses configuring six groups. The fisheye lens has an angle of view of 180 degrees (=360 (deg)/n, n is an optical coefficient that is equal to two), preferably greater than 180 degrees, more preferably 185 degrees or more, and further preferably 190 degrees or more.

Each of the image-focusing optical system 201a and 201b includes, for example, prisms 202a and 202b that change an optical path for 90 degrees, respectively. The seven fisheye lenses of six groups included in each of the image-focusing optical systems 201a and 201b can be divided into one group disposed at an entrance side of the prisms 202a and 202b, and another group disposed at an exit side of the prisms 202a and 202b (facing the image capture elements 200a and 200b). For example, in the image-focusing optical system 201a, light incident on the imaging lens 20a enters the prism 202a through each of the lenses belonging to the one group disposed at the incident side of the prism 202a. Then, the light that has entered the prism 202a changes the optical path for 90 degrees, and then irradiates the image capture element 200a through each lens, an aperture stop, and a filter belonging to another group disposed at the exit side of the prism 202a.

The optical elements (lenses, prisms 202a and 202b, filters and aperture stops) of the image-focusing optical systems 201a and 201b are disposed at given positions designed with respect to the image capture elements 200a and 200b. More specifically, positions of the optical elements are designed so that the optical axes of the optical elements of the image-focusing optical systems 201a and 201b are orthogonal to the center of the light receiving areas of the corresponding image capture elements 200a and 200b, and each of the light receiving areas becomes an imaging plane of the corresponding fisheye lens. In the image capture unit 21, the image-focusing optical systems 201a and 201b use the same design specifications, and the optical axes of the image-focusing optical systems 201a and 201b are matched with each other while the directions of the optical axes are opposite with each other.

FIGS. 3A, 3B and 3C (FIG. 3) are schematic trihedral views (thee-sided views) of appearance of the image capture apparatus 1a. FIGS. 3A, 3B and 3C respectively correspond to a top view, a front view, and a side view of the image capture apparatus 1a. As illustrated in FIG. 3C, the image capture unit 21 is configured by the imaging lens 20a and the imaging lens 20b that is disposed at a position, opposite to a position of the imaging lens 20a, which is the rear side of the imaging lens 20a.

In FIG. 3A and FIG. 3C, an angle "α" indicates an angle of view of the imaging lenses 20a and 20b, indicating an image capture range. As described above, each of the imaging lenses 21a and 20b included in the image capture unit 21 captures images using the angle "α" greater than 180 degrees as the angle of view. Therefore, in order to prevent inclusion of images of the housing 10a in each image captured by the imaging lenses 20a and 20b, as illustrated as surfaces 23-1, 23-2, 23-3, and 23-4 in FIGS. 3A, 3B and 3C, both sides with respect to the center line C of each of the imaging lenses 20a and 20b disposed on the first and second faces are chamfered in accordance with the angle of view of each imaging lenses 20a and 20b.

The center line C is a line which passes through the centers of the imaging lenses 20a and 20b in a vertical direction when the attitude of the image capture apparatus 1a is set so that the direction of the vertex (pole) of each hemispherical image captured by the image capture apparatus 1a is parallel to the vertical direction.

The image capture unit 21 uses a combination of the imaging lenses 20a and 20b to set an image capture range of a full view spherical image having a center aligned to the center of the imaging lenses 20a and 20b. That is, as described above, the imaging lenses 20a and 20b have an angle of 180 degrees or more, preferably greater than 180 degrees, and more preferably 185 degrees or more. Therefore, by combining the imaging lenses 20a and 20b, for example, an image capture range of a plane perpendicular to the first plane and an image capture range of a plane parallel to the first surface can be respectively set with 360 degrees, so that an image capture range of the full view spherical image can be implemented using the combination of the imaging lenses 20a and 20b.

Figure 4:
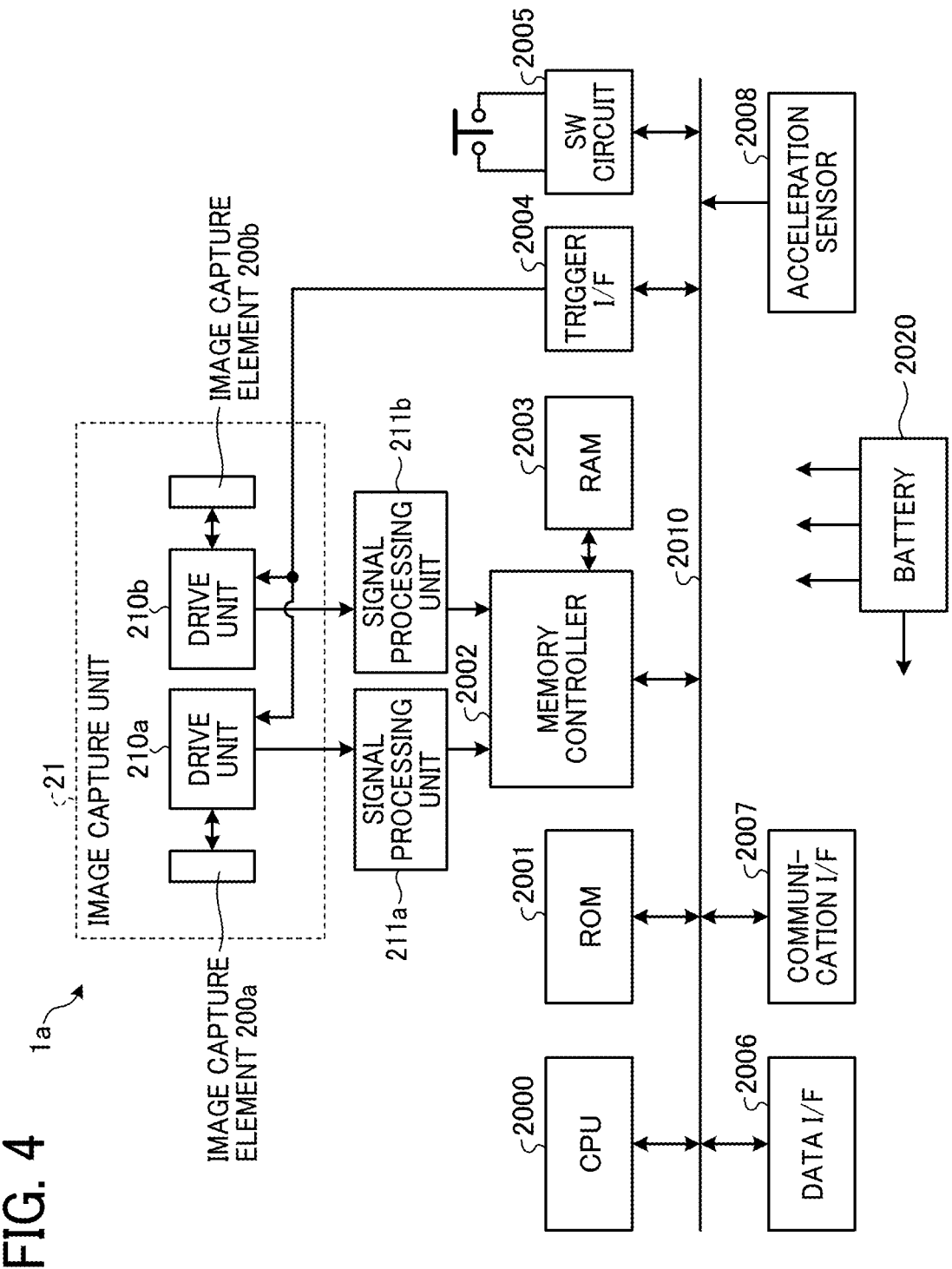
FIG. 4 is an example of a hardware block diagram of the image capture apparatus according to the first embodiment.

Configuration of Signal Processing of Image Capture Apparatus of First Embodiment:

FIG. 4 is an example of a hardware block diagram of the image capture apparatus 1a according to the first embodiment. In FIG. 4, portions corresponding to FIGS. 1 and 2 are denoted by the same reference numerals, and a detailed description thereof will be omitted.

As illustrated in FIG. 4, the image capture apparatus 1a includes, for example, the image capture unit 21 including the image capture elements 200a and 200b, drive units 210a and 210b, and signal processing units 211a and 211b as a configuration of an imaging system. Further, the image capture apparatus 1a includes, for example, a central processing unit (CPU) 2000, a read only memory (ROM) 2001, a memory controller 2002, a random access memory (RAM) 2003, a trigger interface (I/F) 2004, a switch (SW) circuit 2005, a data interface (I/F) 2006, and a communication interface (I/F) 2007, and an acceleration sensor 2008, which are connected to a bus 2010 as a configuration of an imaging control system and a signal processing system. Further, the image capture apparatus 1a includes, for example, a battery 2020 for supplying power to each of these components.

At first, a configuration of the imaging system is described. In the configuration of the imaging system, the image capture element 200a and the drive unit 210a are disposed for the imaging lens 20a. Similarly, the image capture element 200b and the drive unit 210b are disposed for to the imaging lens 20b. The image capture unit 21 includes the image capture element 200a and the drive unit 210a as one set, and the image capture element 200b and the drive unit 210b as another one set.

In the image capture unit 21, the drive unit 210a drives the image capture element 200a and receives electric charges from the image capture element 200a in accordance with a trigger signal supplied from the trigger I/F 2004. The drive unit 210a outputs a captured image of one frame based on the electric charges received from the image capture element 200a in accordance with one trigger signal. The drive unit 210a converts the electric charges received from the image capture element 200a into electrical signals and outputs the electric signals. The electric signals output from the drive unit 210a is supplied to the signal processing unit 211a. The signal processing unit 211a performs given signal processing, such as noise removal and gain adjustment for the electric signals supplied from the drive unit 210a, converts the electric signals of analog type into the electric signals of digital type, and outputs the digital signals as digital data of the captured image. The captured image is a hemispherical image (fish eye image), in which the hemisphere region corresponding to the angle of view of the imaging lens 20a is captured as a part of the full view spherical image.

In the image capture unit 21, the image capture element 210b and the drive unit 210b have functions similar to those of the image capture element 200a and the drive unit 210a, and thereby the description thereof is omitted. Further, since the signal processing unit 211b has the same function as that of the signal processing unit 211a described above, the description thereof is omitted.

Each hemispherical image output from each of the signal processing units 211a and 211b is stored in the RAM 2003 under the control of the memory controller 2002.

Hereinafter, a description is given of a configuration of the imaging control system and the signal processing system. The CPU 2000 executes one or more programs stored in the ROM 2001 in advance using a part of a storage area of the RAM 2003 as a working memory to control the overall operation of the image capture apparatus 1a. The memory controller 2002 controls data storage and reading to and from the RAM 2003 in accordance with instruction of the CPU 2000.

The SW circuit 2005 detects an operation on the shutter button 30 and transfers a detection result to the CPU 2000. When the CPU 2000 receives the detection result indicating that the operation to the shutter button 30 is detected from the SW circuit 2005, the CPU 2000 outputs a trigger signal. The trigger signal is output via the trigger I/F 2004, and then supplied to each of the drive units 210a and 210b.

The data I/F 2006 is an interface that is used for performing data communication with an external device. As to the data I/F 2006, for example, universal serial bus (USB) or Bluetooth (registered trademark) can be applied. The communication I/F 2007 is connected to a network, and controls communication with the network. The network connected to the communication I/F 2007 can be any one of wired network and wireless network or can be a combination of wired network and wireless network.

In the above description, the CPU 2000 outputs the trigger signal in accordance with the detection result of the SW circuit 2005, but not limited thereto. For example, the CPU 2000 can be configured to output the trigger signal in accordance with a signal supplied via the data I/F 2006 and the communication I/F 2007. Further, the trigger I/F 2004 can be configured to generate the trigger signal in accordance with the detection result of the SW circuit 2005 and to supply the trigger signal to each of the drive units 210a and 210b.

The acceleration sensor 2008 detects acceleration component in the three axes and transfers a detection result to the CPU 2000. The CPU 2000 detects the vertical direction based on the detection result of the acceleration sensor 2008 and calculates an inclination of the image capture apparatus 1a in the vertical direction. The CPU 2000 adds the inclination information indicating the inclination of the image capture apparatus 1a for each hemispherical image, captured by the imaging lenses 20a and 20b in the image capture unit 21 and stored in the RAM 2003.

The battery 2020 is, for example, a secondary battery, such as a lithium ion secondary battery, and is a power supply unit for supplying electric power to each part of the image capture apparatus 1a that needs to be supplied with power. The battery 2020 includes, for example, a charge/discharge control circuit for controlling charge and discharge to and from the second battery.

Figure 5:
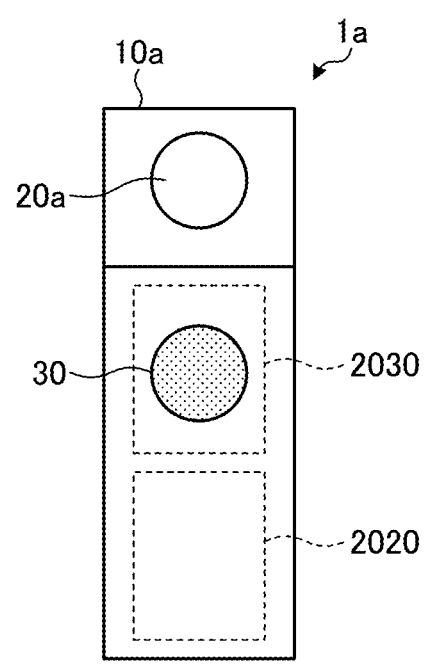
FIG. 5 is an example of a diagram illustrating an arrangement of a battery and a circuit unit in the image capture apparatus according to the first embodiment.

FIG. 5 is an example of a diagram illustrating an arrangement of the battery 2020 and a circuit unit 2030 in the image capture apparatus 1a according to the first embodiment. As illustrated in FIG. 5, the battery 2020 and the circuit unit 2030 are disposed inside the housing 10a. As to the battery 2020 and the circuit unit 2030, at least the battery 2020 is fixed inside the housing 10a by fixing means, such as adhesive and screw. Further, FIG. 5 illustrates an example of a view of the image capture apparatus 1a viewed from the front side, which corresponds to FIG. 3B. The circuit unit 2030 includes, for example, each element of the above described imaging control system and signal processing system, and, for example, can be configured on one or more of circuit boards.

Although the battery 2020 and the circuit unit 2030 can be arranged at given positions as above described, but not limited thereto. For example, if the circuit unit 2030 is sufficiently small, at least the battery 2020 alone may be disposed at a given position.

In such configuration, the trigger signal is output from the trigger I/F 2004 in response to an operation on the shutter button 30. The trigger signal is supplied to each of the drive units 210a and 210b at the same timing. Each of the drive units 210a and 210b receives electric charges from the respective image capture elements 200a and 200b in synchronized with the supplied trigger signal.

Each of the drive units 210a and 210b converts the electric charges received from each of the image capture element 200a and 200b into electrical signals and supplies the electrical signals to each of the signal processing units 211a and 211b. Each of the signal processing units 211a and 211b performs given processing on each of the electrical signals supplied from each of the drive units 210a and 210b and converts each of electrical signals into image data of a hemispherical image and outputs the image data of hemispherical image. Each of the image data of hemispherical image is stored in RAM 2003 under the control of the memory controller 2002.

Each of the image data of hemispherical image stored in the RAM 2003 is transmitted to an external information processing apparatus via the data I/F 2006 or the communication I/F 2007.

Figure 6:
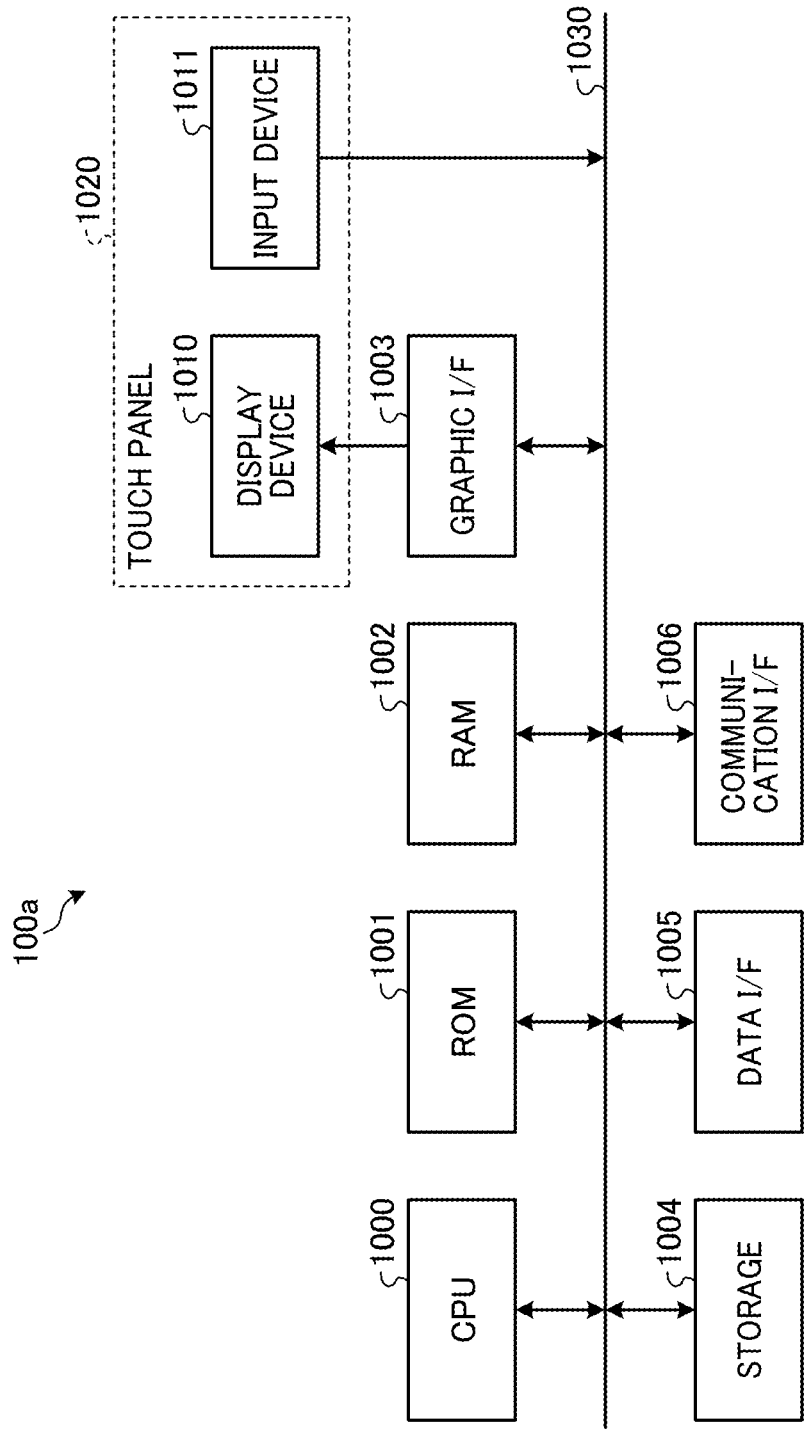
FIG. 6 is an example of a hardware block diagram of an information processing apparatus, which can be used as an input apparatus for inputting an annotation according to the first embodiment.

Image Processing of First Embodiment:

Hereinafter, a description is given of an image processing on the image data of hemispherical image (hereinafter, simply referred to as hemispherical image) according to the first embodiment. FIG. 6 is an example of a hardware block diagram of an information processing apparatus 100a, which can be used as an input apparatus for inputting an annotation according to the first embodiment. As illustrated in FIG. 6, the information processing apparatus 100a includes, for example, a CPU 1000, a ROM 1001, a RAM 1002, a graphic I/F 1003, a storage 1004, a data I/F 1005, a communication I/F 1006, an input device 1011, which are connected with each other via a bus 1030, and further a display device 1010 connected to the graphic I/F 1003.

The storage 1004 is a non-volatile memory, such as a flash memory, and stores one or more programs and various data used for operating the CPU 1000. The storage 1004 can use a hard disk drive. The CPU 1000 executes one or more programs stored in the ROM 1001 and the storage 1004 using the RAM 1002 as a working memory to control the overall operation of the information processing apparatus 100a.

Based on a display control signal generated by the CPU 1000, the graphic I/F 1003 generates a display signal that can be displayed by the display device 1010 and transmits the generated display signal to the display device 1010. The display device 1010 includes, for example, a liquid crystal display (LCD) and a drive circuit for driving the LCD, and displays a screen image corresponding to the display signal transmitted from the graphic I/F 1003.

The input device 1011 outputs a signal corresponding to a user operation and receives a user input. In this example case, the information processing apparatus 100a is a tablet type personal computer, and the display device 1010 and the input device 1011 are integrally configured as a touch panel 1020. The input device 1011 may be displayed on the display device 1010, and outputs position information corresponding to a contact position on the touch panel 1020. The information processing apparatus 100a is not limited to the tablet type personal computer, but can be, for example, a desktop personal computer.

The data I/F 1005 is an interface for performing data communication with an external device. As to the data I/F 1005, for example, USB and Bluetooth (registered trademark) can be employed. The communication I/F 1006 is connected to a network using wireless communication, and controls communication to the network. The communication I/F 1006 can be connected to the network via wired communication. In this example case, it is assumed that the image capture apparatus 1a and the information processing apparatus 100a are connected via the data I/F 1005 using wired communication, but not limited thereto.

Figure 7:
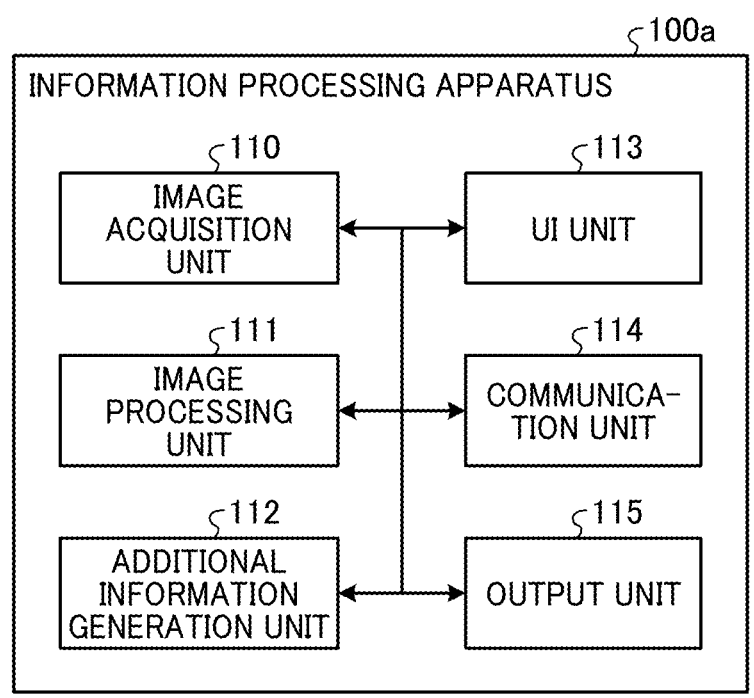
FIG. 7 is an example of a functional block diagram of the information processing apparatus according to the first embodiment.

FIG. 7 is an example of a functional block diagram of the information processing apparatus 100a according to the first embodiment. As illustrated in FIG. 7, the information processing apparatus 100a includes, for example, an image acquisition unit 110, an image processing unit 111, an additional information generation unit 112, a user interface (UI) unit 113, a communication unit 114, and an output unit 115.

The image acquisition unit 110, the image processing unit 111, the additional information generation unit 112, the UI unit 113, the communication unit 114, and the output unit 115 are implemented by operating an input program according to the first embodiment on the CPU 1000, but not limited thereto. For example, a part or all of the image acquisition unit 110, the image processing unit 111, the additional information generation unit 112, the UI unit 113, the communication unit 114, and the output unit 115 can be configured as one or more hardware circuits that operate in cooperation with each other.

The UI unit 113, which is receiving means, receives a user input in response to a user operation to the input device 1011, and executes processing in accordance with the received user input. The UI unit 113 can store information received in accordance with the user input in the RAM 1002 or the storage 1004. The UI unit 113 is also a display unit that generates a screen image to be displayed on the display device 1010. The communication unit 114 controls communication via the data I/F 1005 and the communication I/F 1006.

The image acquisition unit 110 acquires, via the data I/F 1005, each hemispherical image captured by the imaging lenses 20a and 20b from the image capture apparatus 1a, and the inclination information added to each hemispherical image. The image processing unit 111 performs an image conversion process to generate a full view spherical image by stitching each hemispherical image acquired by the image acquisition unit 110. The additional information generation unit 112 generates an additional information (e.g., annotation) at a designated position on the full view spherical image generated by the image processing unit 111 in accordance with the user input received by the UI unit 113. The output unit 115 creates and outputs a report with a given format based on the annotation generated by the additional information generation unit 112.

The input program for implementing each function according to the first embodiment in the information processing apparatus 100a is recorded on a recording medium readable by a computer, such as compact disk (CD), flexible disk (FD), or digital versatile disk (DVD) in a file of an installable format or an executable format. Further, the input program can be provided by storing the input program on a computer connected to a network such as the Internet and downloading the input program via the network. Further, the input program can be provided or distributed via the network such as the Internet.

The input program includes, for example, a module configuration including the image acquisition unit 110, the image processing unit 111, the additional information generation unit 112, the UI unit 113, the communication unit 114, and the output unit 115. As the actual hardware, when the CPU 1000 reads the input program from a storage medium such as the storage 1004 and executes the input program, each of the above described units are loaded on a main storage device such as the RAM 1002, and the image acquisition unit 110, the image processing unit 111, the additional information generation unit 112, the UI unit 113, the communication unit 114, and the output unit 115 are generated on the main storage device.

Image Conversion in First Embodiment:

Hereinafter, a description is given of an image conversion process according to the first embodiment with reference to FIGS. 8 to 12. The image conversion process described below is performed, for example, by the image processing unit 111 in the information processing apparatus 100a.

FIG. 8 is an example of a diagram for describing how the imaging lenses 20a and 20b applied to the first embodiment project three-dimensional incident light in a two-dimensional space. Hereinafter, the imaging lenses 20a and 20b are described using the imaging lens 20a as a representative of the imaging lenses 20a and 20b unless otherwise described.

Figure 8A:
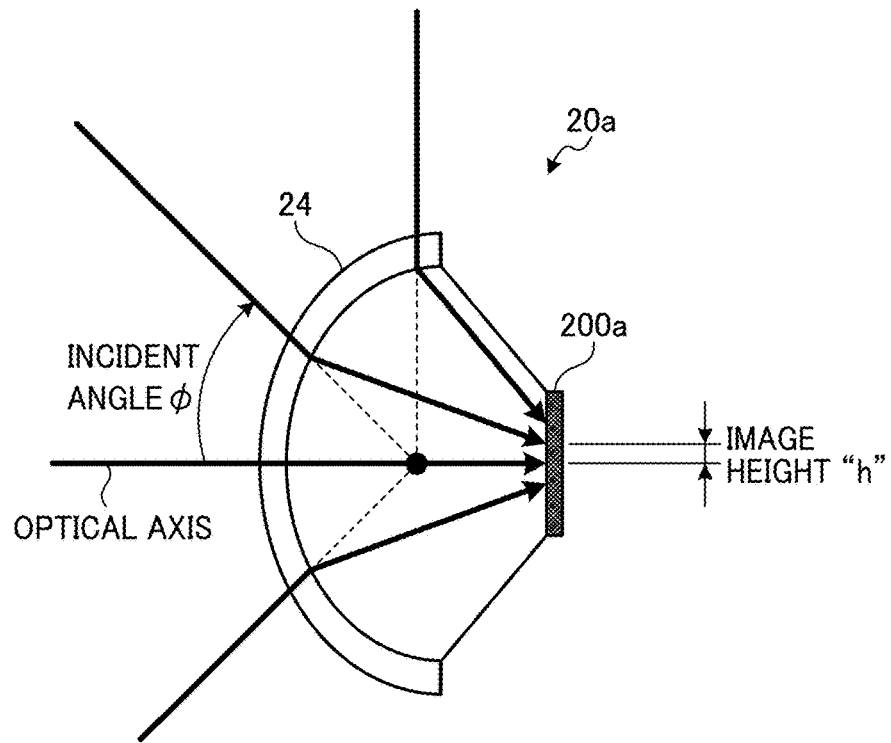
FIGS. 8A and 8B (FIG. 8) is an example of a diagram for describing how an imaging lens projects three-dimensional incident light in a two-dimensional space according to the first embodiment.

As illustrated in FIG. 8A, the imaging lens 20a includes, for example, a fisheye lens 24 (image-focusing optical system 201a) and the image capture element 200a. An axis perpendicular to a light receiving surface of the image capture element 200a is defined as an optical axis. In an example case in FIG. 8A, an incident angle $\varphi$ is expressed as an angle with respect to a vertex of the optical axis, in which the vertex of the optical axis is at the intersection of a plane, contacting with the edge of the fisheye lens 24, and the optical axis.

Figure 8B:
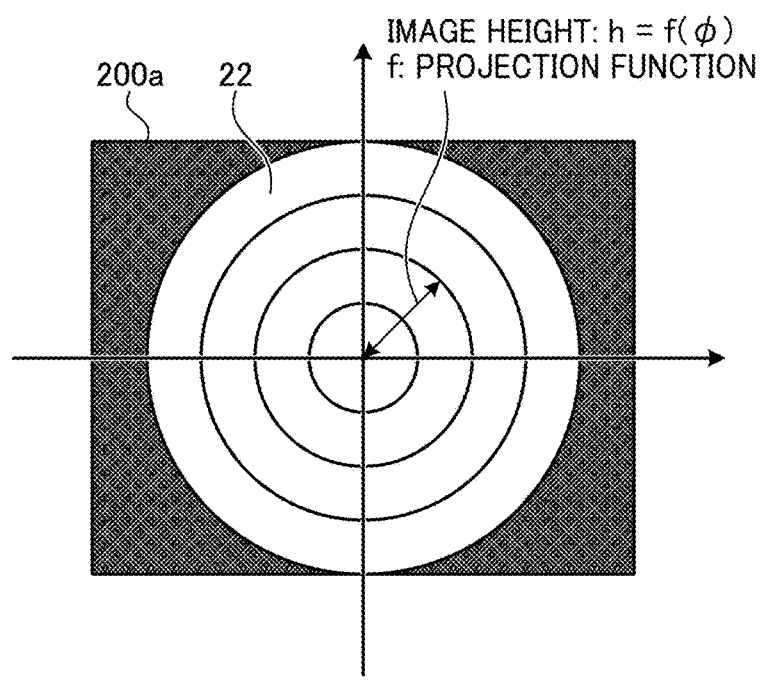

A fisheye image (hemispherical image) captured by the fisheye lens 24 having an angle of view greater than 180 degrees becomes an image of a scene of a hemisphere from an image capture position. As illustrated in FIG. 8A and FIG. 8B, a hemispherical image 22 is generated with an image height "h" corresponding to the incident angle "$\varphi$," wherein the relationship of the image height "h" and the incident angle "$\varphi$" is determined by the projection function $f(\varphi)$. In FIG. 8B, a region in which the light from the fisheye lens 24 is not irradiated on the image capture surface of the image capture element 200a is indicated with black solid image to indicate an invalid region. The projection function $f(\varphi)$ varies depending on properties of the fisheye lens 24. For example, when the image height "h," the focal length "f," the incident angle "$\varphi$" (incident angle defined by incidence direction and the optical axis) are set, the fisheye lens 24 using a projection system corresponding to the equidistant projection system represented by the following formula (1) can be used in this description.

$$h = f \times \varphi \qquad (1)$$

Figure 9:
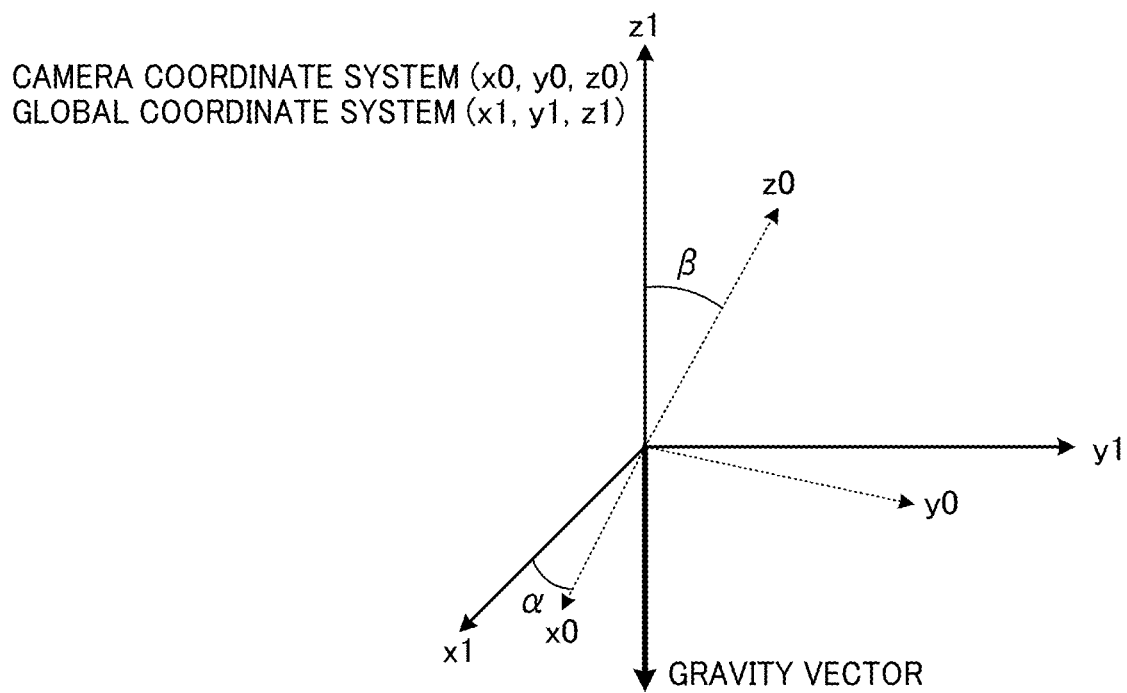
FIG. 9 is a schematic view for describing an inclination of the image capture apparatus according to the first embodiment.

FIG. 9 is a schematic view for describing an inclination of the image capture apparatus 1a according to the first embodiment. In FIG. 9, the vertical direction corresponds to the z axis in the orthogonal coordinate of the x-y-z three-dimensional direction of the global coordinate system. When the vertical direction is parallel with the center line C of the image capture apparatus 1a illustrated in FIG. 3B, the camera is not tilted. If the center line C of the image capture apparatus 1a is not parallel to the vertical direction, the image capture apparatus 1a is in an inclined state.

The image capture apparatus 1a associates each hemispherical image captured by the imaging lenses 20a and 20b with an output value output from the acceleration sensor 2008 at the time of the imaging and stores each hemispherical image and output value, for example, in the RAM 2003. The information processing apparatus 100a acquires each hemispherical image and the output value of the acceleration sensor 2008 stored in the RAM 2003 from the image capture apparatus 1a.

In the information processing apparatus 100a, the image processing unit 111 calculates an inclination angle "α" from a gravity vector (hereinafter, inclination angle "α") and an inclination angle "β" in the x-y plane (hereinafter, inclination angle "β") using the output value of the acceleration sensor 2008 acquired from the image capture apparatus 1a and the following formulas (2) and (3). In the following formulas (2) and (3), a value "Ax" indicates a value of the x0-axis direction component of the camera coordinate system in the output value of the acceleration sensor 2008, a value "Ay" indicates a value of the y0-axis direction component of the camera coordinate system in the output value of the acceleration sensor 2008, and a value "Az" indicates a value of the z0-axis direction component of the camera coordinate system in the output value of the acceleration sensor 2008. The image processing unit 111 calculates the inclination angle "α" and the inclination angle "β" from the values of the respective axial components of the acceleration sensor 2008 in accordance with the trigger signal. The image processing unit 111 associates the calculated inclination angle "α" and inclination angle "β" with each hemispherical image acquired from the image capture apparatus 1a, and stores the calculated inclination angles "α" and "β" and each hemispherical image, for example, in the storage 1004.

$$\alpha = \operatorname{Arctan}\left(\frac{Ax}{Ay}\right) \quad (2)$$

$$\beta = \operatorname{Arccos}\left(\frac{Az}{\sqrt{Ax^2 + Ay^2 + Az^2}}\right) \quad (3)$$

The image processing unit 111 generates a full view spherical image based on each hemispherical image acquired from the image capture apparatus 1a, the inclination angle "α" and the inclination angle "β" associated with each hemispherical image.

Figure 10A:
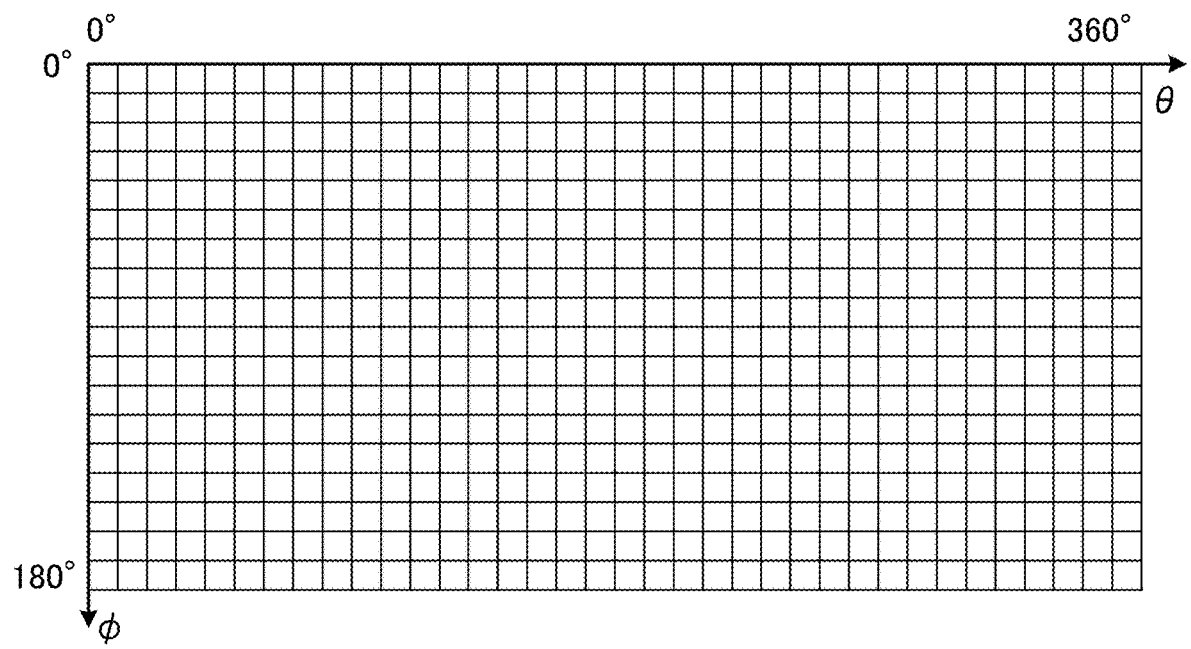
FIGS. 10A and 10B (FIG. 10) are an example of diagram for describing a format of a spherical image according to the first embodiment.
Figure 10B:
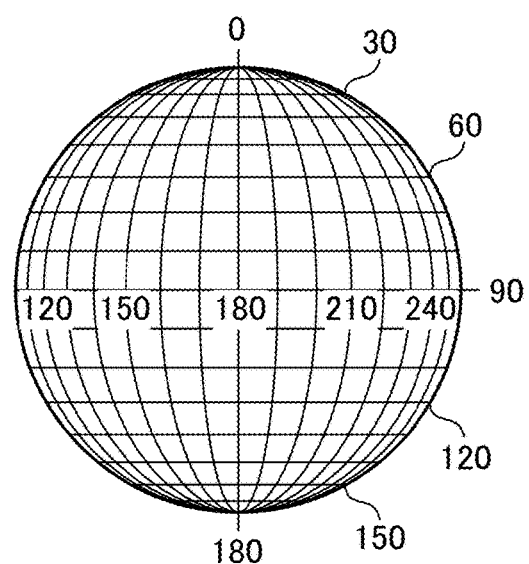

FIGS. 10A and 10B (FIG. 10) are an example of diagram for describing a format of the full view spherical image according to the first embodiment. FIG. 10A is an example of a format when the full view spherical image is represented by a plane, and FIG. 10B is an example of a format when the full view spherical image is represented by a spherical face. When the full view spherical image is represented using the plane format, as illustrated in FIG. 10A, the full view spherical image becomes an image having a pixel value corresponding to an angular coordinates (φ, θ) with respect to the horizontal angle of 0 to 360 degrees and the vertical angle of 0 to 180 degrees. The angular coordinates (φ, θ) are associated with each point of a coordinate point on a spherical face illustrated in FIG. 10B, which are similar to a latitude and a longitude coordinate on a globe.

The relationship between the plane coordinate value of the image captured by the fisheye lens and the spherical coordinate value of the full view spherical image can be mapped by using the projection function "f(h=f(θ))" described in FIG. 8. Thus, by converting the two partial images (two hemispherical images) captured by the fisheye lenses and combining (synthesizing) the two partial images (two hemispherical images), the full view spherical image can be created as a plane image as illustrated in FIG. 10A.

Figure 11:
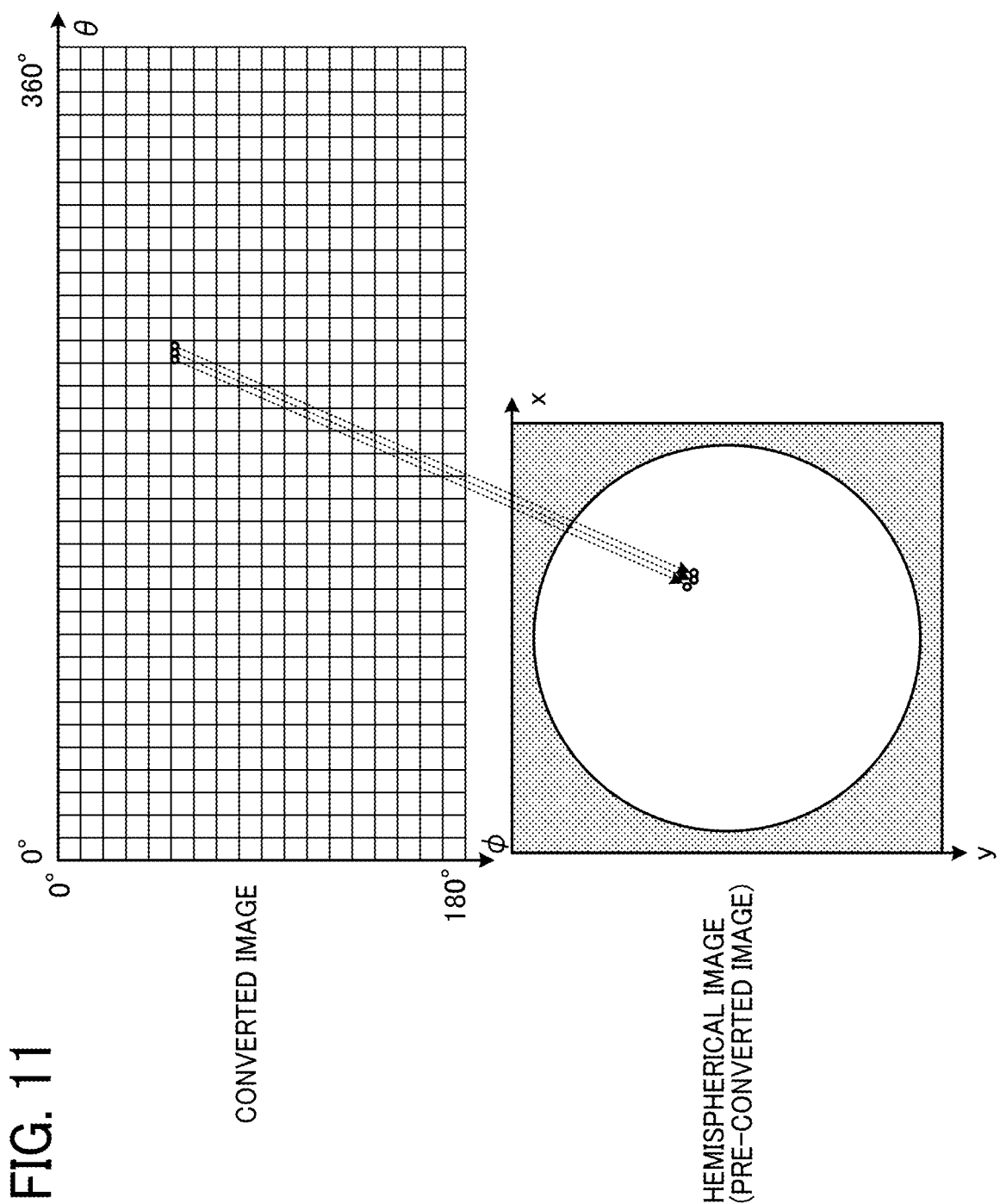
FIG. 11 is an example of a diagram for describing correspondence between each pixel position on a hemispherical image and each pixel position on a full view spherical image associated by a conversion table according to the first embodiment.

In the first embodiment, a conversion table that associates each pixel position on the hemispherical image with each pixel position on the full view spherical image of plane image illustrated in FIG. 10A is created in advance and stored in the storage 1004 of the information processing apparatus 100a. Table 1 is an example of the conversion table. FIG. 11 is an example of a diagram for describing correspondence between each pixel position on the hemispherical image and each pixel position on the full view spherical image associated by the conversion table according to the first embodiment.

TABLE 1

| Coordinate values of converted image | | Coordinate values of pre-conversion image | |
|---|---|---|---|
| θ (pixel) | φ (pixel) | x (pixel) | y (pixel) |
| 0 | 0 | ... | ... |
| 1 | 0 | ... | ... |
| ... | ... | ... | ... |
| 3598 | 1799 | ... | ... |
| 3599 | 1799 | ... | ... |

As illustrated in Table 1, the conversion table has a data set of coordinate values (θ, φ) [pixel] of a converted image and coordinate values (x, y) [pixel] of a pre-conversion image for each of coordinate values of the converted image. The converted image can be generated from the captured hemispherical image (pre-conversion image) using the conversion table illustrated in Table 1. Specifically, as illustrated in FIG. 11, based on the correspondence relationship between the pre-conversion coordinates and the converted coordinates indicated in the conversion table (Table 1), each pixel of the converted image can be generated by referring to the pixel value of the coordinate values (x, y) [pixel] of the pre-conversion image corresponding to the coordinate values (θ, φ) [pixel].

The conversion table, such as Table 1, reflects the distortion correction, assuming that the direction of the center line C of the image capture apparatus 1a is parallel to the vertical direction. By performing the correction process in accordance with the inclination angles "α" and "β" to the conversion table, the correction (i.e., vertical correction) to set the center line C and the vertical direction of the image capture apparatus 1a in parallel with each other can be performed.

Figure 12A:
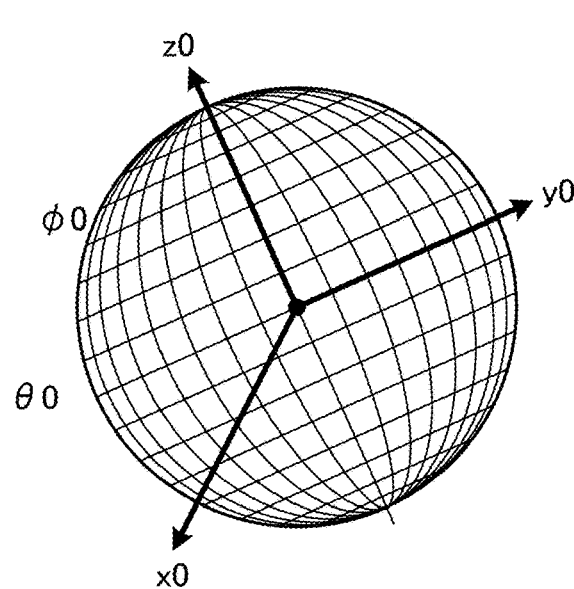
FIGS. 12A and 12B (FIG. 12) is an example of diagrams for describing a vertical correction according to the first embodiment.
Figure 12B:
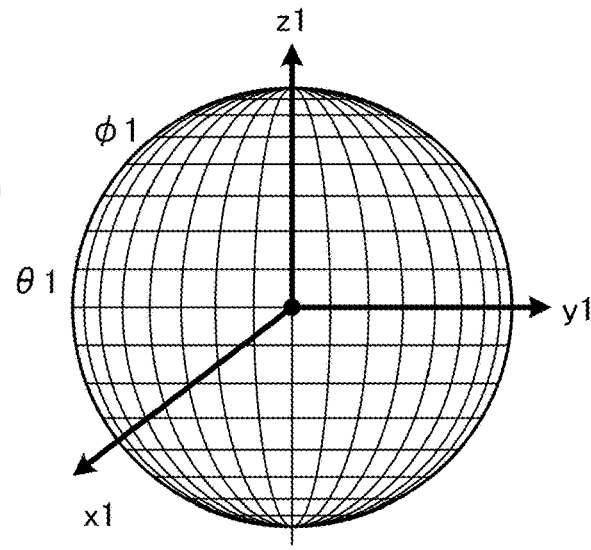

FIGS. 12A and 12B (FIG. 12) is an example of diagrams for describing a vertical correction according to the first embodiment. FIG. 12A is a camera coordinate system, and FIG. 12B is a global coordinate system, respectively. In FIG. 12B, the three-dimensional Cartesian coordinate of a global coordinate system is denoted by (x1, y1, z1) and the spherical coordinate is denoted by (θ1, φ1). In FIG. 12A, the three-dimensional Cartesian coordinate of the camera coordinate system is denoted by (x0, y0, z0) and the spherical coordinate is denoted by (θ0, φ0).

The image processing unit 111 performs the vertical correction processing using the following formulas (4) through (9) to convert the spherical coordinates (θ1, φ1) to the spherical coordinates (θ0, φ0). At first, in order to correct the inclination, it is necessary to perform the rotation conversion using the three-dimensional orthogonal coordinate, and thereby the image processing unit 111 performs the conversion from the spherical coordinates (θ1, φ1) to the three-dimensional orthogonal coordinates (x1, y1, z1) using the following formulas (4) to (6).

$$x1 = \sin(\phi1)\cos(\theta1) \quad (4)$$

$$y1 = \sin(\phi1)\sin(\phi1) \quad (5)$$

$$z1 = \cos(\phi1) \quad (6)$$

Then, the image processing unit 111 performs the rotation coordinate transformation indicated by the following formula (7) using the inclination angle (α, β) to convert the global coordinate system (x1, y1, z1) into the camera coordinate system (x0, y0, z0). In other words, the formula (7) provides a definition of the inclination angle (α, β).

$$\begin{pmatrix} x0 \\ y0 \\ z0 \end{pmatrix} = \begin{pmatrix} \cos\alpha & \sin\alpha & 0 \\ -\sin\alpha & \cos\alpha & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} x1 \\ y1 \\ z1 \end{pmatrix} \quad (7)$$

This means that if the global coordinate system is rotated around the z-axis for "α" rotation at first, and then rotated around the x-axis for "β" rotation, the global is coordinate becomes the camera coordinate system. Finally, the image processing unit 111 converts the three-dimensional orthogonal coordinates (x0, y0, z0) of the camera coordinate system into the spherical coordinate (θ0, φ0) using the following formulas (8) and (9).

$$\phi0 = \text{Arccos}(z0) \quad (8)$$

$$\theta0 = \text{Arctan}\left(\frac{y0}{x0}\right) \quad (9)$$

As described above, the coordinate conversion is performed by executing the vertical correction processing, but not limited thereto. For example, a plurality of conversion tables in accordance with the inclination angle (α, β) can be prepared and stored in advance. With this configuration, the vertical correction processing can be omitted, with which the total processing can be performed faster.

Figure 13A:
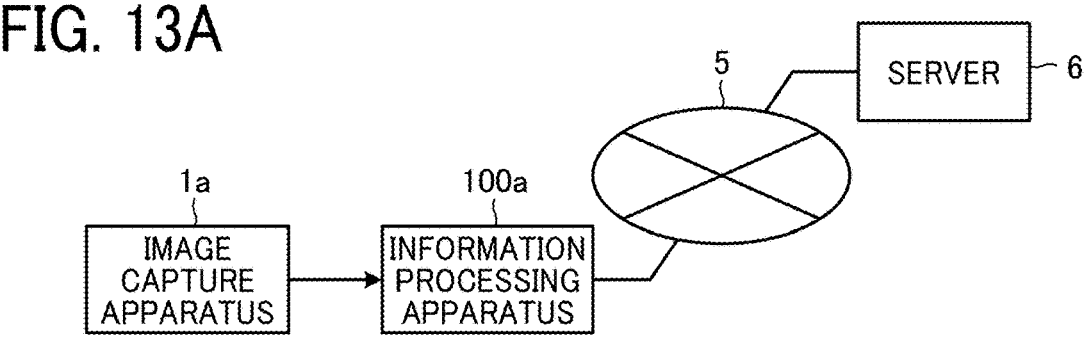
FIGS. 13A and 13B (FIG. 13) schematically illustrate examples of configurations of an information processing system according to the first embodiment.
Figure 13B:
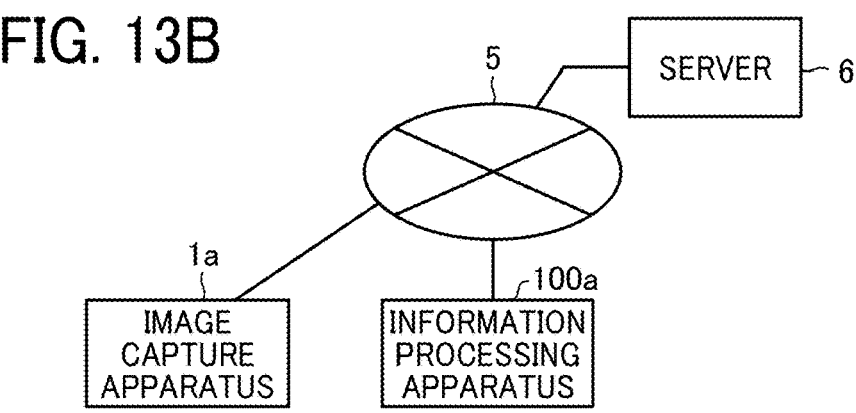

Input Processing of First Embodiment:

Hereinafter, a description is given of an input processing of an annotation according to the first embodiment. FIGS. 13A and 13B (FIG. 13) schematically illustrate examples of configurations of an information processing system according to the first embodiment. As illustrated in FIG. 13A, the information processing system includes, for example, the image capture apparatus 1a, the information processing apparatus 100a connected by wired or wireless communication with the image capture apparatus 1a, and a server 6 connected to the information processing apparatus 100a via a network 5.

Each hemispherical image captured by each of the imaging lenses 20a and 20b in the image capture apparatus 1a is transmitted to the information processing apparatus 100a. Then, the information processing apparatus 100a converts the hemispherical images transmitted from the image capture apparatus 1a into the full view spherical image as described above. Further, the information processing apparatus 100a adds an annotation to the full view spherical image, converted from the hemispherical images, in accordance with a user input. Then, the information processing apparatus 100a transmits, for example, the full view spherical image and the annotation to the server 6 via the network 5. Then, the server 6 stores and manages the full view spherical image and annotation transmitted from the information processing apparatus 100a.

Further, the information processing apparatus 100a acquires the full view spherical image and annotation from the server 6 and creates report data based on the acquired full view spherical image and annotation, but not limited thereto. For example, the information processing apparatus 100a can also generate the report data based on the full view spherical image and the annotation stored in the information processing apparatus 100a. Then, the information processing apparatus 100a transmits the generated report data to the server 6.

In an example case in FIG. 13A, the server 6 is composed as a single computer, but not limited thereto. That is, the server 6 can be configured using a plurality of computers by distributing the functions of the server 6 to the plurality of computers. Further, the server 6 can be configured as a cloud system on the network 5.

Further, as illustrated in FIG. 13B, another configuration can be also employed, in which the image capture apparatus 1a and the information processing apparatus 100a are connected to the network 5. In this configuration, each of the hemispherical images captured by the image capture apparatus 1a is transmitted to the server 6 via the network 5. Then, the server 6 performs the conversion processing on each of the hemispherical images as described above to convert the respective hemispherical images into the full view spherical image and store the full view spherical image. Then, the information processing apparatus 100a adds the annotation to the full view spherical image stored in the server 6.

Further, the first embodiment is not limited to the above configurations. For example, the information processing apparatus 100a may not be connected to the server 6, in which the information processing apparatus 100a performs the processing locally.

Figure 14:
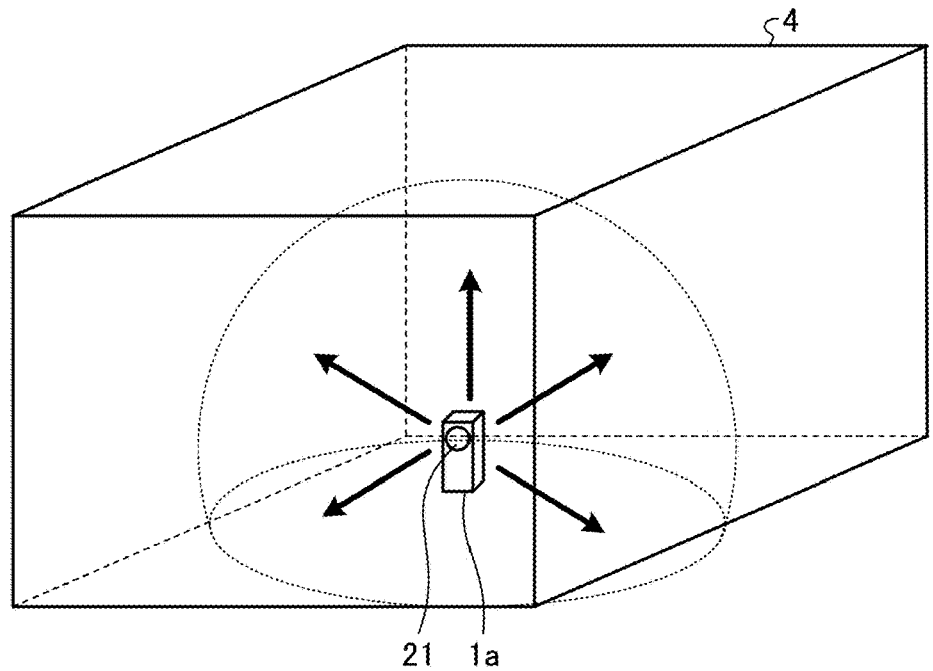
FIG. 14 is an example of a diagram for describing an image capture operation using the image capture apparatus according to the first embodiment.

FIG. 14 is an example of a diagram for describing an image capture operation using the image capture apparatus 1a according to the first embodiment. For example, the full view spherical image can be captured by using the image capture apparatus 1a within a structure 4 to be diagnosed (i.e., diagnosis target). The image can be captured at a plurality of positions in the structure 4. Since the full view spherical image can be captured by one-time imaging capture operation, missing of capturing a part of the interior of the structure 4 (including the ceiling) can be reduced or prevented. Further, in FIG. 14, the image capture apparatus 1a is used to capture images of the interior of the structure 4, but not limited thereto. For example, images of the exterior surface of the structure 4 can be also captured using the image capture apparatus 1a. In this case, for example, by performing a plurality of image capture operations while moving around the entire circumference of the structure 4, the images of the exterior surface (e.g., wall surface) of the structure 4 can be captured without missing a part of the exterior surface of the structure 4. As above described, the image capture apparatus 1a can be used to capture images in a space where the image capture apparatus 1a is set, such as the image capture apparatus 1a set inside the structure 4 (e.g., room). The space for setting the image capture apparatus 1a is not limited to an enclosed space, such as a room, but the image capture apparatus 1a can be set in an open space, such as a park, a street, or the like to capture images of objects existing in the space.

Hereinafter, a description is given of an annotation input processing in the information processing system according to the first embodiment with reference to FIGS. 15A to 15D. In the information processing system according to the first embodiment, auxiliary functions are provided to assist the annotation input to the full view spherical image. Hereinafter, a function of automatically estimating an image capturing position, three-dimensional (3D) panoramic automatic tour function for implementing a movement of viewpoints between a plurality of full view spherical images, and an input and confirmation function of annotation are schematically described as examples of the auxiliary functions.

Figure 15A:
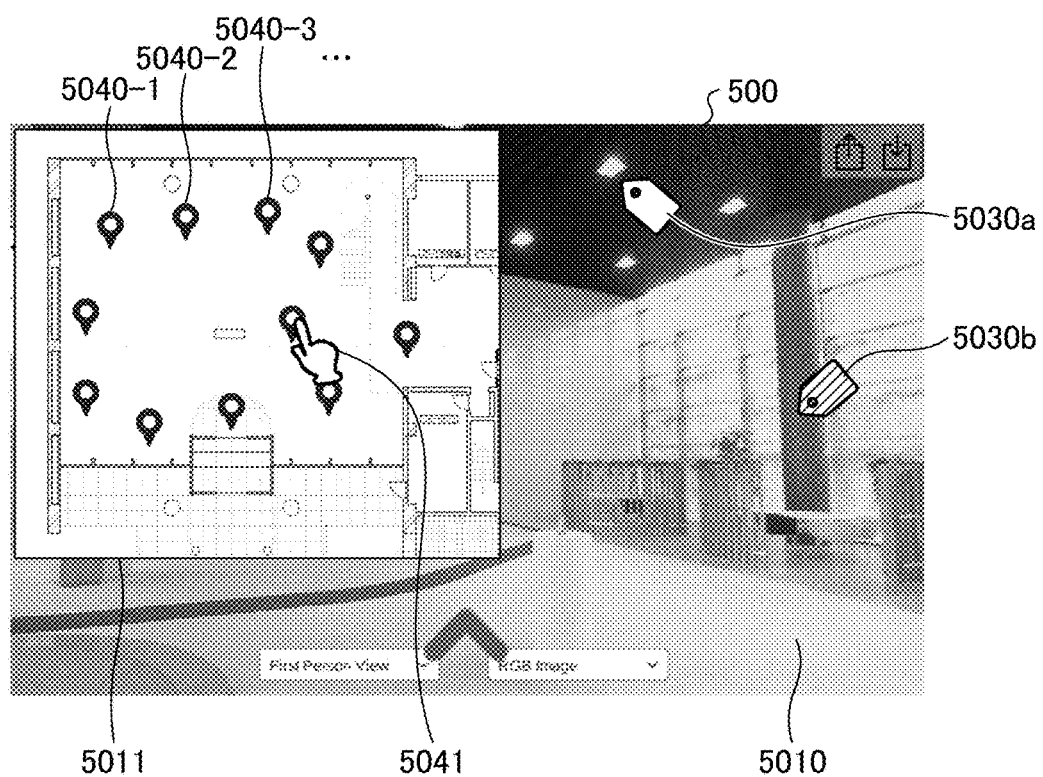
FIG. 15A is an example of a diagram for describing an automatic estimation function of an image capture position according to the first embodiment.

FIG. 15A is an example of a diagram for describing an automatic estimation function of an image capture position according to the first embodiment. In FIG. 15A, a screen 500 displayed on the display device 1010 displays, for example, a partial image 5010 of a given region in the full view spherical image generated from the hemispherical images captured for generating the full view spherical image of the structure 4 to be diagnosed (i.e., diagnosis target). Further, a floor plan image 5011 of the structure 4 acquired in advance is displayed on the screen 500.

In an example illustrated in FIG. 15A, a pin marker 5040-1, a pin marker 5040-2, and a pin marker 5040-3 are displayed on the floor plan image 5011 to indicate image capture positions where the images are captured.

For example, images of a diagnosis target are captured for a plurality of times using the image capture apparatus 1a while moving the image capture positions, and then a pair of hemispherical images captured by the imaging lenses 20a and 20b are acquired. In the information processing apparatus 100a, the image processing unit 111 generates a plurality of full view spherical images based on a plurality of hemispherical images and performs a matching process on the generated full view spherical images using a known method. The image processing unit 111 estimates the relative image capture position of each of the full view spherical images based on a result of the matching process and the respective hemispherical images before converting to the full view spherical images. Each image capture position in the structure 4 can be estimated by rotating and scaling each set of image capture positions while maintaining the relative positional relationship of the estimated image capture positions and by associating each image capture position with the floor plan image 5011.

Further, in the information processing apparatus 100a, the UI unit 113 causes the screen 500 to display a cursor 5041 capable of arbitrarily moving a position in response to a user operation. The UI unit 113 causes the screen 500 to display the partial image 5010 based on the full view spherical image corresponding to the pin marker designated by the cursor 5041 among the pin markers 5040-1, 5040-2, and 5040-3.

In this way, by automatically estimating the image capturing positions of the plurality of full view spherical images, a user can easily recognize a relationship between a plurality of the full view spherical images, thereby improving the work efficiency.

Further, the UI unit 113 can display a tag at a position designated by the user on the partial image 5010. In an example case in FIG. 15A, tags 5030a and 5030b are displayed on the partial image 5010. Although details will be described later, the tags 5030a and 5030b indicate locations of the diagnosis target to which the annotations are input, and are associated with coordinates of the full view spherical image including the partial image 5010.

Figure 15B:
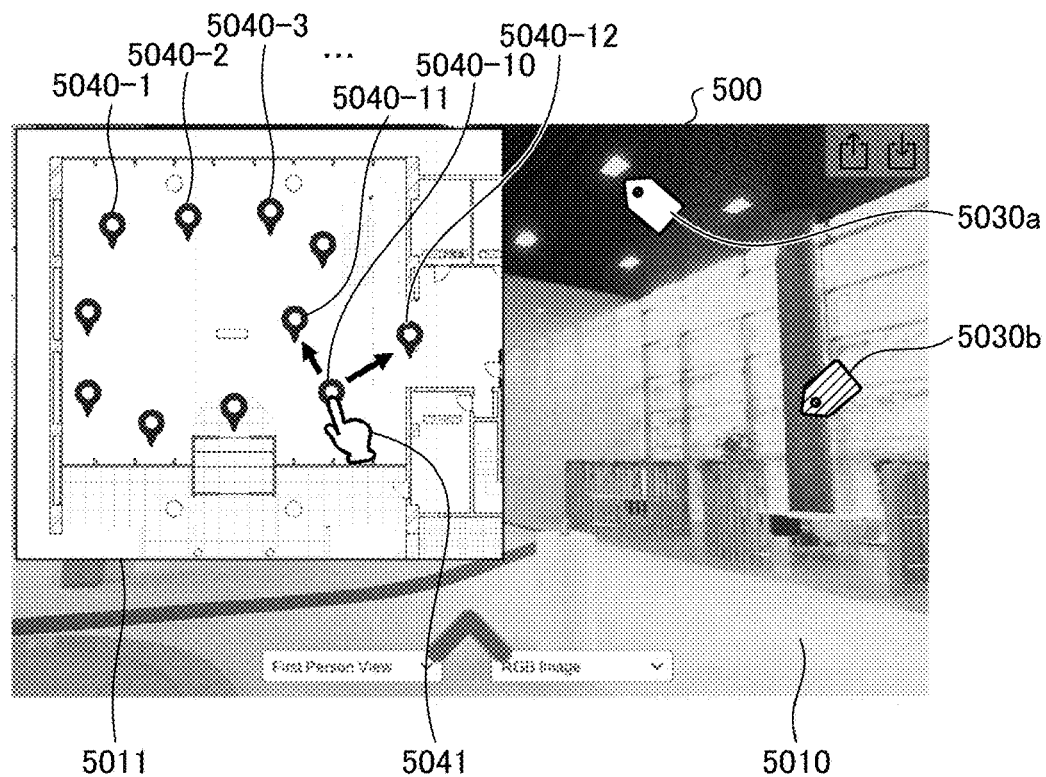
FIGS. 15B and 15C are an example of diagrams for describing three dimensional (3D) panoramic automatic tour function according to the first embodiment.
Figure 15C:
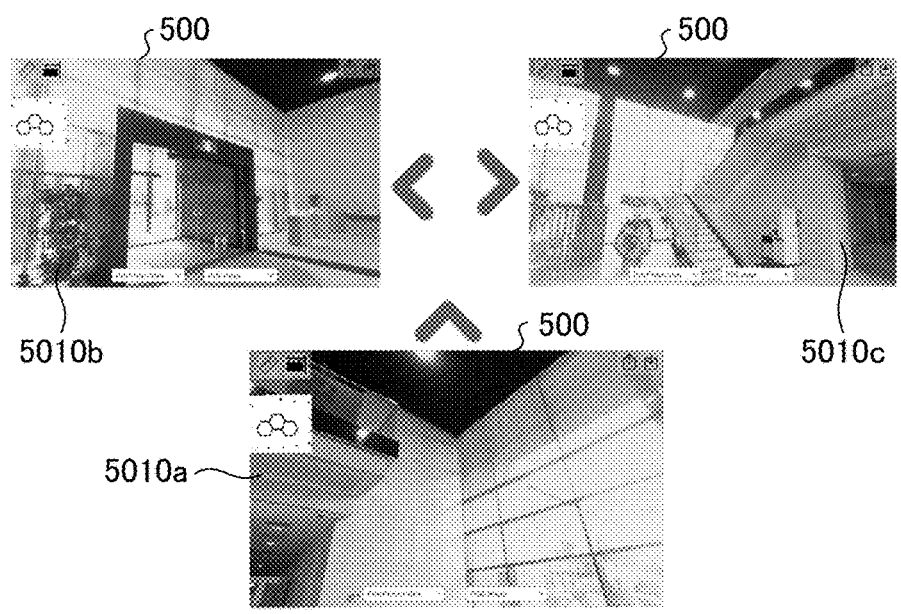

FIGS. 15B and 15C are an example of diagrams for describing the 3D panoramic automatic tour function according to the first embodiment. For example, as illustrated in FIG. 15B, it is assumed that a pin marker 5040-10 is designated on the floor plan image 5011, and a partial image 5010a (see FIG. 15C) corresponding to the position of the pin marker 5040-10 is displayed on the screen 500. In this state, when a movement (indicated by an arrow in FIG. 15B) to the left oblique front is instructed by the cursor 5041, the UI unit 133 shifts a designation of pin marker from the pin marker 5040-10 to a pin marker 5040-11 immediately before the left oblique front of the pin marker 5040-10, and causes the screen 500 to display a partial image 5010b (see FIG. 15C) corresponding to the pin marker 5040-11 based on the full view spherical image. Similarly, when the UI unit 133 shifts a designation of pin marker from the pin marker 5040-10 to a pin marker 5040-12 (indicated by an arrow in FIG. 15B) displayed immediately before the right oblique front of the pin marker 5040-10, the UI unit 113 causes the screen 500 to display a partial image 5010c (see FIG. 15C) corresponding to the pin marker 5040-12 based on the full view spherical image.

In this manner, by designating the movement on the screen 500, for example, using the pin markers 5040-1, 5040-2, and 5040-3, the designated pin marker shifts to the adjacent pin marker in the movement direction, and the partial image 5010 displayed on the screen 500 can be switched one to another in accordance with the shifting of pin marker as indicated in FIG. 15C. With this configuration, a user can operate as if he or she is observing the diagnosis target sequentially, thereby making it possible to improve the efficiency of the diagnosis operation.

Figure 15D:
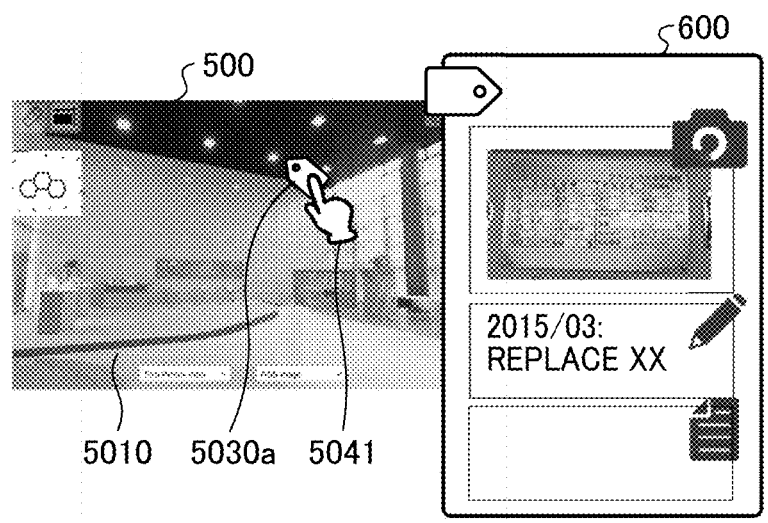
FIG. 15D is an example of a diagram for describing input and confirmation function of annotation according to the first embodiment.

FIG. 15D is an example of a diagram for describing an input and confirmation function of the annotation according to the first embodiment. The UI unit 113 designates a desired position on the partial image 5010 using the cursor 5041 on the screen 500, and a tag 5030a indicating the desired position is superimposed and displayed on the partial image 5010. Further, an annotation input screen 600 for inputting annotation information (hereinafter, annotation) corresponding to the position of the tag 5030a is displayed on the screen 500 with the partial image 5010. The annotation input screen 600 is used as a diagnosis information input field for inputting diagnosis information of the diagnosis target. In FIG. 15D, the annotation input screen 600 is enlarged for the sake of description.

Although details are to be described later, the annotation input screen 600 can be used to input information for pre-set item(s), any comment, and so forth. Further, the annotation input screen 600 can be used to edit information that has already been input. Further, the annotation input screen 600 can be used to input an image of a designated range including the position indicated by the tag 5030a on the partial image 5010, and an image acquired from an external device or the like.

In this way, since the position is designated on the full view spherical image and the annotation is input to the designated position, the correspondence relationship of the annotation and the image can be facilitated, and thereby the efficiency of the working, such as creating reports, can be improved.

Figure 16A:
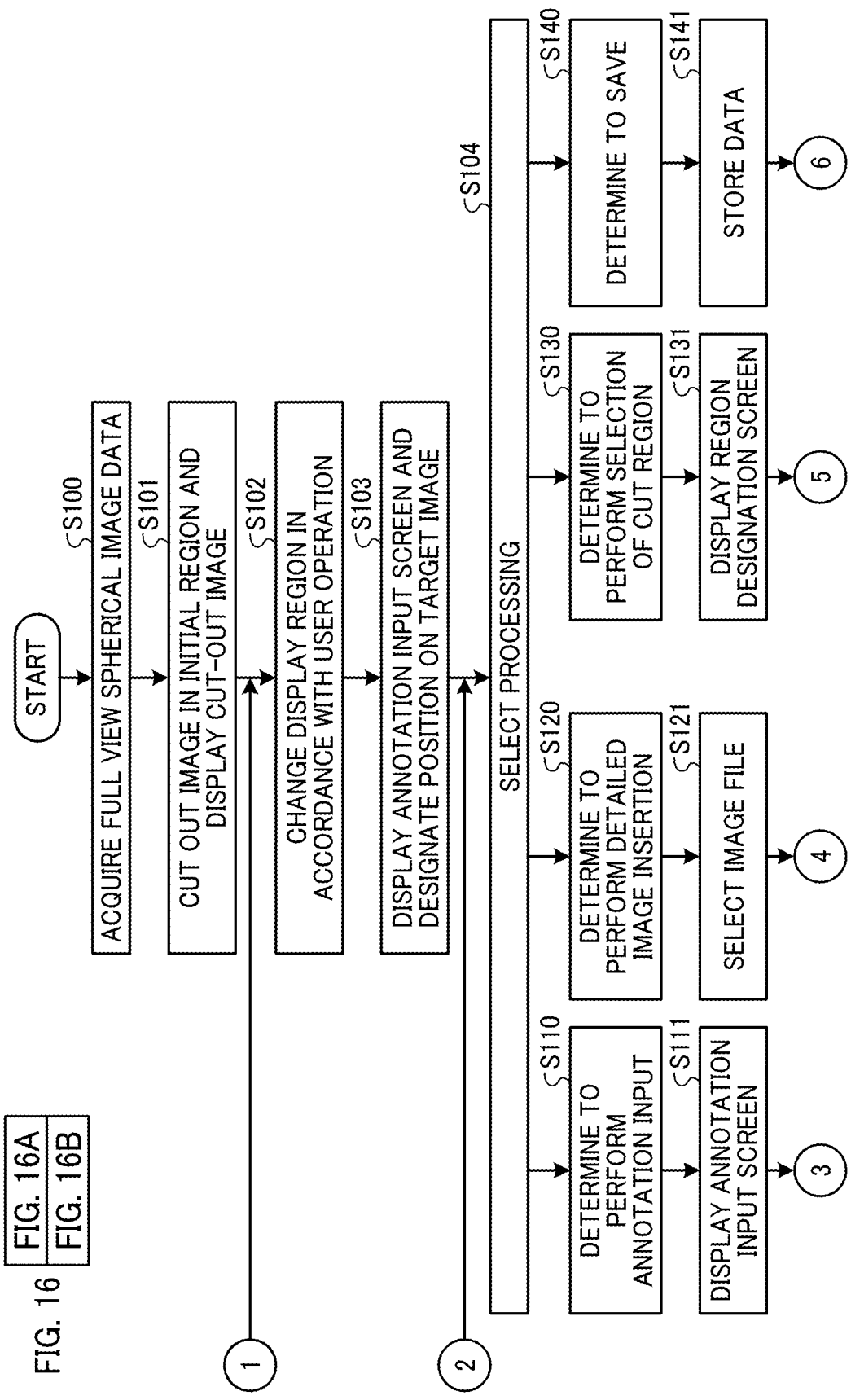
FIGS. 16A and 16B (FIG. 16) is an example of a flowchart illustrating the steps of annotation input processing according to the first embodiment.
Figure 16B:
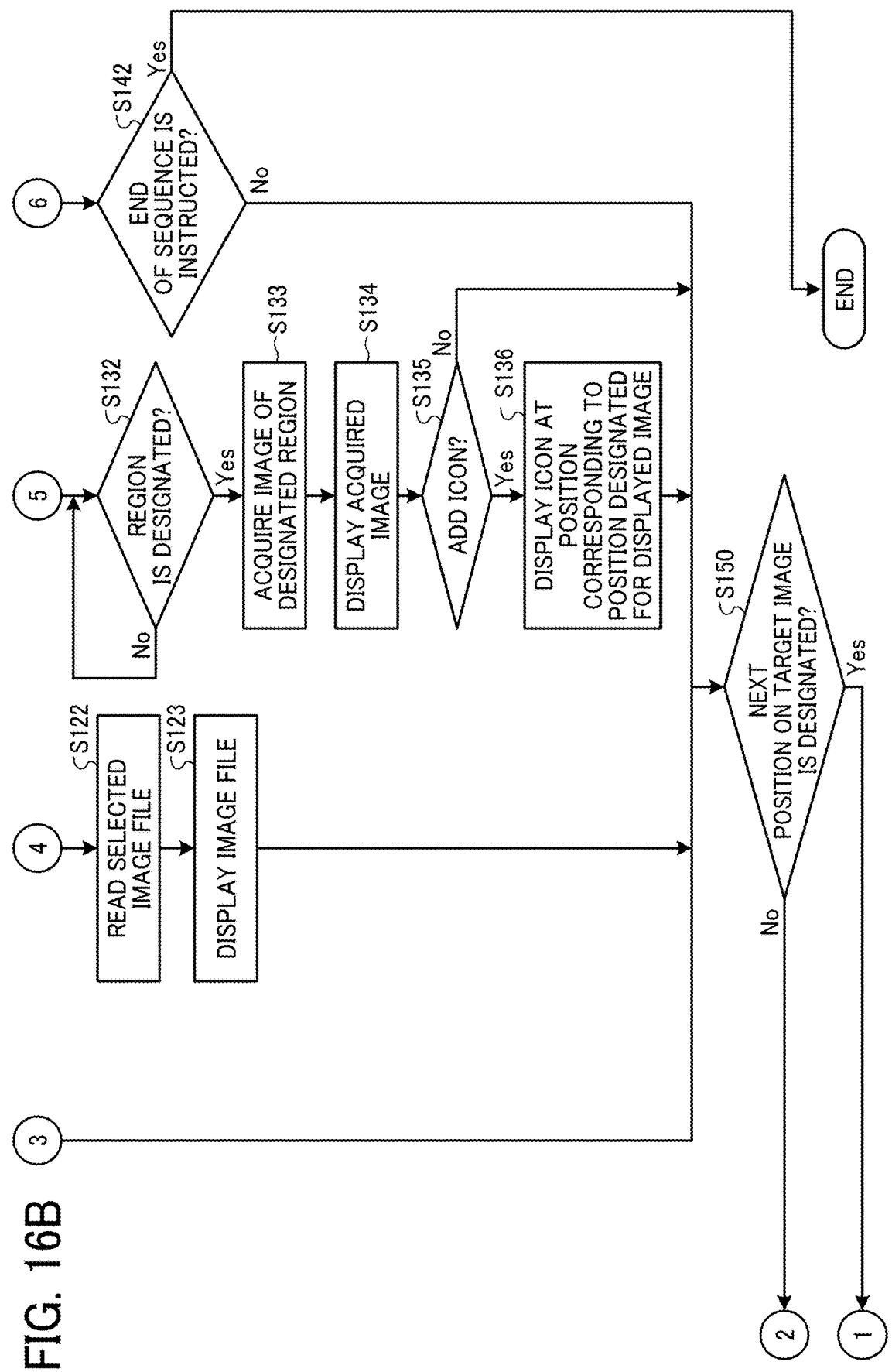

Input Processing of First Embodiment:

Hereinafter, a description is given of the annotation input processing according to the first embodiment. FIGS. 16A and 16B (FIG. 16) is an example of a flowchart illustrating the steps of the annotation input processing according to the first embodiment.

Prior to the performing the processing of the flowchart illustrated in FIG. 16, the information processing apparatus 100a acquires the respective hemispherical images captured through the imaging lenses 20a and 20b and an output value of the acceleration sensor 2008 from the image capture apparatus 1a, generates a full view spherical image based on the respective hemispherical images, and stores the full view spherical image, for example, in the storage 1004. Hereinafter, in order to avoid the complexity, a description is given by assuming that one full view spherical image is generated.

In step S100, in the information processing apparatus 100a, the image acquisition unit 100 acquires the full view spherical image stored in the storage 1004.

In step S101, the UI unit 113 cuts out an image in a given region from the full view spherical image acquired by the image acquisition unit 110 and displays the cut-out image on the screen 500.

Figure 17:
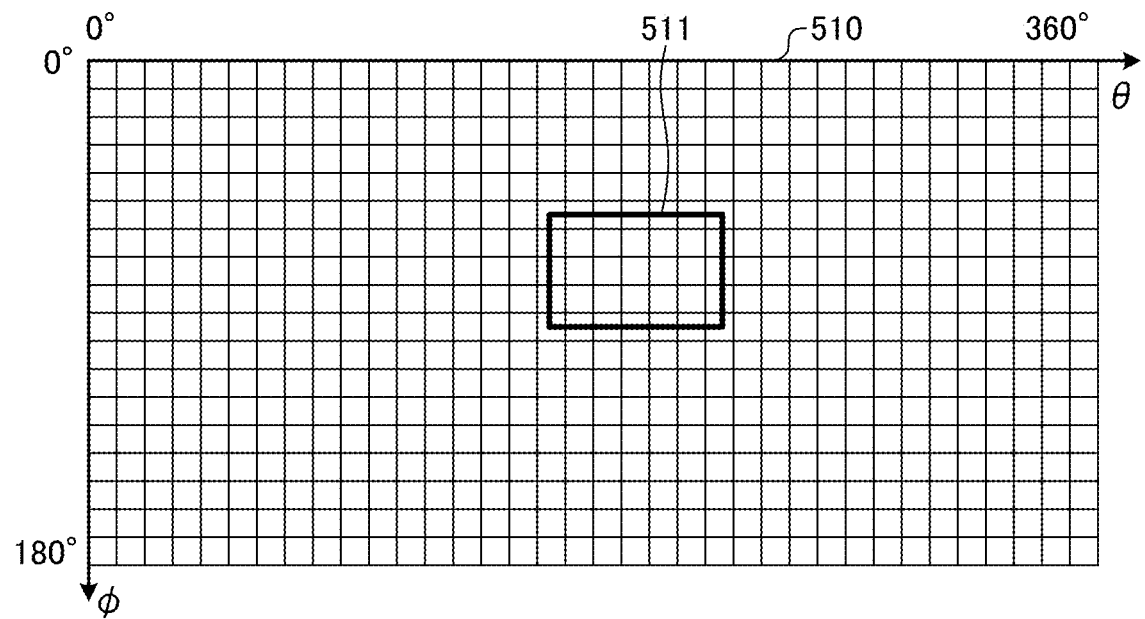
FIG. 17 is an example of a diagram for describing image cutting process according to the first embodiment.

FIG. 17 is an example of a diagram for describing the image cutting process by the UI unit 113 according to the first embodiment. FIG. 17 corresponds to FIG. 10A. The UI unit 113 cuts an image of a partial region 511 in a full view spherical image 510 generated from the two hemisphere images and displays the image of the partial region 511 on the screen 500 as the partial image 5010.

In step S101, the image of the partial region 511, set as an initial value, is cut out. In step S101, for example, the UI unit 113 replaces the angular coordinates (φ, θ) of the full view spherical image 510 with coordinates (x, y) suitable for displaying on the screen 500, and displays the partial image 5010 on the screen 500.

In step S102, the UI unit 113 moves or changes the partial region 511 in the full view spherical image 510 in accordance with a user operation. Further, the UI unit 113 can change a size of the partial region 511 in the full view spherical image 510 in accordance with the user operation.

Figure 18:
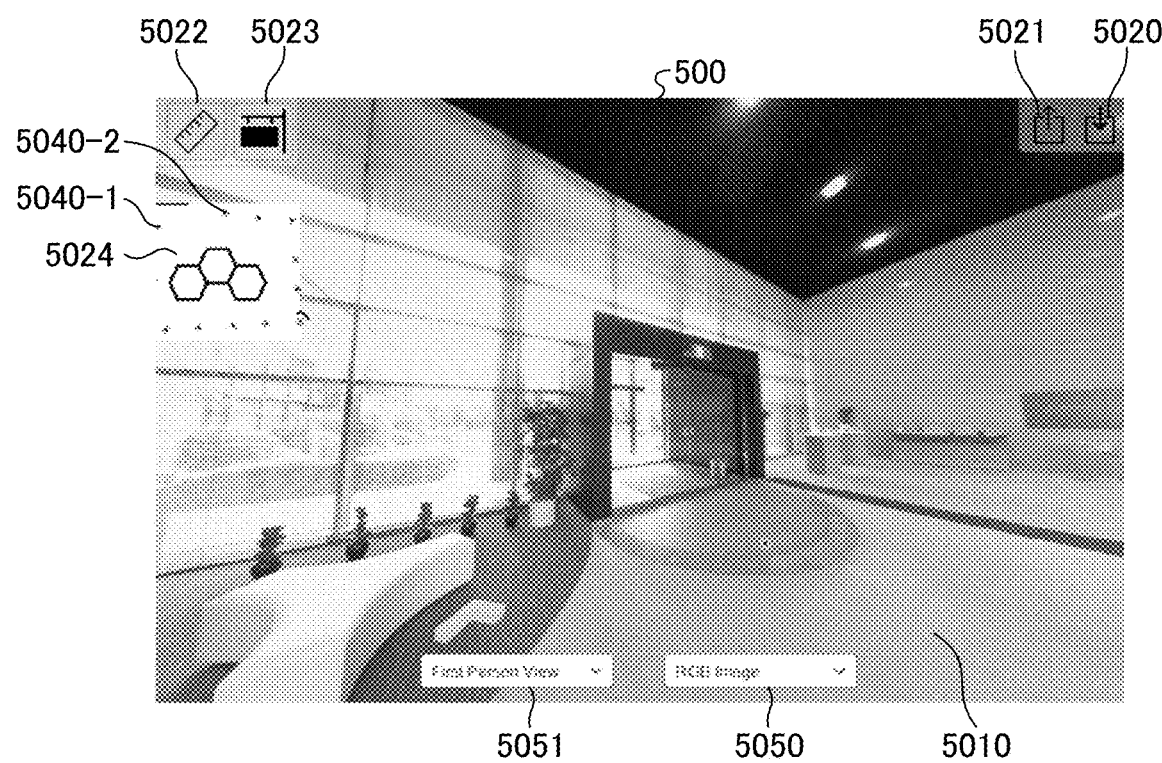
FIG. 18 is an example of a screen displayed using a display device under a control of a user interface (UI) unit according to the first embodiment.

FIG. 18 is an example of the screen 500 displayed using the display device 1010 under the control of the UI unit 113 according to the first embodiment. In this example case, the UI unit 113 displays the partial image 5010 of the partial region 511 illustrated in FIG. 17 on the entire area of the screen 500. Further, buttons 5020, 5021, 5022, and 5023, and menu buttons 5050 and 5051 are respectively displayed on the screen 500.

The button 5020 is a button for reading the full view spherical image 510. The button 5021 is a button for storing annotation data, which will be described later, which is set on the screen 500. In response to an operation of the button 5021, the screen 500, being currently displayed, can be further saved. The button 5022 is a button for changing a scale, and in accordance with an operation of the button 5022, an instruction screen for instructing an enlargement and reduction of the partial image 5010 in the screen 500 is displayed. The button 523 is a button for displaying the annotation input screen 600, which will be described later, with respect to the screen 500.

The menu button 5050 is a button for displaying a menu for switching a display mode of the screen 500. The menu button 5051 is a button for switching a viewpoint of the partial image 5010.

Further, a section 5024 is displayed on the screen 500, in which a relative position of each of the image capture positions estimated by using the function of automatic estimation, described with reference to FIG. 15A, is displayed using pin markers 5040-1 and 5040-2 as illustrated in FIG. 18.

Figure 19:
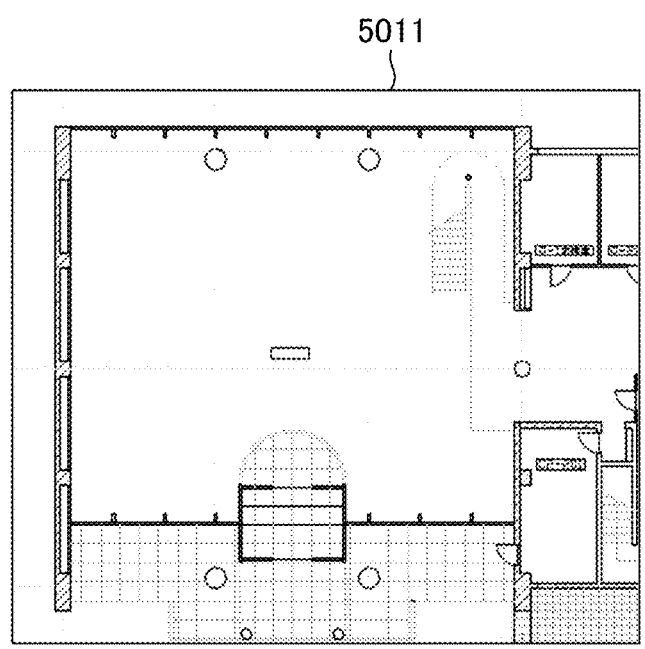
FIG. 19 is an example of a diagram illustrating a floor plan image according to the first embodiment.

The information processing apparatus 100a acquires the floor plan image 5011 (see FIG. 19) including a diagnosis target in advance, and stores the floor plan image 5011, for example, in the storage 1004. The UI unit 113 can display the floor plan image 5011 on the screen 500. For example, the UI unit 113 superimposes the floor plan image 5011 on the section 5024 in the screen 500 to display the floor plan image 5011. Further, the UI unit 113 can display each pin marker 5040-1 and 5040-2 indicating each image capture position for the floor plan image 5011 displayed on the screen 500. By performing a given input operation, the user can adjust the positions of each pin marker 5040-1 and 5040-2 on the floor plan image 5011 by matching the position of each pin marker 5040-1 and 5040-2 at the actual image capture position while maintaining the relative positional relationship between the pin markers 5040-1 and 5040-2.

In step S103, the UI unit 113 waits for an operation of a button 5023, and if the button 5023 is operated, the UI unit 113 displays the annotation input screen 600 on the screen 500. Then, in accordance with an operation on the annotation input screen 600, a position on the partial image 5010 is designated.

Figure 20:
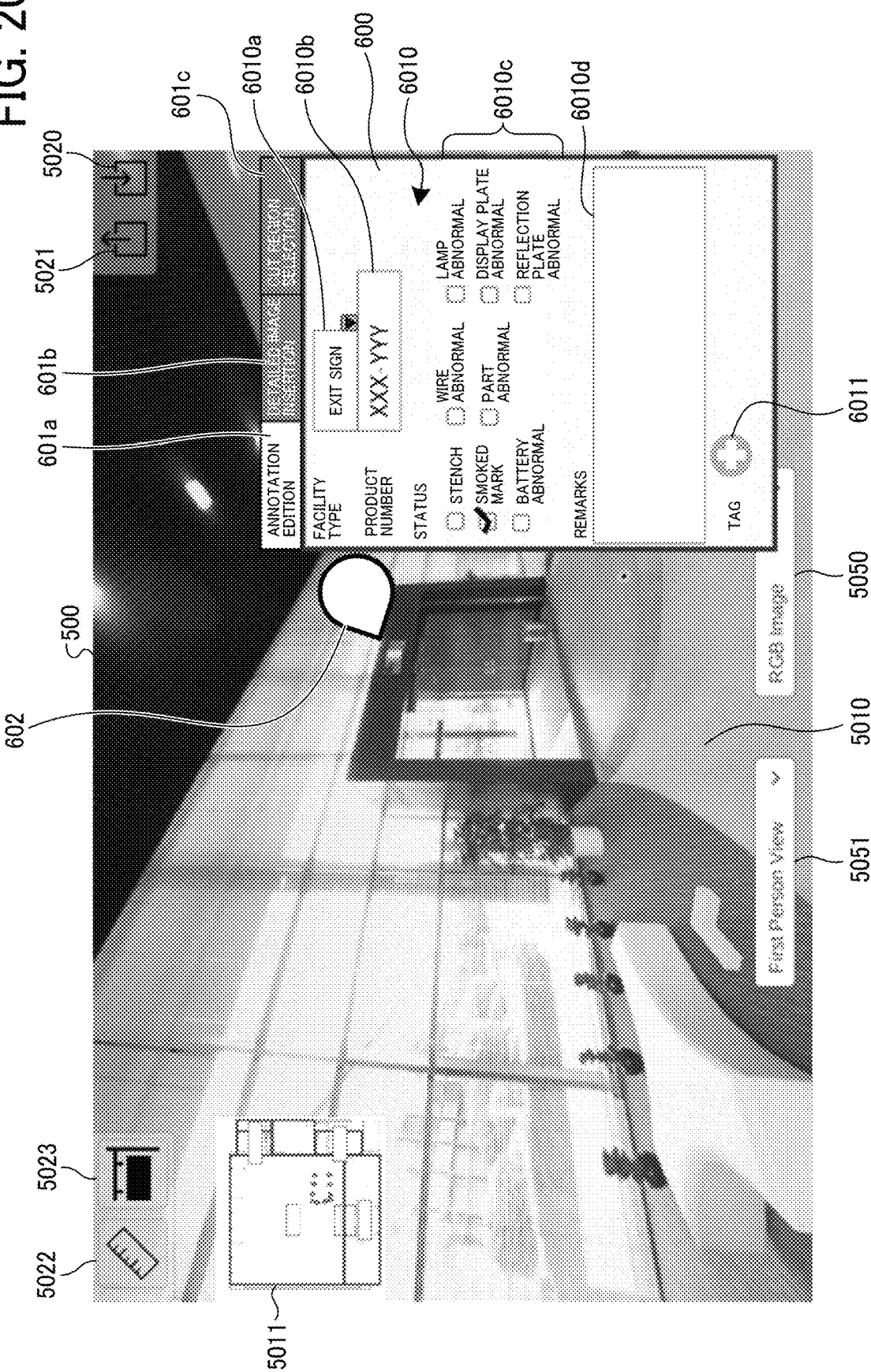
FIG. 20 is an example of an annotation input screen displayed on a screen according to the first embodiment.

FIG. 20 is an example of the annotation input screen 600 displayed on a screen 500 according to the first embodiment. In FIG. 20, the same reference numerals are assigned to the same parts as those in FIG. 19, and detailed descriptions thereof will be omitted. In FIG. 20, a marker 602 is superimposed on the position designated in step S103. Further, in FIG. 20, the annotation input screen 600 is superimposed and displayed over the partial image 5010. The UI unit 113 associates position information indicating the designated position with identification information identifying the annotation (annotation ID), and stores the position information and the identification information, for example, in the RAM 1002. The position information uses, for example, coordinates in the full view spherical image 510 including the partial image 5010.

The annotation input screen 600 is designed to be displayed on the screen 500 which is displaying the partial image 5010, but the annotation input screen 600 is not required to be superimposed on the partial image 5010. For example, the annotation input screen 600 and the partial image 5010 can be displayed in separate sections in the screen 500, or the annotation input screen 600 can be displayed in a window different from the partial image 5010. Further, a display position of the annotation input screen 600 on the screen 500 can be changed in accordance with the user operation.

In FIG. 20, the annotation input screen 600 includes tabs 601a, 601b, and 601c for switching functions of the annotation input screen 600. The tab 601a is a tab for editing the annotation. The tab 601b is a tab for inserting a detailed image, in which when the tab 601b is operated, a file selection screen provided, for example, by an operating system (OS) of the information processing apparatus 100a is displayed in accordance with an operation of the tab 601b, and a desired image can be selected from the file selection screen. The tab 601*c* is a tab for selecting a cut region, and in accordance with an operation of the tab 601*c*, the display of the screen 500 is switched to a display for designating a region on the partial image 5010.

In the annotation input screen 600 illustrated in FIG. 20, a button 6011 is a button for adding a tag to the partial image 5010. For example, when the button 6011 is operated, and then a position designation operation on the partial image 5010 is performed by the cursor 5041, the UI unit 113 displays the marker 602 at the designated position.

In step S104, the UI unit 113 waits for an operation of each of the tab 601*a* to 601*c* of the annotation input screen 600 and the button 5021 in the screen 500, and performs the corresponding processing in response to an operation of any one of the tabs and buttons (e.g., tabs 601*a* to 601*c*, button 5021).

If the annotation input screen 600 is displayed in response to the operation of the button 5023 as the initial screen or if the tab 601*a* is designated, the UI unit 113 determines to perform the annotation input processing in step S110, and proceeds the sequence to step S111.

In step S111, as illustrated in FIG. 20, the UI unit 113 displays the annotation input screen 600 including an annotation input field 6010 used for inputting the annotation.

In an example case in FIG. 20, the annotation input field 6010 includes, for example, input fields 6010*a* to 6010*d*. In this example case, the input field 6010*a* serves as an input field for selecting a pre-set item by a pull-down menu, and it is possible to select various types included in each item, such as the pre-set item of "facility type." The input field 6010*b* serves as an input field for inputting text information. In the input field 6010*b*, the text information composed of a certain number of characters, such as a product type number, is input.

The input field 6010*c* serves as an input field having a pre-set item list and a check box for inputting a check mark for an appropriate item. The input field 6010*c* can designate a plurality of items. Further, the input field 6010*c* displays, for example, one or more items corresponding to the contents selected in the input field 6010*a*. In this example case, the items corresponding to "exit sign" selected in the "facility type" of the input field 6010*a* are displayed in the input field 6010*c*.

The input field 6010*d* serves as, for example, an input field for inputting a note, in which text information can be input with a free form. The number of character limit may be limitless, or a sentence having a certain length can be input. The UI unit 113 stores the contents input in the annotation input field 6010 in the RAM 1002 in association with the position information indicating the position designated in step S103.

Further, even when the annotation input screen 600 is being displayed in step S111, the buttons 5020 to 5023, the tabs 601*a* to 601*c*, and the menu buttons 5050 and 5051 arranged on the screen 500 can be operated respectively. Further, an operation of changing the position of the partial region 511 within the full view spherical image 510 can be also performed, wherein the partial image 5010 is cut from the full view spherical image 510.

Further, an operation of designating the next position on the partial image 5010 can be also performed while the annotation input screen 600 is being displayed in step S111.

In step S150, the UI unit 113 determines whether the next position is designated on the partial image 5010. If the UI unit 113 determines that the next position is designated (step S150: YES), the UI unit 113 returns the sequence to step S102.

On the other hand, if the UI unit 113 determines that the next position is not designated (step S150: NO), the UI unit 113 returns the sequence to step S104. In this case, the state right before the determination in step S150 is maintained.

Further, if the tab 601*b* is designated in step S104, the UI unit 113 determines to perform the detailed image insertion and proceeds the sequence to step S120.

In step S121, the UI unit 113 displays an image file selection screen on the screen 500. The UI unit 113 can use, for example, a file selection screen that is provided as a standard function by an Operating System (OS) installed on the information processing apparatus 100*a* as an image file selection screen. In this case, it is preferable that the file names are filtered based on, for example, one or more file extensions, and the file names of the corresponding image files alone are displayed.

In step S122, the UI unit 113 reads the image file selected in the image file selection screen.

In step S123, the UI unit 113 displays the image file read in step S122 in a given area in the annotation input screen 600. The UI unit 113 stores the file name including a path to the read image file, for example, in the RAM 1002 in association with the position information indicating the position designated in step S103. After the processing in step S123, the sequence proceeds to step S150, which is described above.

Further, if the tab 601*c* is designated in step S104, the UI unit 113 determines to perform a selection of cut region for the partial image 5010 in step S130, and proceeds the sequence to step S131.

Figure 21:
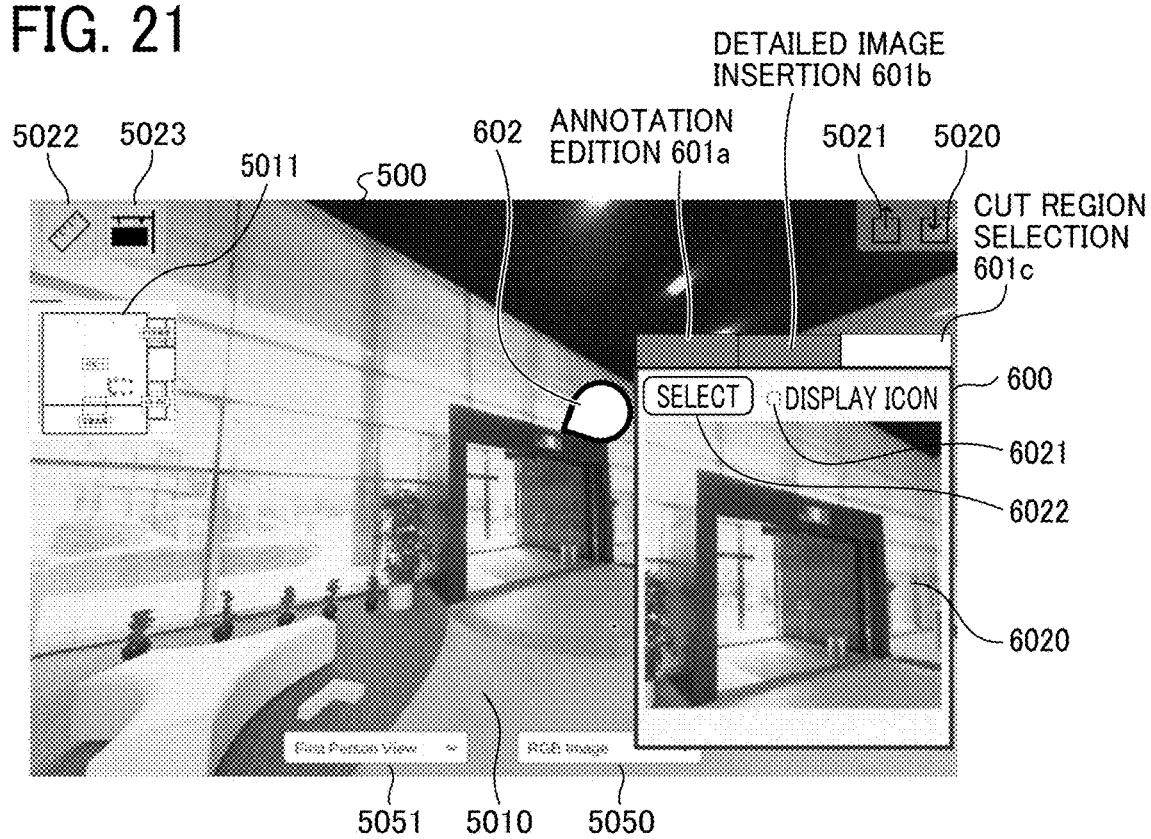
FIG. 21 is an example of an annotation input screen switched to a region designation screen according to the first embodiment.

In step S131, the UI unit 113 switches the display of the annotation input screen 600 to a display of the region designation screen used for designating the cut region as a diagnosis region including a diagnosis target image. FIG. 21 is an example of the annotation input screen 600 switched to the region designation screen according to the first embodiment.

In FIG. 21, the annotation input screen 600 switched to the region designation screen includes, for example, a cut image display field 6020, a check box 6021, and a selection button 6022. The cut image display field 6020 displays an image cut from a region designated for the partial image 5010. In the initial state where no region is designated for the partial image 5010, the cut image display field 6020 displays, for example, blank, but not limited thereto. For example, an image of a region set in advance for the position designated in step S103 can be cut from the partial image 5010 and displayed on the cut image display field 6020.

The check box 6021 is a button for displaying a marker image as an icon for the cut image display field 6020. The selection button 6022 is a button for starting the designation of the cut region for the partial image 5010.

Figure 22:
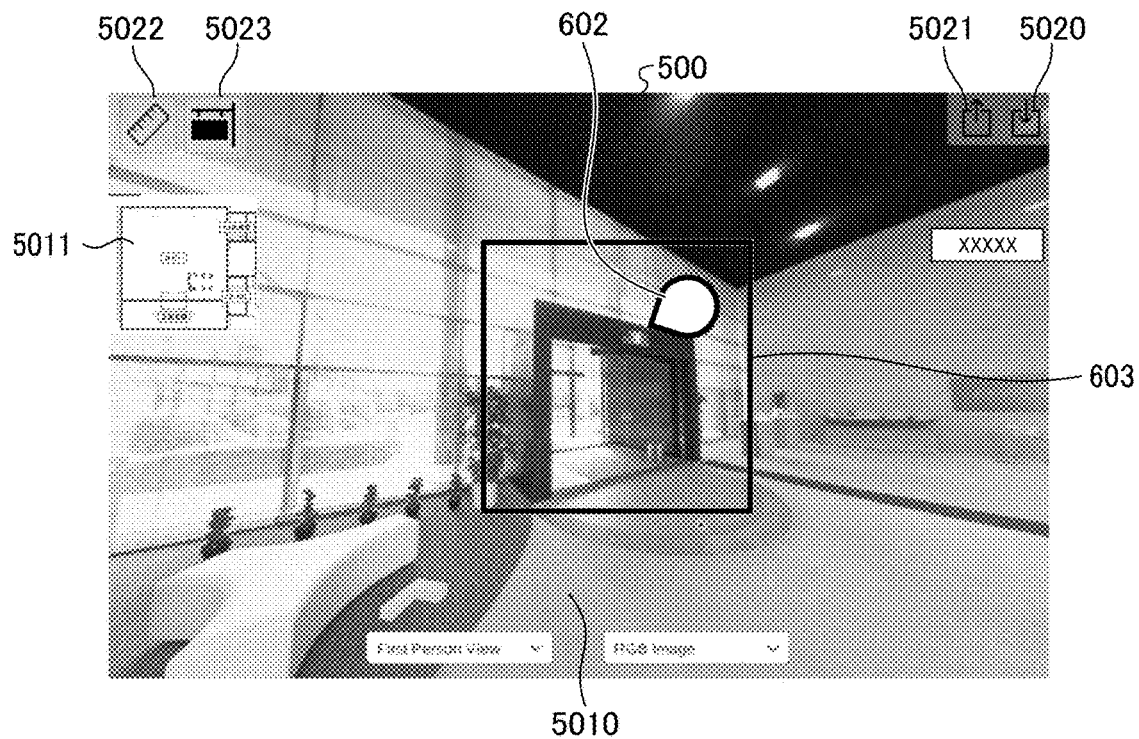
FIG. 22 is an example of displaying of a screen when designating a cut region according to the first embodiment.

FIG. 22 is an example of the screen 500 being displayed when designating a cut region in accordance with an operation on the selection button 6022 according to the first embodiment. As illustrated in FIG. 22, in response to the operation on the selection button 6022, the UI unit 113 displays a frame 603 indicating the cut region on the screen 500, and deletes the display of the annotation input screen 600 from the screen 500. For example, the frame 603 is displayed at the region, which is pre-set for the position designated in step S103.

The UI unit 113 can change the size, shape and position of the frame 603 in accordance with a user operation. The shape may be, for example, limited to a rectangular shape, but a ratio of lengths of the long side and the short side can be changed (aspect ratio of rectangular shape can be changed). When changing the size, shape and position of the frame 603, the UI unit 113 can display a warning screen indicating that the changed frame 603 may not include the position designated in step S103.

Returning to the flowchart of FIG. 16, the UI unit 113 determines whether the region designation has completed in step S132. For example, if the display device 1010 and the input device 1011 are constituted as the touch panel 1020 and the region designation by the frame 603 is performed by a drag operation on the touch panel 1020, such as moving a hand/finger of user in a state being touching the hand/finger of user on the touch panel 1020, the UI unit 113 can determine that the drag operation is ended and the region designation by the frame 603 is completed when the hand/finger of user is detached from the touch panel 1020.

If the UI unit 113 determines that the region designation has not been completed (step S132: NO), the UI unit 113 repeats step S132. On the other hand, if the UI unit 113 determines that the region designation has completed (step S132: YES), the UI unit 113 proceeds the sequence to step S133.

In step S133, the UI unit 113 acquires an image of the region designated by the frame 603 from the partial image 5010 as a cut image. In step S133, the UI unit 113 acquires, for example, coordinates of each vertex of the frame 603 in the full view spherical image 510 including the partial image 5010, and stores the acquired coordinates in, for example, the RAM 1002 in association with the position information indicating the position designated in step S103.

In step S134, the UI unit 113 displays the cut image acquired in step S132 on the cut image display field 6020 in the annotation input screen 600. Further, the UI unit 113 stores the cut image acquired in step S133 in a file having a given file name to create a cut image file. The UI unit 113 stores the cut image file in, for example, the RAM 1002.

In step S135, the UI unit 113 determines whether an icon is to be displayed for the cut image displayed in the cut image display field 6020. If the check box 6021 of the annotation input screen 600 is checked, the UI unit 113 determines that the icon is to be displayed (step S135: YES) and proceeds the sequence to step S136.

Figure 23:
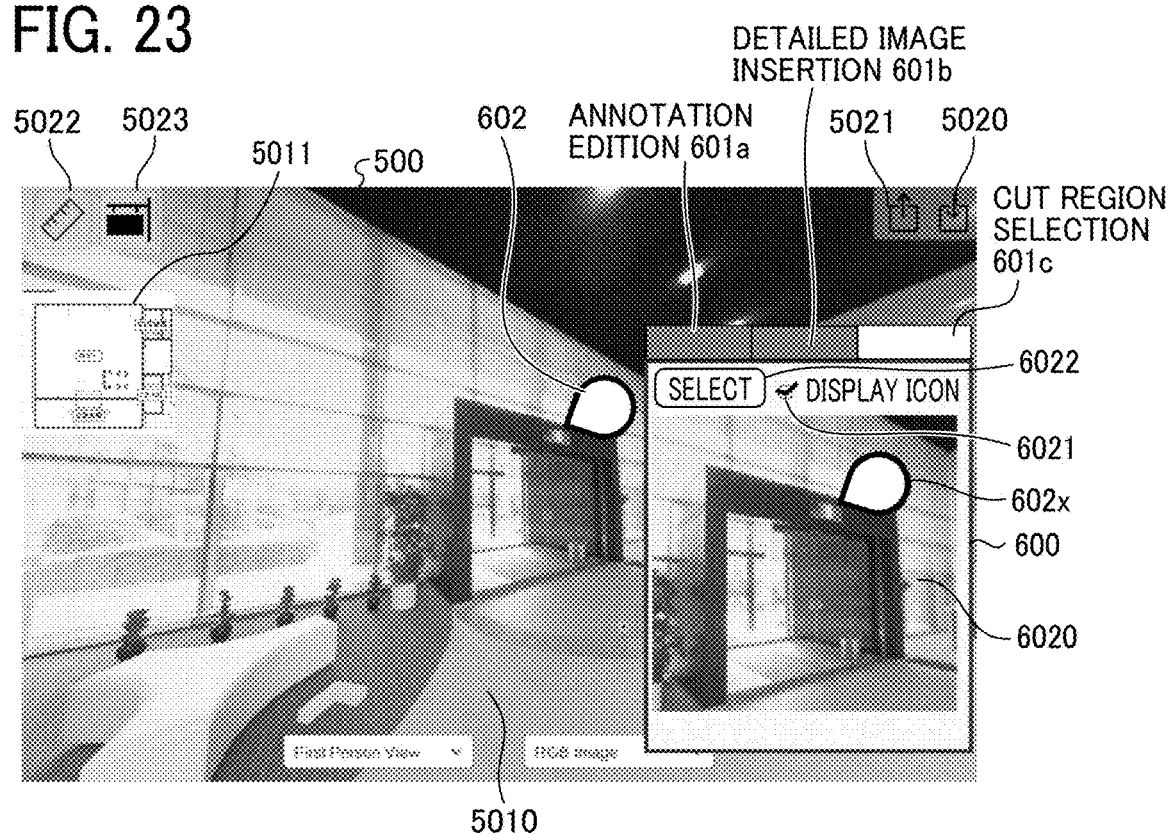
FIG. 23 is an example of a screen displaying a marker on a cut image displayed in a cut image display field according to the first embodiment.

In step S136, as illustrated in FIG. 23, the UI unit 113 displays a marker 602x for the cut image displayed in the cut image display field 6020 at a position corresponding to the position designated in step S103. In this example case, the marker 602x has the same shape of the marker 602 displayed on the partial image 5010, but the marker 602x and marker 602 can be set with different shapes.

After the processing in step S136, the sequence proceeds to step S150, which is described above. Further, if the UI unit 113 determines that the icon is not to be displayed in step S135 (step S135: NO), the sequence proceeds to step S150.

Further, if the button 5021 is operated in step S104, the UI unit 113 determines to save the contents input on the annotation input screen 600 in step S140, and proceeds the sequence to step S141. In step S140, the UI unit 113 instructs the additional information generation unit 112 to store each data, input in the annotation input screen 600.

In step S141, the additional information generation unit 112 generates annotation data based on the data stored in the RAM 1002 by the UI unit 113 by performing the above described processing (e.g., steps S103, S111, S123, S133, and S134) in accordance with the instruction of the UI unit 113. The annotation data is generated or created for each of the positions designated in step S103. Then, the additional information generation unit 112 stores the generated annotation data in, for example, the storage 1004 of the information processing apparatus 100a, but not limited thereto. For example, the additional information generation unit 112 can transmit the generated annotation data to the server 6 via the network 5 to store the generated annotation data in the server 6.

Tables 2 to 7 are examples of configuration of the annotation data according to the first embodiment.

TABLE 2

| Annotation data |
| --- |
| shape data |
| attribute data |
| image region data |
| annotation data ID |

TABLE 3

| Shape data |
| --- |
| primitive type |
| number of vertices |
| list of vertices coordinates |

TABLE 4

| Attribute data |
| --- |
| creator name |
| creation date |
| location |
| target |
| source image |
| survey date |
| response method |
| attribute information list |
| tag |

TABLE 5

| Image region data |
| --- |
| coordinates of upper left vertex |
| coordinates of lower left vertex |
| coordinates of upper right vertex |
| coordinates of lower right vertex |

TABLE 6

| Primitive type |
| --- |
| point |
| line |
| polygon |

TABLE 7

| Attribute information |
| --- |
| type |
| name |
| attribute value list |

Table 2 is an example of a configuration of annotation data. The annotation data includes, for example, shape data, attribute data, image region data, and annotation data ID. Table 3, Table 4, and Table 5 respectively indicate an example of configuration of the shape data, attribute data, and image region data.

Table 3 is an example of the shape data. The shape data indicates a shape formed by the position designated by a user in step S103 in FIG. 16, and includes, for example, items of "primitive type," "number of vertices" and "list of vertices coordinates."

Table 6 is an example of values defined in the item of "primitive type." In this example case, the item of "primitive type" is defined by values of "point," "line" and "polygon." If the value of the item of "primitive type" is "point," the value of "number of vertices" is set to "1." If the value of the item of "primitive type" is "line," the value of "number of vertices" is set to "two or more." Further, if the value of the item of "primitive type" is "polygon," the value of "number of vertices" is set to "three or more."

The item of "list of vertices coordinates" defines each vertex indicated by the item of "vertex number" using ($\varphi$, $\theta$) coordinate system. In this configuration, a closed region, enclosed by straight lines connecting the coordinates listed in the item of "list of vertices coordinates" in the order starting from the beginning of the listed vertices coordinates, becomes a region of "polygons" defined by the primitive type.

In the above described example, since one point is designated in step S103 of FIG. 16, the item of "primitive type" is set to the value of "point" and the number of vertices" is set to "1." Further, the item of "list of vertices coordinates" describes the coordinates of the designated one point alone.

Table 4 is an example of the attribute data. The attribute data includes items, such as "creator name," "creation date," "location," "target," "source image," "survey date," "response method," "attribute information list," and "tag."

The value of the item of "creator name" is acquired from, for example, login information of the information processing apparatus 100*a* or the login information for an input program for implementing the function of the information processing apparatus 100*a* according to the first embodiment. The value of the item of "creation date" is acquired from system time information based on a clock time possessed by the information processing apparatus 100*a*.

The value of the item of "location" is acquired from an image capture position on the floor plan image 5011 if the floor plan image 5011 can be acquired. If the floor plan image 5011 cannot be acquired, the value of the item of "location" can be acquired from the user input.

The value of the item of "target" is acquired from the user input. The value of the item of "source image" uses an image name (file name) that the annotation input screen 600 refers to when the annotation was created. For example, the value of the item of "source image" uses the file name of the cut image file displayed in the cut image display field 6020 described above.

The value of the item of "survey date" is acquired from a timestamp of the image file described in the item of "source image." The value of the item of "response method" is acquired from the user input.

The value of the item of "attribute information list" describes a list of the attribute information illustrated in Table 7. In Table 7, the attribute information includes items, such as "type," "name," and "attribute value list."

The value of the item of "type" is a type of diagnosis target to be diagnosed, such as facilities and findings, and, for example, the value of the input field 6010*a* for inputting the facility type in the annotation input screen 600, illustrated in FIG. 20, is used.

The value of the item of "name" is a specific name of a diagnosis target to be diagnosed, and, for example, the value of the input field 6010*b* used for inputting the product type number in the annotation input screen 600, illustrated in FIG. 20, is used.

As to the value of the item of "attribute value list," for example, the name corresponding to each check box in the input field 6010*c* in the annotation input screen 600, illustrated in FIG. 20, is set as an attribute name, and a value of the check box is set as an attribute value, and then a list of paired attribute names and attribute values is acquired. Each attribute name included in the item of "attribute value list" varies depending on the value of the item of "type."

Returning to the description of Table 4, the value of the item of "tag" is acquired from the user input. For example, as the value of the item of "tag," a value (e.g., remarks) input into the input field 6010*d* in the annotation input screen 600 can be used.

Table 5 illustrates an example of the image region data. The image region data indicates, for example, coordinates of the upper left, lower left, upper right and lower right vertices of the cut image designated in step S132 of FIG. 16 defined by the angular coordinates ($\varphi$, $\theta$) of the full view spherical image 510.

Returning to the description of FIG. 16, in response to the completion of storing the above described annotation data in step S141, the additional information generation unit 112 proceeds the sequence to step S142.

In step S141, the additional information generation unit 112 associates the information (e.g., file name including a path) indicating the full view spherical image 510 already acquired at the time of inputting the annotation data, with the annotation data. As indicated in an example case in FIG. 15A, the additional information generation unit 112 associates the information indicating each of the full view spherical images 510, 510, 510 and so on, corresponding to each of the pin markers 5040-1, 5040-2, 5040-3 and so on, with the annotation data.

In step S142, the UI unit 113 determines whether an end of the annotation input processing by the input program is instructed. For example, after the saving process in step S141, the UI unit 113 displays an end instruction screen for instructing the end or continuation of the annotation input processing. If the UI unit 113 determines that the end of the annotation input processing by the input program is instructed (step S142: YES), the UI unit 113 ends the series of processes in accordance with flowchart of FIG. 16. On the other hand, if the UI unit 113 determines that the continuation of the annotation input process is instructed (step S142: NO), the UI unit 113 proceeds the sequence to step S150.

Output Processing of First Embodiment:

Hereinafter, a description is given of the output processing according to the first embodiment. In the information processing apparatus 100*a*, the output unit 115 creates a report data summarizing a diagnosis result of a diagnosis target based on the annotation data created as described above.

For example, in the information processing apparatus 100*a*, the UI unit 113 reads, for example, the respective annotation data and the respective full view spherical images 510 associated with the respective annotation data in accordance with the operation of the button 5020 on the screen 500. The UI unit 113 cuts out the partial region 511 of the full view spherical image 510, which is one of the read full view spherical images 510, and displays an image of the partial region 511 as the partial image 5010 on the screen 500. In this case, the UI unit 113 displays, for example, the tag corresponding to each annotation data at a position on the partial image 5010 defined by the value of the item of "list of vertices coordinates" set in the shape data of each annotation data.

Figure 24:
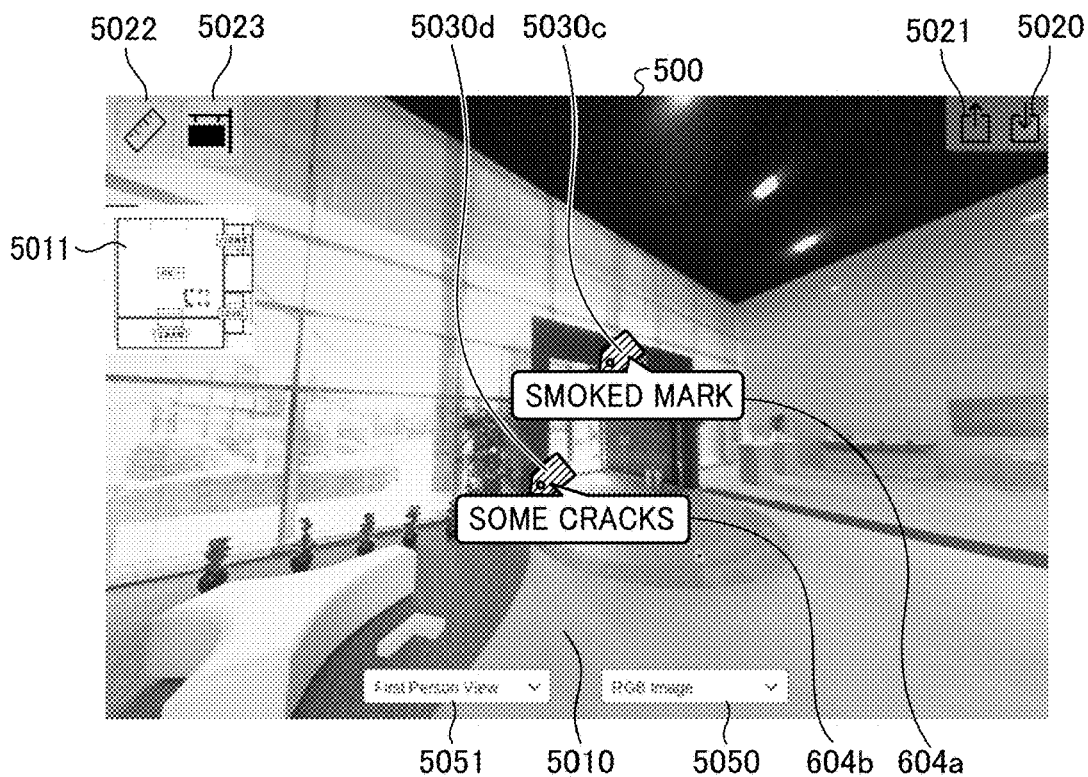
FIG. 24 is an example of a displaying of a screen related to a report data creation according to the first embodiment.

FIG. 24 is an example of a displaying of the screen 500 related to the report data creation according to the first embodiment. In FIG. 24, for example, tags 5030c and 5030d are displayed on the screen 500 in accordance with the item of "tag" included in the attribute data of each annotation data. Further, in correspondence with the tags 5030c and 5030d, the value (e.g., remarks) input to the item of "tag" are displayed as comments 604a and 604b. The output unit 115 creates the report data based on the annotation data corresponding to the designated tag in accordance with the designation of the tags 5030c and 5030d, but not limited thereto.

For example, the output unit 115 can perform a detailed searching based on a condition designated by a user for each item of attribute data of each annotation data and to create the report data based on the annotation data acquired as a result of the searching.

FIG. 25 is an example of the report data according to the first embodiment. In this example case, the report data includes, for example, records including items of "inspection date" and "inspector name," and items of "room name," "diagnosis target," "field photograph," "contents," "necessity of action" and "remarks" for each annotation data.

In the recording of the report data, the items of "inspection date" and "inspector name" can be acquired, for example, by referring to Table 4 described above including the items of "creation date" and "creator name" in the attribute data of the annotation data.

The item of "diagnosis target" in the report data can be acquired from the item of "name" in the item of "attribute information list" in the attribute data of the annotation data, by referring to Table 4 and Table 7.

Further, the items of "room name," "contents," and "necessity of action" in the report data can be acquired from the items of "location," "tag," and "response method" in the attribute data of the annotation data.

Further, the item of "field photograph" is embedded in the report data, for example, by referring Table 4 and embedding an image acquired using the image name described in the item of "source image" in the attribute data of the annotation data.

Further, in the report data, the item of "remarks" can be acquired, for example, in accordance with the user input at the time of creating the report data.

Further, the report data of FIG. 25 is just one example, and each item included in the record data is not limited thereto. Further, each item included in the record data can be changed and set in accordance with the user input.

The output unit 115 outputs the report data created in this manner with a given data format. For example, the output unit 115 can output the report data using any data format of a commercial document creation application program, a table creation application program, an application program for creating presentation materials, and the like. Further, the output unit 115 can output the report data using given data format, which is specialized in printing and displaying, such as portable document format (PDF).

Further, the output unit 115 is not limited to outputting the report data illustrated in FIG. 25. For example, the output unit 115 can associate link information for calling a panoramic automatic tour function (see FIGS. 15B and 15C) starting from the image capture position corresponding to the concerned image, with the image embedded in the item of "field photograph." The UI unit 113 can be configured to display the images representing the report data illustrated in FIG. 25 on the screen 500. When the image to be displayed as the item of "field photograph" is designated by the user operation, the UI unit 113 switches the display of the screen 500 to, for example, the display illustrated in FIG. 15B in accordance with the link information associated with the concerned image, but not limited thereto.

Further, it is also possible to associate an image embedded in the item of "field photograph" with the link information of a specific web site.

Further, in the report data, it is also possible to include an item of "time-series photograph" for embedding a time-series photographs in place of the item of "field photograph." The time-series photographs include, for example, a plurality of images, captured at different times at a specific position in a specific image capture range, and arranged along the image capturing time line, and then the plurality of captured images is stored, for example, in the information processing apparatus 100a in association with the position information indicating the concerned position. When displaying the report data on the screen, the output unit 115 displays the time-series images containing the plurality of images for the item of "time-series photograph." This makes it possible to easily recognize the progress at a work site, such as construction work site. Further, by comparing the images captured at different times, changes over time can be easily confirmed.

In an example of FIG. 24, the annotation data used for creating the report data is designated by designating the tags 5030c and 5030d displayed on the screen 500, but not limited thereto. For example, a list including thumbnail images, comments and attribute information can be created and displayed for each annotation data. The thumbnail image can be generated by reducing the size the cut image.

Further, the comments input by a person other than the report creator (inspector) can be associated with the report data. In this configuration, a designer can respond to the report data created by the inspector and the inspector can further responds to the reply of designer, with which the thread function of comments can be implemented.

Variant Example of First Embodiment:

Hereinafter, a description is given of a variant example according to the first embodiment. In the first embodiment described above, as described with reference to FIGS. 20 to 23, the position is designated using the point in step S103 of FIG. 16, but not limited thereto. For example, the position can be designated using a line and polygon as described with the item of "primitive type" with reference to Table 3 and Table 6.

Figure 26:
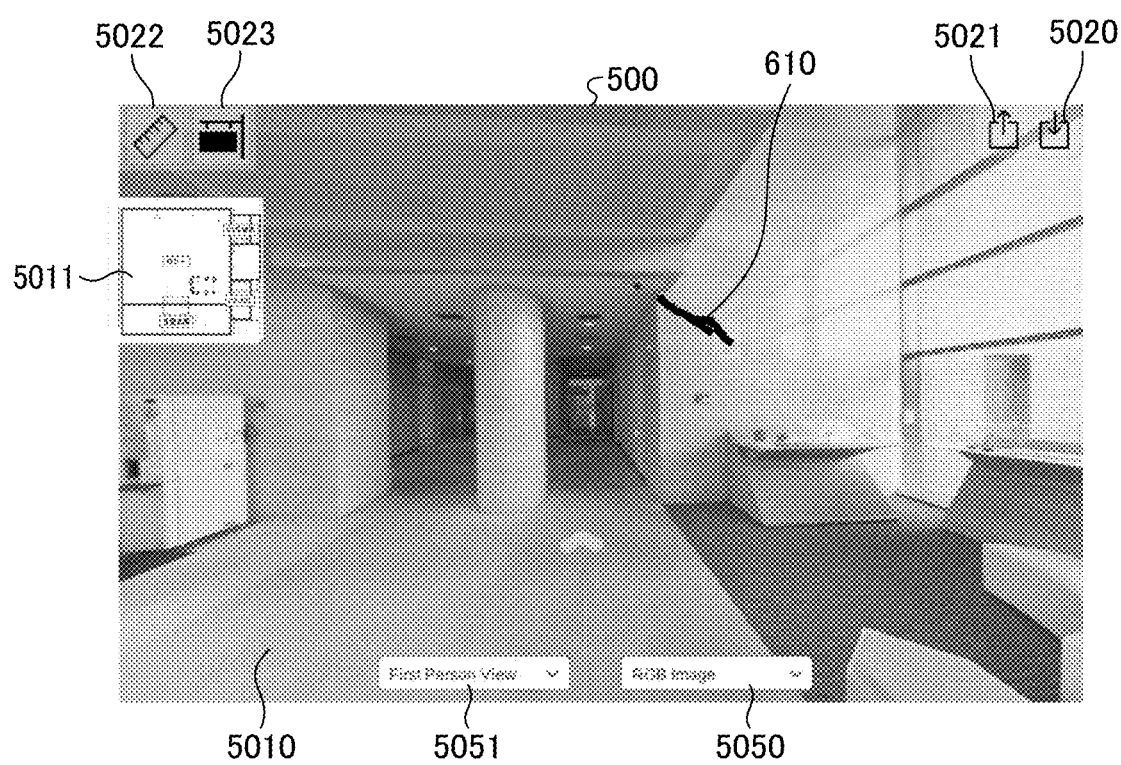
FIG. 26 is an example case when a crack is observed on a wall surface according to a variant example according to the first embodiment.

Hereinafter, a description is given of designating the position using the line in step S103 of FIG. 16. FIG. 26 is an example case when crack 610 is observed on a wall surface, which is applied to a variant example according to the first embodiment. In FIG. 26 and FIGS. 27 to 29 to be described later, portions corresponding to FIGS. 20 to 23 are denoted by the same reference numerals, and a detailed description thereof will be omitted.

In FIG. 26, the crack 610 having a linear shape is observed in the partial image 5010 displayed on the screen 500. In step S103 of FIG. 16, the user designates, for example, an image of the crack 610 on the partial image 5010 displayed on the touch panel 1020 by following or tracing the image of the crack 610 (e.g., dragging operation). The position information indicating the crack 610 is, for example, a set of position information of a plurality of points sequentially adjacent each other, in which each point has a value smaller than a threshold value.

Figure 27:
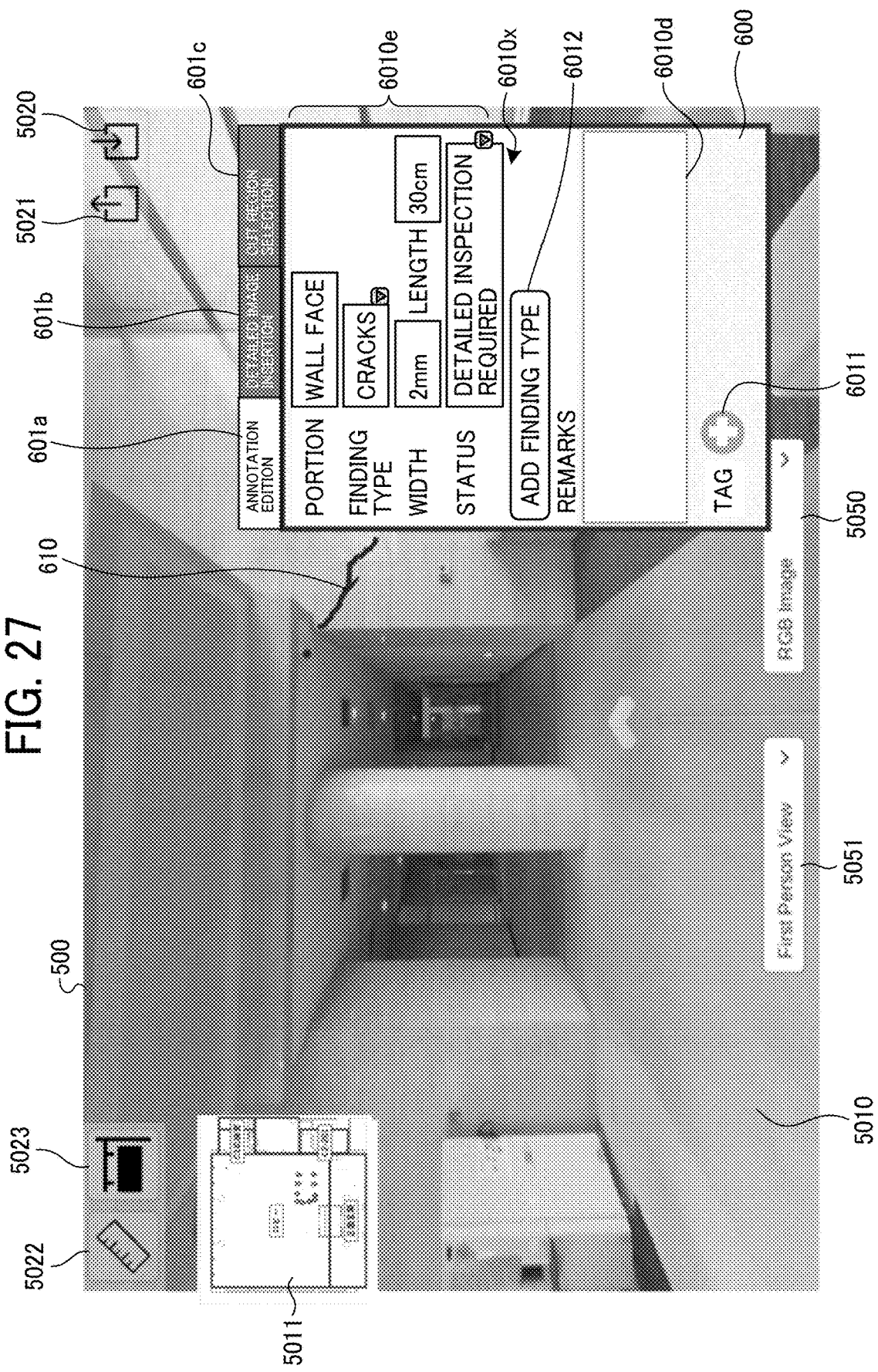
FIG. 27 is an example of an annotation input screen for inputting an annotation for a designated crack according to a variant example according to the first embodiment.

FIG. 27 is an example of the annotation input screen 600 for inputting an annotation for the designated crack 610 according to a variant example of the first embodiment, and FIG. 27 corresponds to FIG. 20 described above. In FIG. 27, the annotation input screen 600 includes, for example, an annotation input field 6010x used for inputting the annotation. In this example case, the annotation input field 6010x includes, for example, input fields 6010d and 6010e.

The input field 6010e is a field for inputting information on a state of findings, to such as the crack 610, and includes input items, such as "portion," "finding type," "width," "length," and "status." Among these input items, the items of "finding type" and "status" are input fields for selecting one of pre-set items using a pull-down menu. Further, the items of "portion," "width" and "length" are input with names and values by a user. The items of "width" and "length" are not fixed to specific values, but the items of "width" and "length" can be corresponded to the contents selected in the item of "finding type."

In the annotation input screen 600 illustrated in FIG. 27, a button 6012 is a button for adding a finding type. In response to an operation of the button 6012, the UI unit 113 adds, for example, a set of the above items of "finding type," "width," "length" and "status" to the annotation input screen 600 and displays values of the added items of "finding type," "width," "length" and "status." The "finding type" means any kind of findings detectable or observable for the structure 4, such as physical objects observed in the structure 4, potential or imminent abnormalities (e.g., initial defects, aging defects, damages, deformations) that may cause problems, and non-abnormalities portions (e.g., stains) that may not cause problems.

Figure 28:
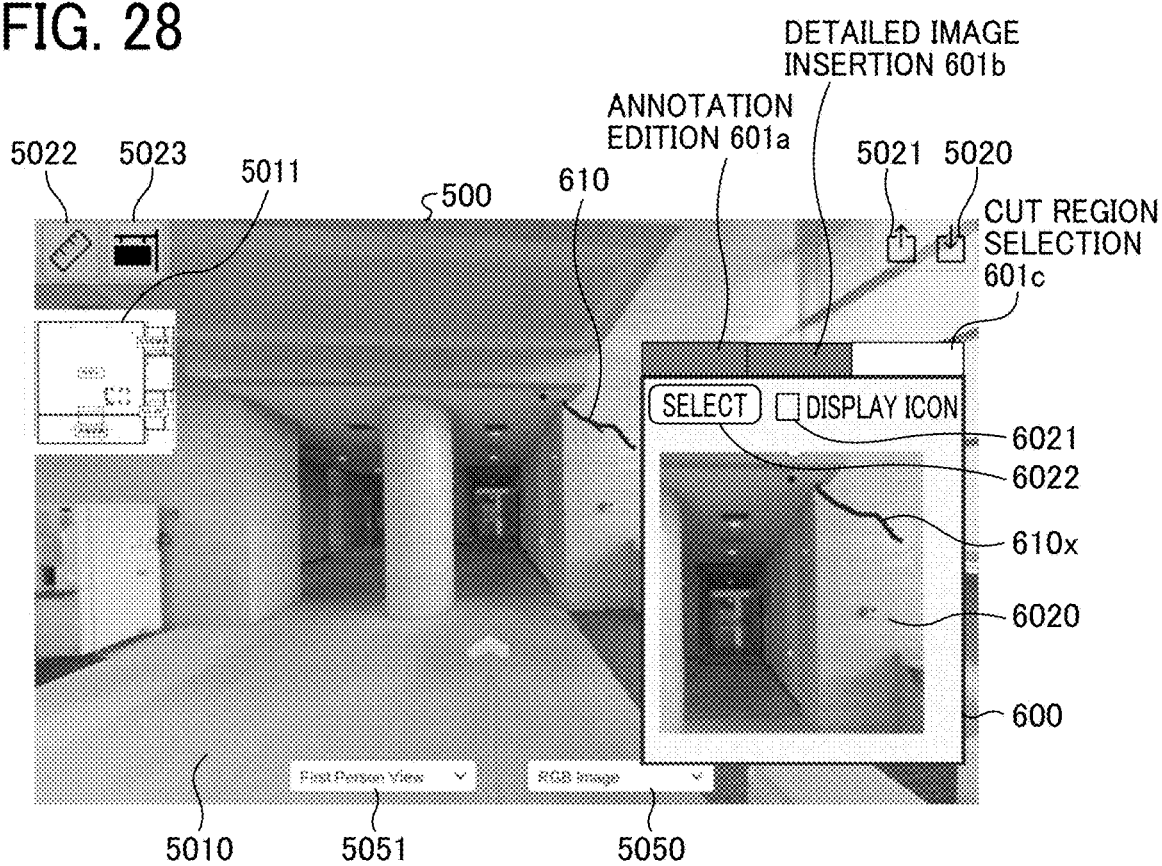
FIG. 28 is an example of an annotation input screen switched to a region designation screen according to a variant example according to the first embodiment.

The designation of the cut region to the position designated by the line (pattern) can be performed in the same manner as described in FIG. 21 and FIG. 22 in the first embodiment. FIG. 28 is an example of switching the annotation input screen 600 to a region designation screen (i.e., annotation input screen 600x), which can be applied to the variant example according to the first embodiment. In this example case, crack 610x corresponding to the crack 610 on the partial image 5010 is displayed in the cut image display field 6020. Other potions in the annotation input screen 600x are the same as the annotation input screen 600 described above in FIG. 21.

Figure 29:
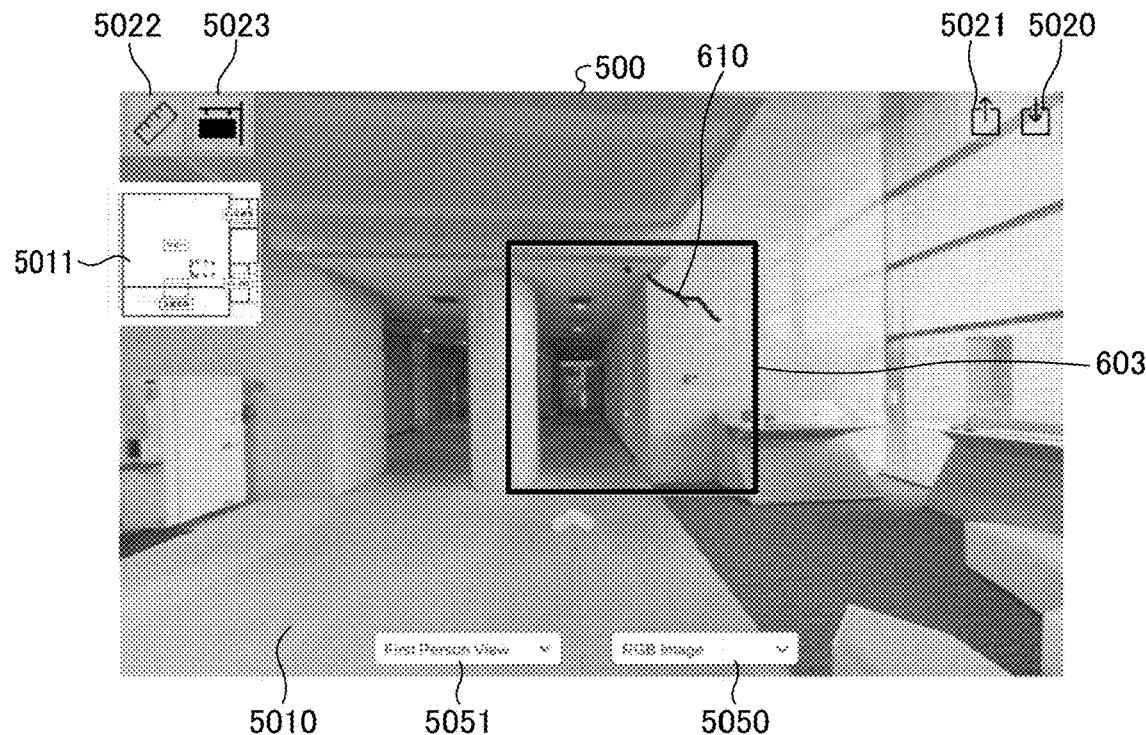
FIG. 29 is an example of displaying of a screen for designating a cut region according to a variant example according to the first embodiment.

Further, FIG. 29 is an example of displaying of the screen 500 for designating the cut region in accordance with an operation on a selection button 6022 according to the variant example of the first embodiment. In this case too, the frame 603 is designated to include the crack 610. If a part or all of the crack 610 is not included (displayed) in the frame 603, the UI unit 113 can display a warning screen indicating that the part or all of the crack 610 is not included (displayed) in the frame 603.

Similarly, the position and the cut region can be designated using the polygon (including a concave polygon), such as a triangle, a pentagon, and so on.

Second Embodiment

Hereinafter, a description is given of a second embodiment. In the first embodiment described above, the annotation data is generated based on the full view spherical image 510 having two-dimensional coordinate information. In contrast, in the second embodiment, a three-dimensional image having three-dimensional coordinate information can be further used for generating the annotation data.

Figure 30:
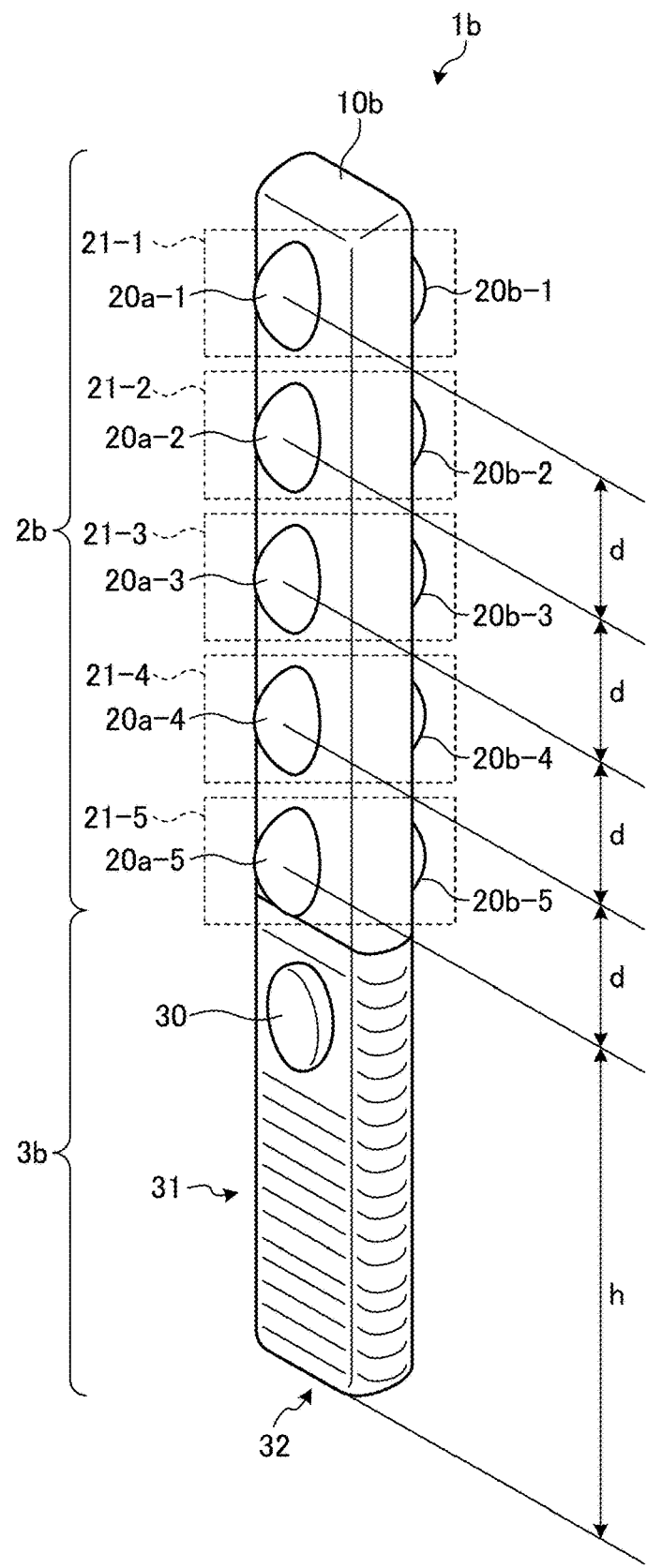
FIG. 30 is an example of a schematic view of an image capture apparatus according to a second embodiment.

Image Capture Apparatus According to Second Embodiment:

FIG. 30 is an example of a schematic view of an image capture apparatus 1b according to the second embodiment. In FIG. 30, the same reference numerals are assigned to the same parts as those in FIG. 1, and detailed descriptions thereof will be omitted. In FIG. 30, the image capture apparatus 1b includes, for example, a plurality of imaging lenses 20a-1, 20a-2, 20a-3, 20a-4, and 20a-5 (five imaging lenses) and a shutter button 30 on a first surface of a housing 10b having substantially rectangular parallelepiped shape. An image capture element respectively corresponding to each of the imaging lenses 20a-1, 20a-2, . . . , 20a-5 is provided in the housing 10b.

Further, a plurality of imaging lenses 20b-1, 20b-2, 20b-3, 20b-4 and 20b-5 (five imaging lenses) are provided on a second surface of the housing 10b, which is the rear side of the first surface. Similar to the imaging lenses 20a-1, 20a-2, . . . , and 20a-5, an image capture element respectively corresponding to each of the imaging lenses 20b-1, 20b-2, . . . , and 20b-5 is provided in the housing 10b.

Each of the imaging lenses 20a-1, 20a-2, . . . , and 20a-5 and each of the imaging lenses 20b-1, 20b-2, . . . , and 20b-5b, which are set at the respective same height from the bottom surface of the housing 10b constitute a pair of imaging lenses (e.g., imaging lenses 20a-1 and 20b-1) to configure image capture units 21-1, 21-2, 21-3, 21-4, and 21-5 as indicated by dot lines in FIG. 30.

Since the imaging lenses 20a-1, 20a-2, . . . , and 20a-5 and the imaging lenses 20b-1, 20b-2, . . . , and 20b-5 are the same as the imaging lenses 20a and 20b described in the first embodiment, a detailed description thereof will be omitted. Further, each of the image capture units 21-1, 21-2, 21-3, 21-4, and 21-5 corresponds to the image capture unit 21 described above.

In the second embodiment, each of the imaging lenses 20a-1, 20a-2, . . . , and 20a-5 is spaced apart equally from the adjacent imaging lens for the distance "d." Further, the imaging lenses 20a-1 and 20b-1, the imaging lenses 20a-2 and 20b-2, the imaging lenses 20a-3 and 20b-3, the imaging lenses 20a-4 and 20b-4, and the imaging lenses 20a-5 and 20b-5 are disposed in the housing 10b, for example, while matching the respective height from the bottom surface of the housing 10b.

Further, the imaging lenses 20a-5 and 20b-5 of the image capture unit 21-5, disposed at the lowest portion of the image capture units 21-1, 21-2, 21-3, 21-4, and 21-5, is positioned at the height "h" from the bottom surface of the housing 10b. Further, for example, each of the imaging lenses 20a-1 to 20a-5 is disposed in the housing 10b by setting the imaging lens 20a-5 at the lowest portion of the imaging lenses 20a-1 to 20a-5 and disposing the imaging lenses 20a-4, 20a-3, 20a-2, and 20a-1 from the bottom side of the housing 10b toward the upper face of the housing 10b while spaced apart equally from the adjacent imaging lens for the distance "d" and aligning the center of the each of the imaging lenses 20a-1 to 20a-5 along the center line of the longitudinal direction of the housing 10b.

The shutter button 30 is a button for instructing an image capture operation using each of the imaging lenses 20a-1, 20a-2, . . . , and 20a-5 and the imaging lenses 20b-1, 20b-2, . . . , and 20b-5, respectively, in accordance with an operation to the shutter button 30. When the shutter button 30 is operated, the image capture operations using the imaging lenses 20a-1, 20a-2, . . . , and 20a-5 and the imaging lenses 20b-1, 20b-2, . . . , and 20b-5 are performed in a synchronized manner.

As illustrated in FIG. 30, the housing 10b of the image capture apparatus 1b includes, for example, an image capture portion 2b, in which each of the image capture units 21-1 to 21-5 is disposed, and an operation portion 3b, in which the shutter button 30 is disposed. The operation portion 3b is provided with a grip portion 31 for holding the image capture apparatus 1b, and a fixing portion 32 for fixing the image capture apparatus 1b to a tripod or the like on the bottom surface of the grip portion 31b.

Although the image capture apparatus 1b includes the five image capture units 21-1 to 21-5, the number of image capture units is not limited thereto. That is, the image capture apparatus 1b can be configured using a plurality of image capture units 21, such as six or more image capture units 21, or two or more image capture units 21.

Figure 31:
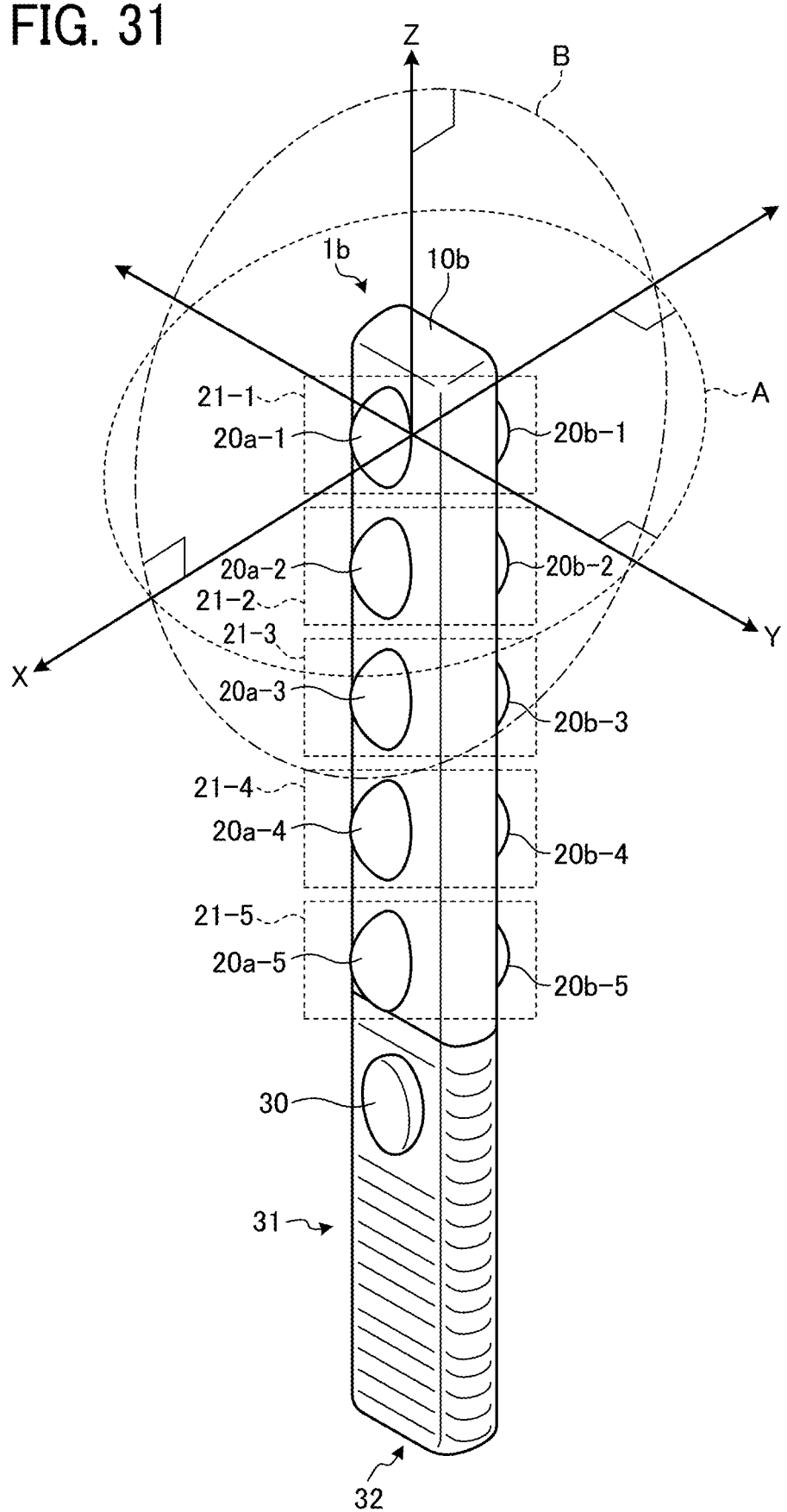
FIG. 31 illustrates an example of an image capture range that can be captured by each of image capture units according to the second embodiment.

FIG. 31 illustrates an example of an image capture range that can be captured by each of the image capture units 21-1, 21-2, 21-3, 21-4, and 21-5 of the image capture apparatus 1b of the second embodiment. Each of the image capture units 21-1, 21-2, 21-3, 21-4, and 21-5 has a similar image capture range. In FIG. 31, the image capture range covered by the image capture units 21-1, 21-2, 21-3, 21-4, and 21-5 is represented by the image capture range of the image capture unit 21-1.

In the following description, as illustrated in FIG. 31, for example, Z-axis is defined in the direction that the imaging lenses 20a-1, 20a-2, . . . , and 20a-5 are aligned, and X-axis is defined in the direction of the optical axes of the imaging lenses 20a-1 and 20b-1. Further, Y-axis is defined in a plane perpendicular to Z axis and intersecting with X axis with the right angle.

The image capture unit 21-1 sets the center of the image capture unit 21-1 as the center of the full view spherical range using a combination of the imaging lenses 20a-1 and 20b-1 to set the image capture range. That is, as described above, the imaging lenses 20a-1 and 20b-1 have an angle of 180 degrees or more, preferably greater than 180 degrees, and more preferably 185 degrees or more. Therefore, by combining the imaging lenses 20a-1 and 20b-1, the image capture range A on the X-Y plane and an image capture range B on the X-Z plane can be set to 360 degrees, and the image capture range of the full view spherical image can be implemented by the combinations of the imaging lenses 20a-1 and 20b-1.

Further, the image capture units 21-1 to 21-5 are arranged in the Z-axis direction, respectively, spaced apart equally from the adjacent image capture units for the distance "d." Therefore, each set of hemispherical images, which are captured using each of the image capture units 21-1, 21-2, 21-3, 21-4, and 21-5 by setting the full view spherical range as the image capture range, becomes images having different viewpoints spaced apart for the distance "d" in the Z-axis direction.

In the second embodiment, the image capture operation using each of the imaging lenses 20a-1 to 20a-5 and the imaging lenses 20b-1 to 20b-5 is performed in a synchronized manner in response to the operation of the shutter button 30. Therefore, by using the image capture apparatus 1b according to the second embodiment, it is possible to obtain five sets of paired hemispherical images captured at the same timing with the different viewpoints spaced apart for the distance "d" in the Z-axis direction for each of the first surface and the second surface of the housing 10b.

The five full view spherical images, each generated from each set of the paired hemispherical images captured at the same timing with the different viewpoints spaced apart for the distance "d" in the Z-axis direction, become the images aligned along the same epipolar line extending in the Z-axis direction.

Figure 32:
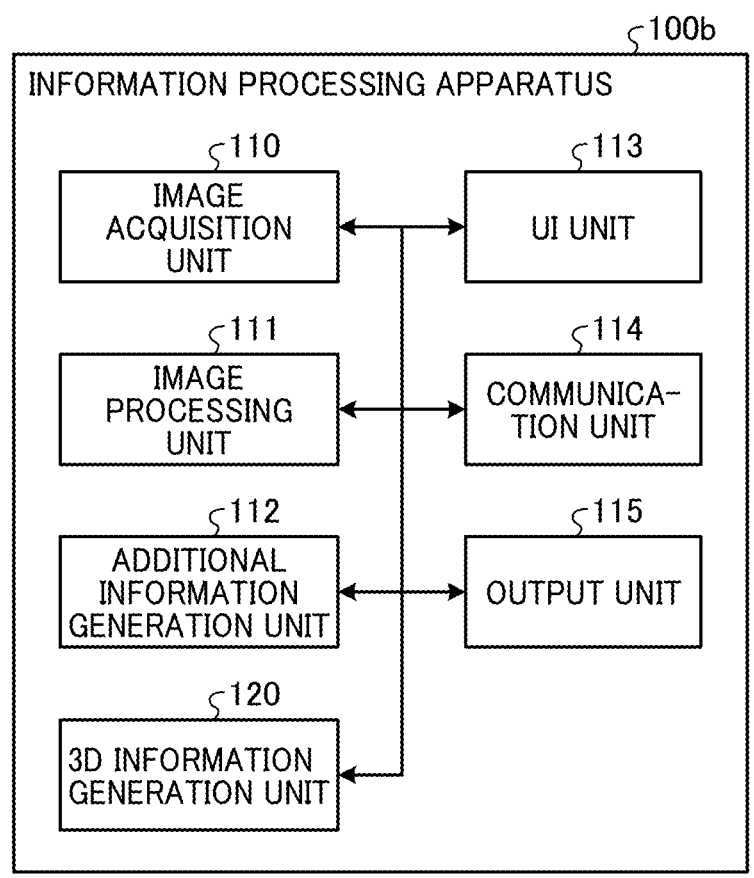
FIG. 32 is an example of a functional block diagram of an information processing apparatus used as an input apparatus for inputting an annotation according to the second embodiment.

Image Processing of Second Embodiment:

Hereinafter, a description is given of the image processing according to the second embodiment. FIG. 32 is an example of a functional block diagram of the information processing apparatus 100b used as an input apparatus for inputting the annotation according to the second embodiment. Since the hardware configuration of the information processing apparatus 100a described with reference to FIG. 6 can be applied as the hardware configuration of the information processing apparatus 100b, a detailed explanation thereof will be omitted. In FIG. 32, the same reference numerals as those in FIG. 7 are denoted by the same reference numerals, and a detailed description thereof will be omitted.

Similar to the information processing apparatus 100a described above, as illustrated in FIG. 32, the information processing apparatus 100b, includes, for example, an image acquisition unit 110, an image processing unit 111, an additional information generation unit 112, a UI unit 113, a communication unit 114, and an output unit 115. The information processing apparatus 100b further includes, for example, a three-dimensional (3D) information generation unit 120.

The image acquisition unit 110 acquires each of the hemispherical images captured by the respective imaging lenses 20a-1 to 20a-5 and the respective imaging lenses 20b-1 to 20b-5 of the image capture apparatus 1b. Based on each hemispherical image acquired by the image acquisition unit 110, the image processing unit 111 generates the five full view spherical images, each having different viewpoints spaced apart for the distance "d" in the Z-axis direction corresponding to each of the image capture units 21-1 to 21-5, by performing the processing described in FIGS. 8 to 12 and calculating the formulas (1) to (9).

Since the image capture apparatus 1b according to the second embodiment assumes that the center line connecting the centers of the imaging lenses 20a-1 to 20a-5 are set parallel to the vertical direction, the inclination correction processing of the respective hemispherical images can be omitted. Further, the inclination correction processing of the respective hemispherical images can be performed by disposing the acceleration sensor 2008 described above in the image capture apparatus 1b, in which the vertical direction is detected based on a detection result of the acceleration sensor 2008, and the inclination of the image capture apparatus 1b in the vertical direction is determined, and then the inclination correction processing is performed.

The UI unit 113 displays each screen 500 described with reference to FIGS. 18, 20 to 23, and 26 to 29 based on the full view spherical image generated from a set of the hemispherical images, for example, a pair of images captured by the image capture unit 21-1 among the five full view spherical images respectively corresponding to each of the image capture units 21-1 to 21-5. The generation of annotation data by the additional information generation unit 112 is also performed based on the full view spherical image generated from the pair of hemispherical images captured by the image capture unit 21-1.

The 3D information generation unit 120 generates three-dimensional information using the five full view spherical images, each having the different viewpoints spaced apart for the distance "d" in the Z-axis direction, which is generated by the image processing unit 111.

Three-dimensional Information Generation Process of Second Embodiment:

Hereinafter, a description is given of a three-dimensional information generation process that is performed by the 3D information generation unit 120 of the second embodiment.

Figure 33A:
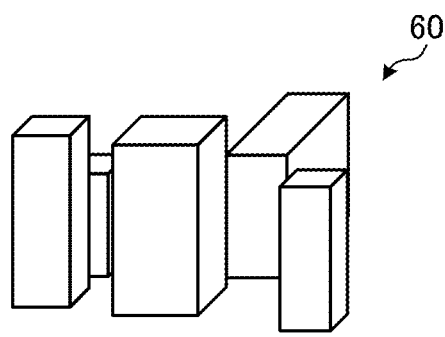
FIGS. 33A, 33B, 33C, 33D, and 33E, and 33F (FIG. 33) illustrate examples of images that are captured from different viewpoints using the image capture apparatus and synthesized at each of image capture units according to the second embodiment.
Figure 33B:
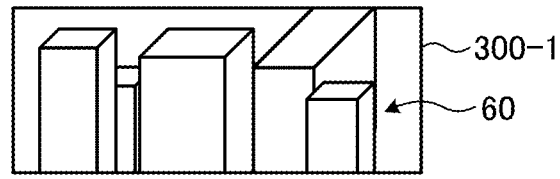
Figure 33C:
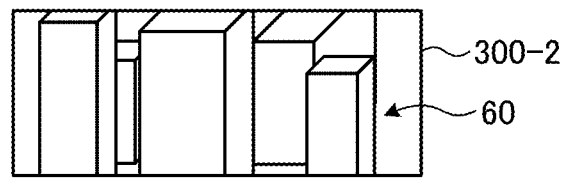
Figure 33D:
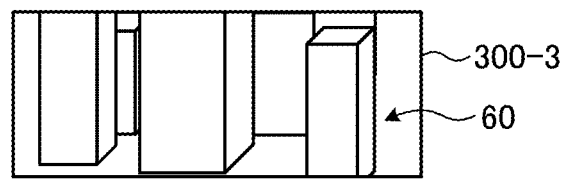
Figure 33E:
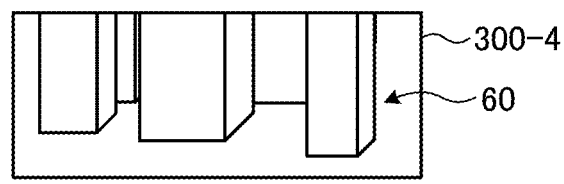
Figure 33F:
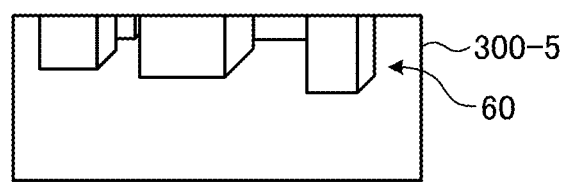

FIGS. 33A, 33B, 33C, 33D, and 33E, and 33F (FIG. 33) illustrate examples of images that are captured from different viewpoints using the image capture apparatus 1b and synthesized by each of the image capture units 21-1, 21-2, 21-3, 21-4, and 21-5. FIG. 33A illustrates an example of a diagnosis target 60. FIGS. 33B, 33C, 33D, 33E and 33F illustrate an example of full view spherical images 300-1, 300-2, 300-3, 300-4, and 300-5, which are generated by capturing images of the same diagnosis target 60 from five different viewpoints and synthesizing the captured images. As illustrated in FIGS. 33B to 33F, each of the full view spherical images 300-1 to 300-5 includes an image of the diagnosis target 60 by slightly shifting the image of the diagnosis target 60 in accordance with the distance "d" set between the adjacent image capture units 21-1 to 21-5.

In FIG. 33, it is assumed that the image capture apparatus 1b captures images of the diagnosis target 60 located at the first face side (front face side) of the image capture apparatus 1b, for the sake the description, but in actual case, the image capture apparatus 1b can capture the images of the diagnosis target 60 surrounding the image capture apparatus 1b. In this case, each of the full view spherical images 300-1 to 300-5 is, for example, an image obtained by, for example, using the equirectangular projection method, in which the left and right sides represent the same position, and the upper side and the lower side each represent each one point, respectively. That is, the full view spherical images 300-1 to 300-5 illustrated in FIGS. 33B to 33F are images generated by the equirectangular projection method, converted and then cut off partially.

Further, the projection method of the full view spherical images 300-1 to 300-5 is not limited to the equirectangular projection method. For example, if the full view spherical images 300-1 to 300-5 are not required to set the greater angle of view in the Z-axis direction, images using cylindrical projection can be used.

Figure 34:
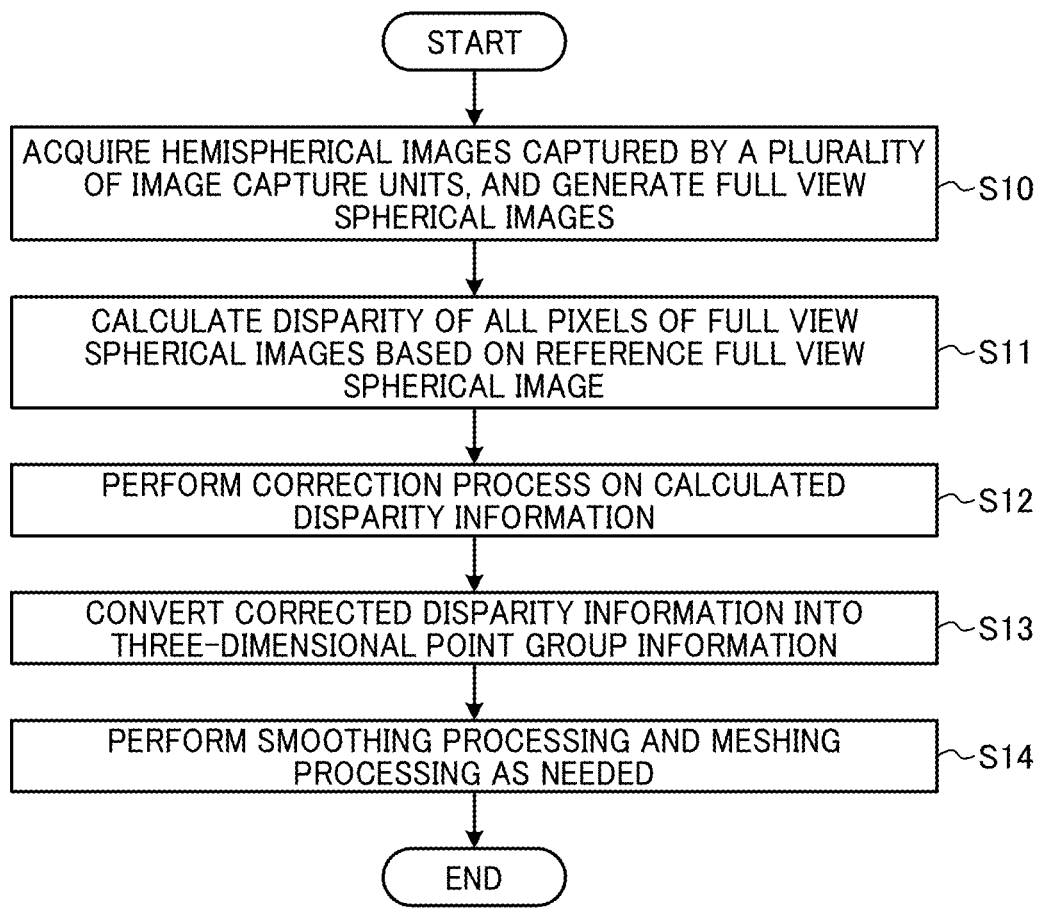
FIG. 34 is an example of a flowchart illustrating the steps of creating a three-dimensional reconstruction model according to the second embodiment.

FIG. 34 is an example of a flowchart illustrating the steps of creating a three-dimensional reconstruction model of the second embodiment. Each of the steps in this flowchart can be performed by the information processing apparatus 100b. Further, it is assumed that the image capture apparatus 1b already stores ten hemispherical images captured by the image capture units 21-1 to 21-5 in a memory disposed in the image capture apparatus 1b.

In step S10, the image acquisition unit 110 acquires each hemispherical image captured by each of the image capture units 21-1 to 21-5 from the image capture apparatus 1b. The image processing unit 111 synthesizes each of the acquired paired hemispherical images for each of the image capture units 21-1 to 21-5 and generates or creates the five full view spherical images, captured from a plurality of viewpoints, as illustrated in FIG. 33.

In step S11, the 3D information generation unit 120 selects one of the full view spherical images 300-1 to 300-5 generated in step S10 as a reference full view spherical image, in which the full view spherical image 300-1 is used as the reference full view spherical image. Then, the 3D information generation unit 120 calculates the disparity of other full view spherical images 300-2 to 300-5 with respect to the selected reference full view spherical image (i.e., full view spherical image 300-1) for all pixels of the full view spherical images.

Figure 35:
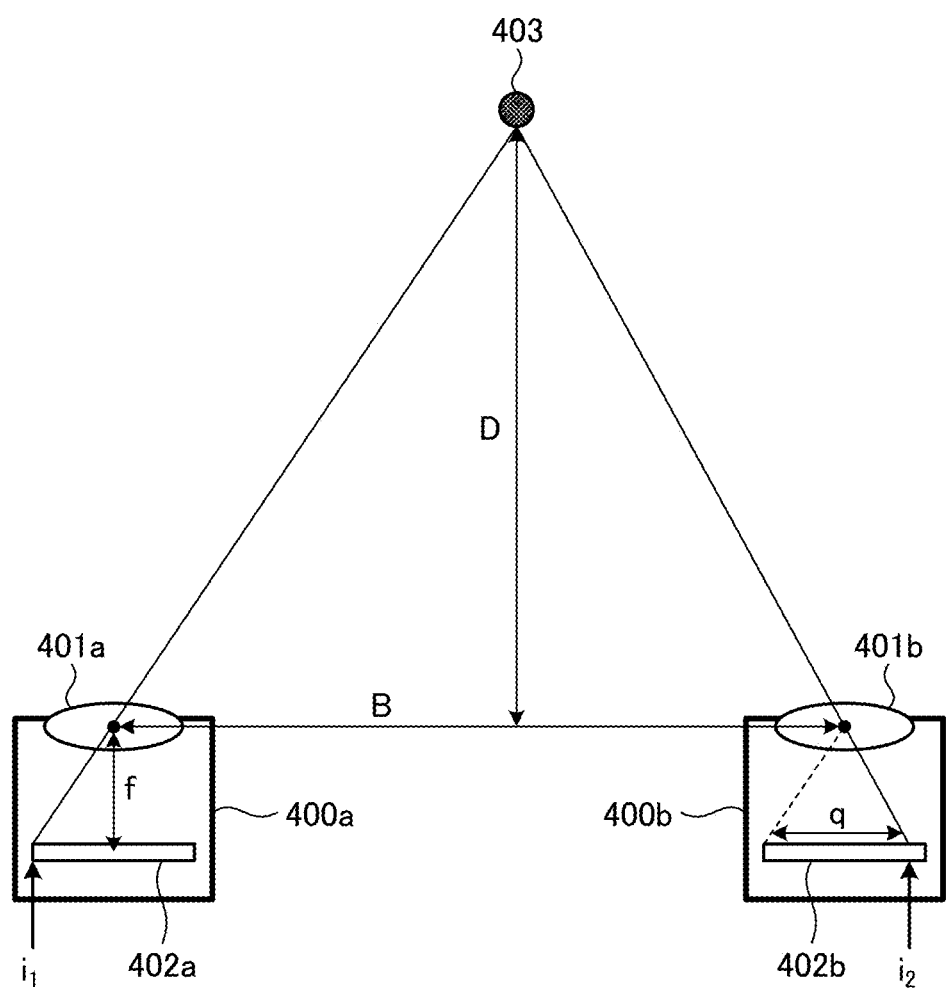
FIG. 35 is an example of a diagram for describing triangular surveying according to the second embodiment.

Hereinafter, a description is given of the principle of a disparity calculation method of the second embodiment. The basic principle of performing the disparity calculation using images captured by an image sensor, such as the image capture element 200a, uses the method of triangular surveying. Hereinafter, a description is given of the triangular surveying with reference to FIG. 35. In FIG. 35, cameras 400a and 400b include lenses 401a and 401b and image capture elements 402a and 402b, respectively. A distance "D" from a line connecting the cameras 400a and 400b to a target 403 is calculated from the image capture position information in the images captured by each of the image capture elements 402a and 402b using the triangular surveying.

In FIG. 35, a value of "f" indicates the focal length of each of the lenses 401a and 401b. Further, a length of the line connecting the optical axis centers of the lenses 401a and 401b is defined as a baseline length "B." The distance "d" between each of the image capture units 21-1 to 21-5 in an example case of FIG. 30 corresponds to the baseline length "B." The difference between the image capture positions "$i_1$ and $i_2$" on the image capture elements 402a and 402b becomes the disparity "q" of the target 403. Since the relationship of "D:f=B:q" is satisfied due to a triangle similarity relationship, the distance "D" can be calculated using the following formula (10).

$$D = \frac{B \times f}{q} \tag{10}$$

Since the focal length "f" and the baseline length "B" are known in the formula (10), a task of processing is calculation of the disparity "q." Since the disparity "q" corresponds to the difference between the image capture position "$i_1$" and the image capture position "$i_2$," the detection of the correspondence relationship of the image capture position in each image captured by the image capture elements 402a and 402b becomes a fundamental task for the disparity calculation. Typically, a matching process for finding a corresponding position between a plurality of images is implemented by searching each disparity on an epipolar line based on an epipolar constraint.

The searching of disparity can be implemented using various computational methods. For example, a block matching process using Normalized Cross Correlation (NCC) indicated by the formula (11) can be applied, but not limited thereto. For example, a high-density disparity calculation process using Semi Global Matching (SGM) can be also applied. The method used for calculating the disparity can be selected appropriately depending on the application field of the three-dimensional reconstruction model that is ultimately generated. In the formula (11), the value "p" represents the pixel position, and the value "q" represents the disparity.

$$C(p, q)_{NCC} = \frac{\sum_{j=0}^{N-1} \sum_{i=0}^{M-1} I(i,j) T(i,j)}{\sqrt{\sum_{j=0}^{N-1} \sum_{i=0}^{M-1} I(i,j)^2 \sum_{j=0}^{N-1} \sum_{i=0}^{M-1} T(i,j)^2}} \tag{11}$$

Based on the cost function, the corresponding relationship of each pixel on the epipolar line is calculated, and the calculation result which is considered to be the most similar is selected. In NCC, that is the formula (11), a pixel position where the numerical value $C(p,q)_{NCC}$ has the maximum cost can be regarded as the corresponding point. In SGM, a pixel position having the minimum cost can be regarded as the corresponding point.

Hereinafter, a description is given of an example of calculating the disparity using NCC of the formula (11). The block matching method acquires pixel values of a region to be cut out as a pixel block of M pixels×N pixels by setting a reference pixel in a reference image as the center of the pixel block, and pixel values of a region to be cut out as a pixel block of M pixels×N pixels by setting a target pixel in a target image as the center of the pixel block. Based on the acquired pixel values, the similarity between the region containing the reference pixel and the region containing the target pixel is calculated. The similarity is compared by shifting the block of M pixels×N pixels in the search target, and the target pixel in the block that is at the position where the similarity becomes the highest is regarded as the corresponding pixel corresponding to the reference pixel.

In the formula (11), the value I(i,j) represents pixel values of pixels in the pixel block in the reference image, and the value T(i,j) represents pixel values of pixels in the pixel block in the target image. The calculation of formula (11) is performed while shifting the pixel block in the target image corresponding to the pixel block of M pixels×N pixels in the reference image with a unit of one pixel to search a pixel position where the numerical value $C(p,q)_{NCC}$ becomes the maximum value.

In a case of using the image capture apparatus 1b according to the second embodiment, the disparity is basically calculated by using the principle of triangular surveying described above. The image capture apparatus 1b includes, for example, five image capture units 21-1 to 21-5, with which the five full view spherical images 300-1 to 300-5 can be captured. That is, the image capture apparatus 1b can simultaneously capture three or more images at the same time. Therefore, in the second embodiment, the above described principle of triangular surveying is extended and applied.

For example, as indicated in the formula (12), by calculating the sum of the disparity "q" of the cost for each camera spaced apart for the baseline length "B," the corresponding points in each image captured by each camera can be detected.

$$\sum_B 1 C_{NCC} \qquad (12)$$

As one example, it is assumed that a first, a second and a third cameras are arranged on an epipolar line in the order of the first camera, the second camera, and the third camera. In this case, the cost calculation is performed using the above-described NCC and SGM for each of a set of the first camera and the second camera, a set of the first camera and the third camera, and a set of the second camera and the third camera, respectively. The distance "D" to the target can be calculated by calculating the sum of the cost calculated for each of the pairs of cameras as the total cost and then calculating the minimum value of the total cost.

The matching process described above can be also applied to the matching process in the automatic estimation function of the image capturing position described with reference to FIG. 15A.

Further, as a method of calculating the disparity, a stereo image measurement method using the epipolar plane image (EPI) can be applied. For example, the full view spherical images 300-1 to 300-5 generated from the images captured by each of the image capture units 21-1 to 21-5 can be regarded as images captured by a camera that moves at a constant velocity to create the EPI. By using the EPI, the searching of the corresponding points between the full view spherical images 300-1 to 300-5 can be performed easily, for example, compared to the method using the triangular surveying described above.

For example, in the image capture apparatus 1b, by setting the image capture unit 21-1 as the reference image capture unit, the distances d1-2, d1-3, d1-4 and d1-5 between the image capture unit 21-1 and each of the image capture units 21-2 to 21-5 are calculated. Based on the calculation results, a three-dimensional space image having the horizontal and vertical axes (x, y) and the distance D (=0, d1-2, . . . , d1-5) of the full view spherical images 300-1 to 300-5 is created. Then, a cross-section image on the y-D plane of the three-dimensional space image is created as the EPI.

In the EPI created as above described, the points on an object existing in each of the original full view spherical images 300-1 to 300-5 are represented as a single straight line. The slope of the straight line changes in accordance with the distance from the image capture apparatus 1b to the point on the object. Therefore, by detecting the straight line included in the EPI, the corresponding points between the full view spherical images 300-1 to 300-5 can be determined. Further, the distance from the image capture apparatus 1b to the object corresponding to the straight line can be calculated based on the inclination of the straight line.

Figure 36A:
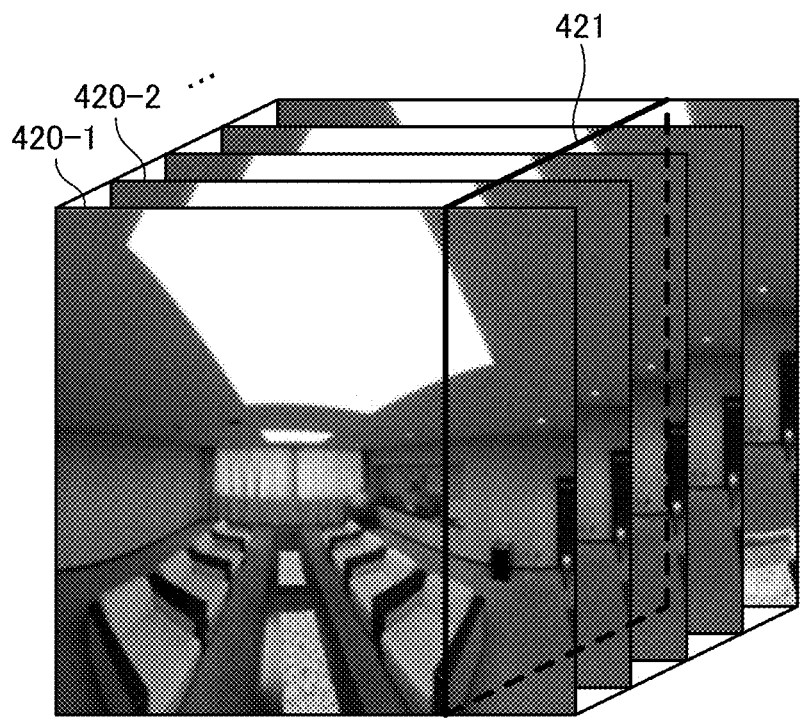
FIGS. 36A and 36B (FIG. 36) are an example of diagrams for describing the principle of epipolar plane image (EPI) according to the second embodiment.
Figure 36B:
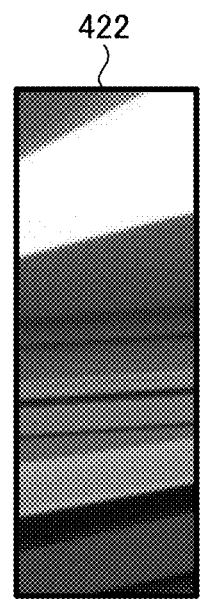

Hereinafter, a description is given of the principle of EPI with reference to FIGS. 36 and 37. FIG. 36A illustrates a set of a plurality of images 420-1, 420-2, . . . , each of which is a cylindrical image. FIG. 36B schematically illustrates an EPI 422 cut as a plane 421 from the set of images 420-1, 420-2, . . . . In an example of FIG. 36A, the image capture position axes of the images 420-1, 420-2, . . . , are set in the depth direction, and the sets of the images 420-1, 420-2, . . . are superimposed on each other to generate three-dimensional data as illustrated in FIG. 36A. When the sets of the images 420-1, 420-2, . . . generated as the three-dimensional data is cut along the plane 421 parallel to the depth direction, the EPI 422 illustrated in FIG. 36B is generated.

In other words, the lines having the same X coordinate are extracted from each of the images 420-1, 420-2, . . . , and each of the extracted lines are arranged using the respective images 420-1, 420-2, . . . , respectively containing the each of the extracted lines as the X coordinates to generate the EPI 422.

Figure 37A:
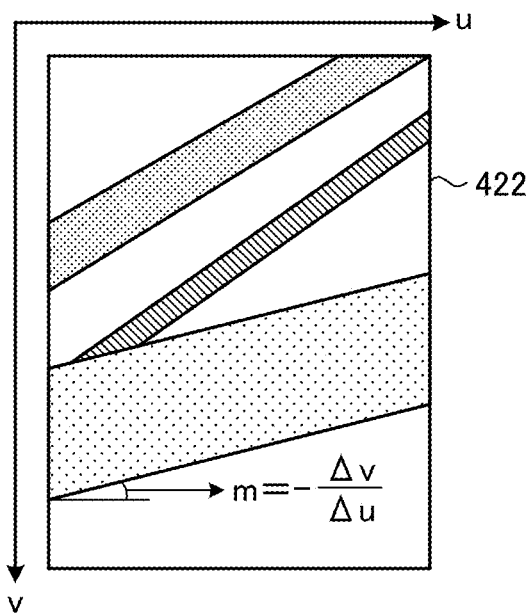
FIGS. 37A and 37B (FIG. 37) are another example of diagrams for describing the principle of epipolar plane image (EPI) according to the second embodiment.

FIG. 37 is a diagram illustrating the principle of EPI of the second embodiment. FIG. 37A schematically illustrates the EPI 422 of FIG. 36A. In FIG. 37A, the horizontal axis "u" represents the depth direction in which each image 420-1, 420-2, . . . are superimposed, and indicates the disparity while the vertical axis "v" represents the vertical axis of each of the images 420-1, 420-2, . . . . The EPI 422 means an image superimposing the captured images in the direction of the baseline length "B."

Figure 37B:
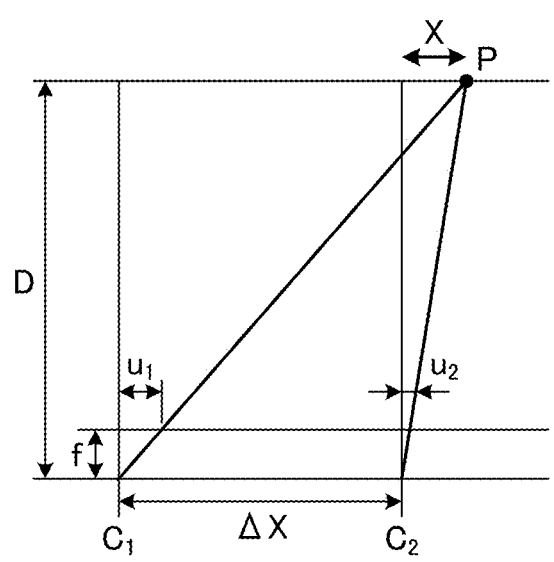

The change in the baseline length "B" is represented by the distance ΔX in FIG. 37B. In FIG. 37B, positions C1 and C2 respectively correspond to the optical centers of the lenses 401a and 401b in FIG. 35. In FIG. 37B, positions u1 and u2 are positions respectively defined with respect to the positions C1 and C2 set as the reference position, and respectively correspond to the image capture positions "$i_1$" and "$i_2$" in FIG. 35.

When the each of the images 420-1, 420-2 and so on are arranged along the direction of the baseline length "B," the positions of the corresponding points in the respective images 420-1, 420-2 and so on can be represented by a straight line having the inclination "m" or a curved line on the EPI 422. The inclination "m" becomes the disparity "q" to be used for calculating the distance "D." The inclination "m" becomes smaller as the distance "D" is closer, and the inclination "m" becomes larger as the distance "D" is farther. The straight line and the curved line having the different inclination "m" depending on the distance "D2 is referred to as a feature point locus.

The inclination "m" is represented by the following formula (13). In the formula (13), the value Δu is a difference between the position u1 and the position u2, each of which is the image capture point in FIG. 37B, and the value Δu can be calculated using the formula (14). The distance "D" can be calculated from the slope "m" using the formula (15). In the formulas (13), (14) and (15), the value "v" represents the moving velocity of the camera, and the value "f" indicates the frame rate of the camera. That is, the formulas (13), (14) and (15) are calculation formulas when the omnidirectional image is captured with the frame rate "f" while moving the camera at the constant velocity "v."

$$m = -\frac{\Delta v}{\Delta u} = \frac{-\Delta v}{-\frac{f\Delta X}{D}} = \frac{-\Delta v}{f\Delta X}D \quad (13)$$

$$\Delta u = u2 - u1 = \frac{fx}{D} - \frac{f(\Delta X + X)}{D} = \frac{-f\Delta X}{D} \quad (14)$$

$$D = \frac{f\Delta X}{-\Delta v}m \quad (15)$$

Figure 38:
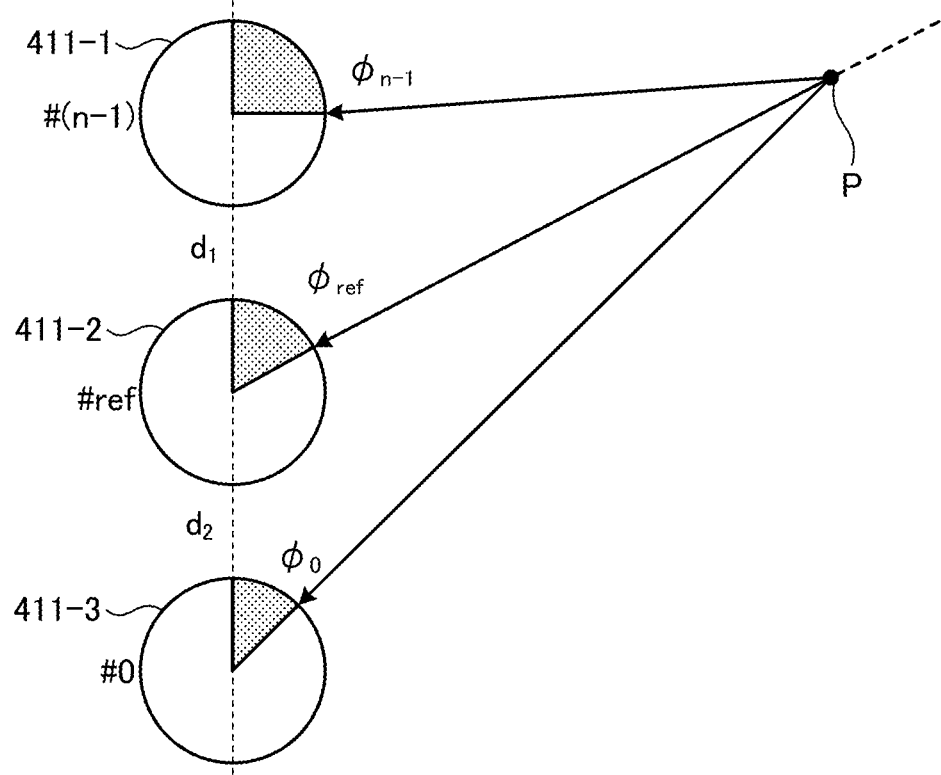
FIG. 38 is an example of a diagram for describing a point where a slope "m" becomes a value based on a curve when an EPI is composed of omnidirectional image according to the second embodiment.

When the omnidirectional image is used as the image constituting the EPI, the inclination "m" takes a value based on the curve. A description is given with reference to FIGS. 38 and 39. In FIG. 38, spheres 411-1, 411-2 and 411-3 indicates a full view spherical image captured by a camera #0, a camera #ref, and a camera #(n−1) having the structure of the image capture unit 21 and disposed on a straight line. The interval (baseline length) between the camera #0 and the camera #ref is set to distance "d2," and the interval (baseline length) between the camera #ref and the camera #(n−1) is set to distance "d1." Hereinafter, the spheres 411-1, 411-2, and 411-3 are referred to as the full view spherical images 411-1, 411-2, and 411-3, respectively.

The image capture position on the full view spherical image 411-1 of a target point P becomes a position having an angle $\varphi_{n-1}$ relative to the straight line where each of the cameras #0, #ref, and #(n−1) are disposed. Similarly, the image capture positions on the full view spherical images 411-2 and 411-3 of the target point P become positions respectively having an angle $\varphi_{ref}$ and an angle $\varphi_0$ with respect to the straight line.

Figure 39:
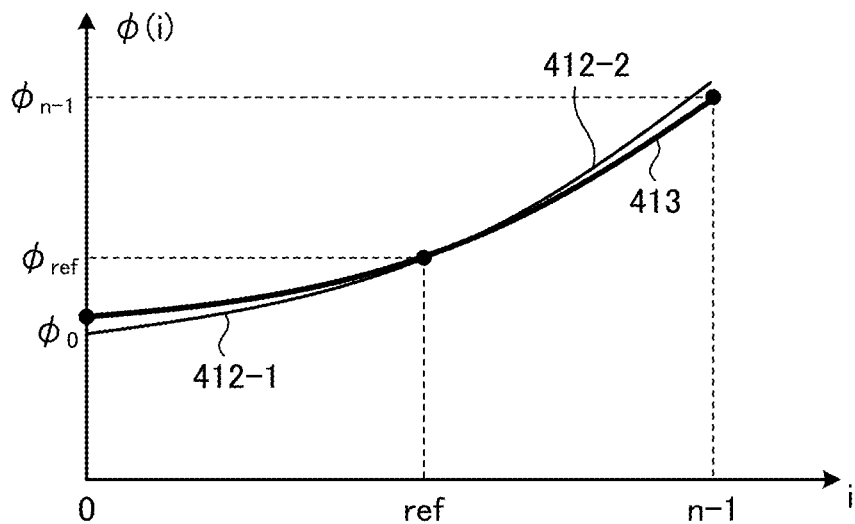
FIG. 39 is an example of another diagram for describing a point where a slope "m" becomes a value based on a curve when an EPI is composed of omnidirectional image according to the second embodiment.

FIG. 39 is an example of a profile plotting the angles $\varphi_0$, $\varphi_{ref}$ and $\varphi_{n-1}$ on the vertical axis, and plotting the positions of each of the cameras #0, #ref, and #(n−1) on the horizontal axis. As indicated in FIG. 39, the image capture position at each of the full view spherical images 411-1, 411-2 and 411-3, and the feature point locus indicated as the positions of each of the cameras #0, #ref, and #(n−1) do not become the straight line but become an approximated curve 413 based on the straight lines 412-1 and 412-2 connecting each of the points.

When calculating the disparity "q" of the entire circumference using the full view spherical images 300-1 to 300-5, a method of searching the corresponding points on the approximated curve 413 directly from the full view spherical images 300-1 to 300-5 can be used as described above, or a method of converting the full view spherical images 300-1 to 300-5 into images using the pinhole projection system and searching the corresponding points based on the converted image can be used.

In an example case in FIG. 38, the full view spherical image 411-2 is set as the reference image (ref) among the full view spherical images 411-1, 411-2 and 411-3, and the full view spherical image 411-1 is set as the (n−1)th target image, and the full view spherical image 411-3 is set as the zero-th target image. Based on the full view spherical image 411-2, which is the reference image, the corresponding points of the full view spherical images 411-1 and 411-3 are respectively represented by the disparity $q_{n-1}$ and disparity $q_0$. The disparities $q_{n-1}$ and $q_0$ can be determined by using various known techniques, such as the above formula (11).

By using the EPI to create the three-dimensional reconstruction model, a large amount of the omnidirectional images can be uniformly processed. Further, by using the inclination "m," the calculation is not limited to the corresponding points so that the processing becomes robust.

Returning to the flowchart of FIG. 34, the 3D information generation unit 120 proceeds the sequence to step S12 after the disparity calculation in step S11.

In step S12, the 3D information generation unit 120 performs correction processing on the disparity information indicating the disparity calculated in step S11. As to the correction processing of the disparity information, the correction based on the Manhattan-world hypothesis, the line segment correction, and the like can be applied.

In step S13, the 3D information generation unit 120 converts the disparity information corrected in step S12 into three-dimensional point group information.

In step S14, the 3D information generation unit 120 performs one or more processing, such as smoothing processing, meshing processing, and the like on the three-dimensional point group information, converted from the disparity information in step S13, as needed. By performing the sequence of steps S10 to S14, the three-dimensional reconstruction model based on each of the full view spherical images 300-1 to 300-5 can be generated.

The sequence of steps S11 to S14, which are described above, can be performed using structure-from-motion (SFM) software, multi-view stereo (MVS) software, and the like distributed as the open source. The programs that are input and operated in the information processing apparatus 100b include, for example, SFM software, MVS software, and the like.

Figure 40:
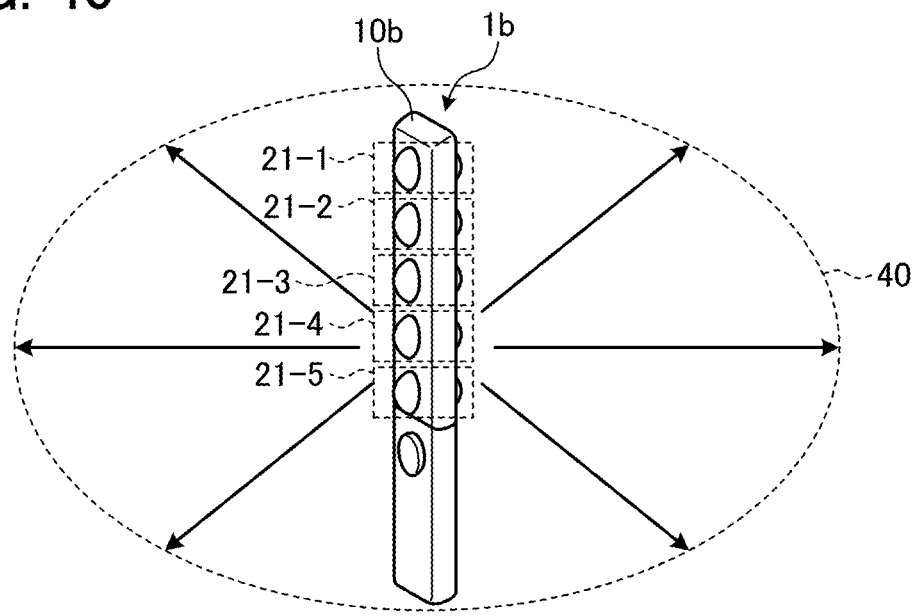
FIG. 40 is an example of a diagram of a plane in which disparity is preferentially calculated based on an image captured by the image capture apparatus according to the second embodiment.

As described with reference to FIG. 31, the image capture apparatus 1b includes each of the image capture units 21-1 to 21-5 disposed along on the Z axis. Therefore, the distance from the image capture apparatus 1b to a target object is preferentially calculated in the radial direction on a plane 40 (see FIG. 40), which is orthogonal to the direction aligning each of the imaging lenses 20a-1 to 20a-5. The preferentially means the generation capability of the three-dimensional reconstruction model with respect to the angle of view.

That is, as to each direction (radial direction in FIG. 40) on the plane 40, the angle of view by each of the image capture units 21-1 to 21-5 can include an entire circumference of 360 degrees, and the distance can be calculated for the entire circumference. On the other hand, in the Z-axis direction, the overlapping portions of the angle of view (image capture range) by each of the image capture units 21-1 to 21-5 are increased. Therefore, in the Z-axis direction, the disparity becomes smaller among the full view spherical images 300-1 to 300-5 generated from the images captured by each of the image capture units 211 to 215 near the angle of view of 180 degrees. Therefore, it is difficult to calculate the distance around the entire circumference of 360 degrees in the direction of the plane including the Z axis.

Figure 41:
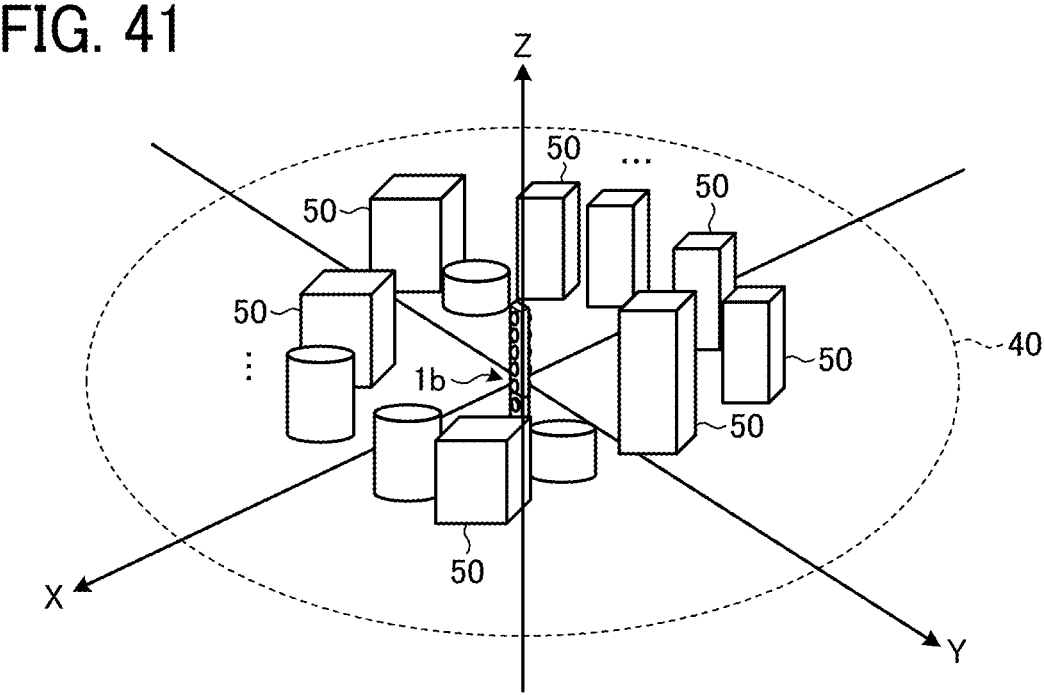
FIG. 41 is an example of a diagram of a large space including large buildings as target objects for creating a three-dimensional reconstruction model according to the second embodiment.

As illustrated in FIG. 41, a large space including large buildings 50, 50, 50, and so on is considered as a target of creating the three-dimensional regenerated model. In FIG. 41, the X-axis, Y-axis, and Z-axis correspond to the X-axis, Y-axis, and Z-axis illustrated in FIG. 31. In this example case, the modeling for the total angle of view (360 degrees) becomes the direction of the plane 40 represented by the X-Y axes. Therefore, it is preferable to arrange a plurality of image capture units 21-1 to 21-5 in the Z-axis direction that is orthogonal to the plane 40.

Figure 42:
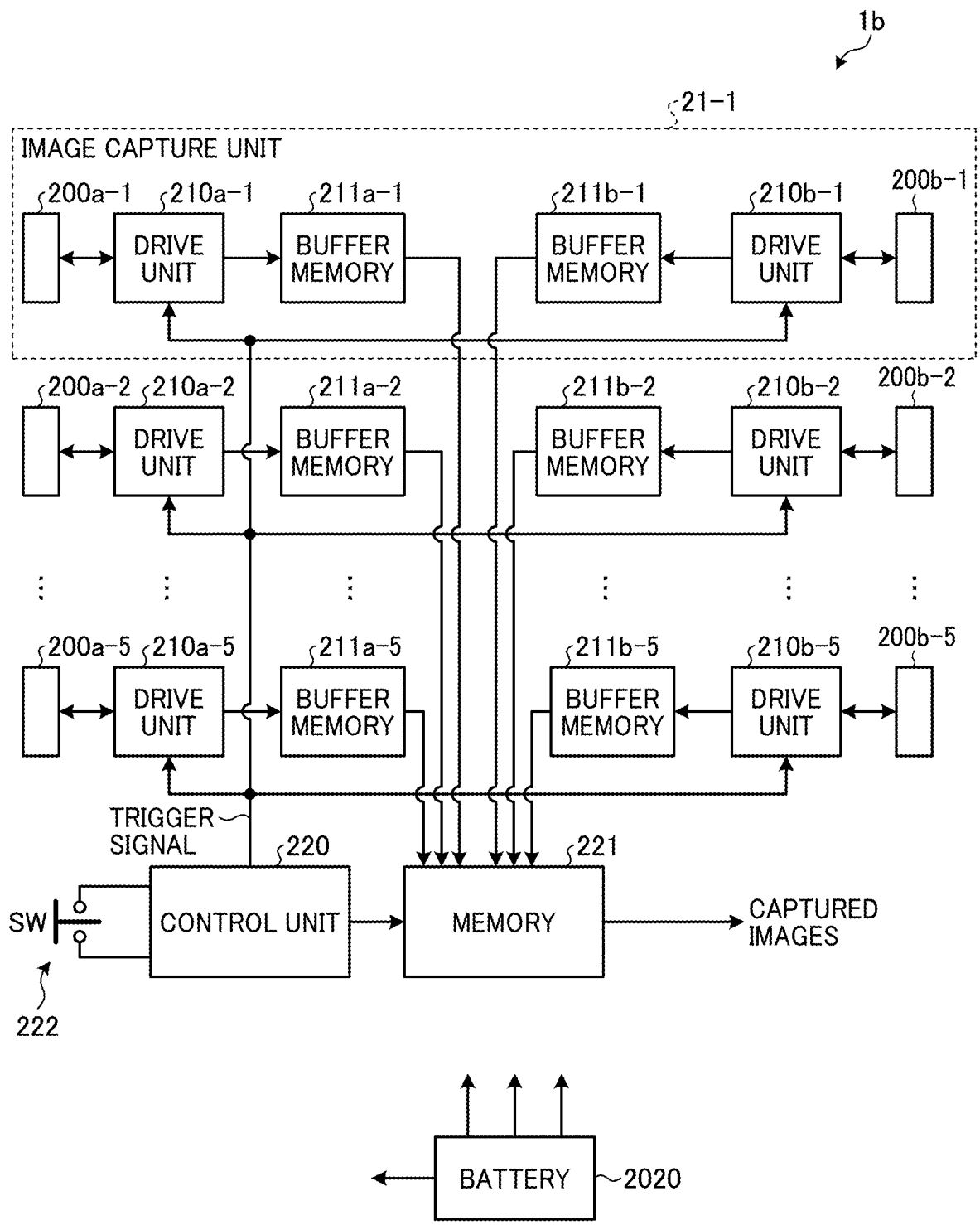
FIG. 42 is an example of a hardware block diagram of the image capture apparatus according to the second embodiment.

Configuration of Signal Processing of Image Capture Apparatus of Second Embodiment:

Hereinafter, a description is given of a configuration for signal processing of the image capture apparatus 1b according to the second embodiment with reference to FIG. 42. FIG. 42 is an example of a hardware block diagram of the image capture apparatus 1b according to the second embodiment. In FIG. 42, portions corresponding to FIG. 30 are denoted by the same reference numerals, and a detailed description thereof will be omitted.

As illustrated in FIG. 42, the image capture apparatus 1b includes, for example, image capture elements 200a-1, 200a-2, . . . , and 200a-5, image capture elements 200b-1, 200b-2, . . . , and 200b-5, drive units 210a-1, 210a-2, . . . , and 210a-5, drive units 210b-1, 210b-2, . . . , and 210b-5, buffer memories 211a-1, 211a-2, . . . , and 211a-5, and buffer memories 211b-1, 211b-2, and 211b-5.

The image capture elements 200a-1, 200a-2, . . . , and 200a-5, the drive units 210a-1, 210a-2, . . . , and 210a-5, and the buffer memories 211a-1, 211a-2, . . . , and 211a-5 are respectively corresponding to the imaging lenses 20a-1, 20a-2, . . . , and 20a-5, and included in the image capture units 21-1, 21-2 . . . , and 21-5. In FIG. 42, the image capture unit 21-1 of the image capture units 21-1 to 21-5 is illustrated in order to avoid complexity.

Similarly, the image capture elements 200b-1, 200b-2, . . . , and 200b-5, the drive units 210b-1, 210b-2, . . . , and 210b-5, and the buffer memories 21b-1, 211b-2, . . . , and 211b-5 are respectively corresponding to the imaging lenses 20b-1, 20b-2, . . . , and 20b-5, and included in the image capture units 21-1, 21-2 . . . , and 21-5.

The image capture apparatus 1b further includes, for example, a control unit 220, a memory 221, and a switch (SW) 222. The switch 222 corresponds to the shutter button 30 illustrated in FIG. 30. For example, if the switch 222 is in a closed state, the shutter button 30 is in a state that the shutter button 30 is operated.

Hereinafter, the image capture unit 21-1 is described. The image capture unit 21-1 includes, for example, the image capture element 200a-1, the drive unit 210a-1, the buffer memory 211a-1, the image capture element 200b-1, the drive unit 210b-1, and the buffer memory 211b-1.

Since the drive unit 210a-1 and the image capture element 200a-1, and the drive unit 210b-1 and the image capture element 200b-1 are equivalent to the drive unit 210a and the image capture element 200a, and the drive unit 210b and the image capture element 200b, described with reference to FIG. 4, a detailed explanation thereof will be omitted here.

The buffer memory 211a-1 is a memory capable of storing the captured image for at least one frame. The captured image output from the drive unit 210a-1 is temporarily stored in the buffer memory 211a-1.

Since the functions of the image capture units 21-2 to 21-5 are equivalent to those of the image capture unit 21-1, the description thereof will be omitted here.

The control unit 220 controls the overall operation of the image capture apparatus 1b. When the control unit 220 detects a transition of the switch 222 from the open state to the closed state, the control unit 220 outputs trigger signals. The trigger signals are simultaneously supplied to each of the drive units 210a-1, 210a-2, . . . , 210a-5, and each of the drive units 210b-1, 210b-2, . . . , 210b-5.

Under the control of the control unit 220 in accordance with the output of the trigger signals, the memory 221 reads each captured image from each of the buffer memories 211a-1, 211a-2, . . . , 211a-5, and each of the buffer memories 211b-1, 211b-2, . . . , 211b-5, and stores each of the captured images. Each of the captured image stored in the memory 221 can be read by the information processing apparatus 100b connected to the image capture apparatus 1b.

The battery 2020 is, for example, a secondary battery, such as a lithium ion secondary battery, and is used as a power supply unit for supplying electric power to each unit of the image capture apparatus 1b that needs to be supplied with power. The battery 2020 includes, for example, a charge/discharge control circuit for controlling charge and discharge to and from the second battery.

Figure 43:
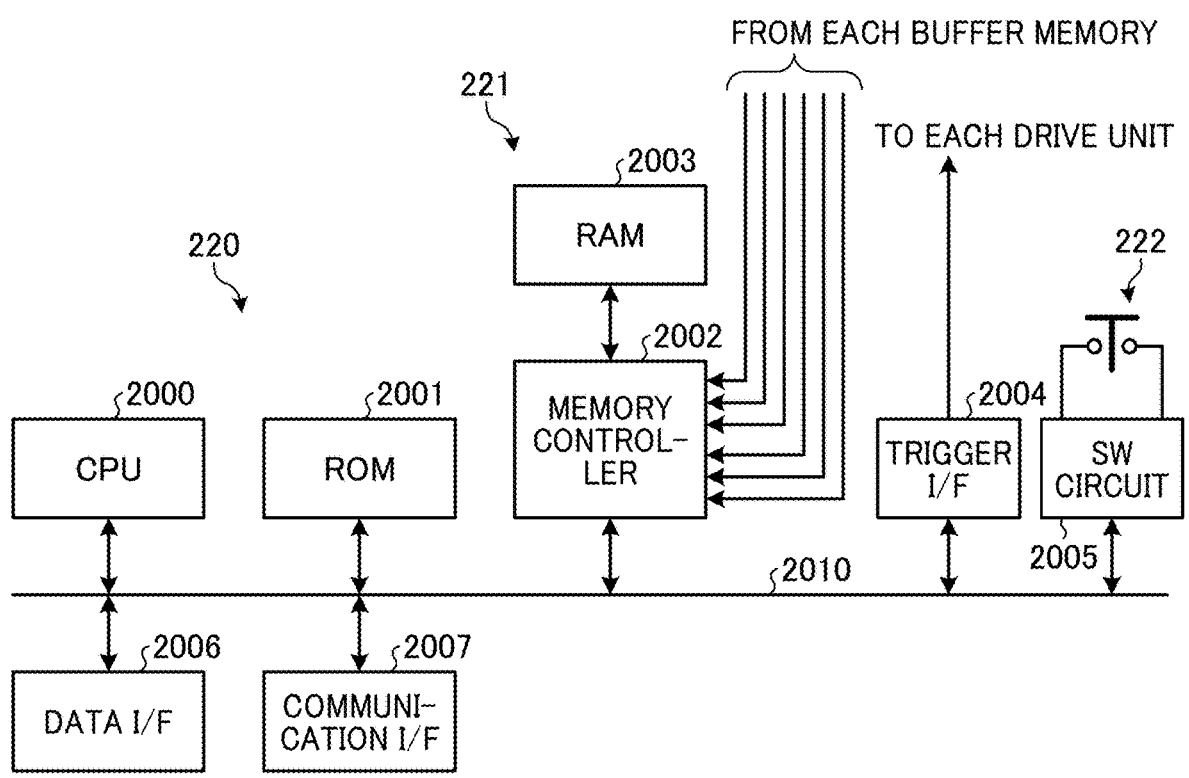
FIG. 43 is an example of a hardware block diagram of a control unit and a memory of an image capture apparatus according to the second embodiment.

FIG. 43 is an example of a hardware block diagram of the control unit 220 and the memory 221 of the image capture apparatus 1b according to the second embodiment. In FIG. 43, the same reference numerals are assigned to the same parts as those in FIG. 4, and detailed descriptions thereof will be omitted.

As illustrated in FIG. 43, the control unit 220 includes, for example, a CPU 2000, a ROM 2001, a trigger I/F 2004, a switch (SW) circuit 2005, a data I/F 2006, and a communication I/F 2007, which are communicatively connected to a bus 2010. The memory 221 includes, for example, a RAM 2003 and a memory controller 2002, and the memory controller 2002 is connected to the bus 2010. The battery 2020 supplies power to the CPU 2000, the ROM 2001, the memory controller 2002, the RAM 2003, the trigger I/F 2004, the switch circuit 2005, the data I/F 2006, the communication I/F 2007, and the bus 2010, respectively.

The memory controller 2002 controls data storage and reading to and from the RAM 2003 in accordance with instruction of the CPU 2000. In accordance with the instruction of the CPU 2000, the memory controller 2002 also controls reading of the captured image from each of the buffer memories 211a-1, 211a-2, . . . , 211a-5, and each of the buffer memories 211b-1, 211b-2, . . . , 211b-5.

The switch circuit 2005 detects a transition of the switch 222 between the closed state and the open state and transfers a detection result to the CPU 2000. When the CPU 2000 receives the detection result indicating that the switch 222 has transitioned from the open state to the closed state from the switch circuit 2005, the CPU 2000 outputs trigger signals. The trigger signals are output via the trigger I/F 2004, and supplied to each of the drive units 210*a*-1, 210*a*-2, . . . , and 210*a*-5, and each of the drive units 210*b*-1, 210*b*-2, . . . , and 210*b*-5.

The CPU 2000 outputs the trigger signals in accordance with the detection result of the switch circuit 2005, but not limited thereto. For example, the CPU 2000 can be configured to output the trigger signals in accordance with a signal supplied via the data I/F 2006 and the communication I/F 2007. Further, the trigger I/F 2004 can be configured to generate the trigger signals in accordance with the detection result of the switch circuit 2005, and supplies the trigger signals to each of the drive units 210*a*-1, 210*a*-2, . . . , and 210*a*-5, and each of the drive units 210*b*-1, 210*b*-2, . . . , 210*b*-5.

In this configuration, when the control unit 220 detects a transition of the switch 222 from the open state to the closed state, the control unit 220 generates and outputs the trigger signals. Then, the trigger signals are supplied at the same timing to each of the drive units 210*a*-1, 210*a*-2, . . . , 210*a*-5, and each of the drive units 210*b*-1, 210*b*-2, . . . , 210*b*-5. By synchronizing with the supplied trigger signals, each of the drive units 210*a*-1, 210*a*-2, 210*a*-5, and each of the drive units 210*b*-1, 210*b*-2, . . . , 210*b*-5 receives electric charges from each of the image capture elements 200*a*-1, 200*a*-2, . . . , and 200*a*-5 and each of the image capture elements 200*b*-1, 200*b*-2, . . . , and 200*b*-5, respectively.

Then, each of the drive units 210*a*-1, 210*a*-2, . . . , 210*a*-5, and each of the drive units 210*b*-1, 210*b*-2, . . . , 210*b*-5, respectively, converts the electric charges received from each of the image capture elements 200*a*-1, 210*a*-2, . . . , 210*a*-5, and each of the image capture elements 200*b*-1, 210*b*-2, . . . , 210*b*-5 into the captured image data, and stores each of the captured image data in each of the buffer memories 211*a*-1, 211*a*-2, . . . , 211*a*-5, and each of the buffer memories 211*b*-1, 211*b*-2, . . . , 211*b*-5, respectively.

At a given timing after outputting the trigger signals, the control unit 220 instructs the memory 221 to read the captured image data from each of the buffer memories 211*a*-1, 211*a*-2, . . . , 211*a*-5, and each of the buffer memories 211*b*-1, 211*b*-2, . . . , 211*b*-5. In accordance with this instruction, in the memory 221, the memory controller 2002 reads each of the captured image data from each of the buffer memories 211*a*-1, 211*a*-2, . . . , 211*a*-5, and each of the buffer memories 211*b*-1, 211*b*-2, . . . , 211*b*-5, and stores each of the captured image data in a given area of the RAM 2003.

If the information processing apparatus 100*b* is connected to the image capture apparatus 1*b* via, for example, the data I/F 2006, the information processing apparatus 100*b* requests the reading of each of the captured image data (e.g., hemispherical image) stored in the RAM 2003 to the image capture apparatus 1*b* via the data I/F 2006. In response to this request, the CPU 2000 of the image capture apparatus 1*b* instructs the memory controller 2002 to read each of the captured image data from the RAM 2003. In response to this instruction, the memory controller 2002 reads each of the captured image data from the RAM 2003 and transmits each of the captured image data to the information processing apparatus 100*b* via the data I/F 2006. Then, the information processing apparatus 100*b* performs the sequence in accordance with flowchart of FIG. 34 based on each of the captured image data transmitted from the image capture apparatus 1*b*.

Similar to the image capture apparatus 1*a* according to the first embodiment described with reference to FIG. 5, in the image capture apparatus 1*b* according to the second embodiment, the battery 2020 and the circuit unit 2030 are provided inside the housing 10*b*. As to the battery 2020 and the circuit unit 2030, at least the battery 2020 is fixed inside the housing 10*b* by fixing means, such as adhesive and a screw. The circuit unit 2030 includes, for example, at least above described each unit, such as the control unit 220 and the memory 221. The control unit 220 and the memory 221 are configured on, for example, one or more circuit boards. In the image capture apparatus 1*b*, the battery 2020 and the circuit unit 2030 are arranged on a portion extended from the imaging lenses 20*a*-1, 20*a*-2, . . . , 20*a*-5 arranged in an aligned manner.

The battery 2020 and the circuit unit 2030 can be arranged at given positions as above described, but not limited thereto. For example, if the circuit unit 2030 is sufficiently small, at least the battery 2020 alone may be disposed at a given position.

By arranging the battery 2020 and the circuit unit 2030 in this manner, the width of the face (front and rear faces) where the imaging lenses 20*a*-1, 20*a*-2, . . . , 20*a*-5 (and imaging lenses 20*b*-1, 20*b*-2, . . . , 20*b*-5) of the image capture apparatus 1*b* are disposed can be reduced. As a result, it is possible to reduce an inclusion of an image of a portion of the housing 10*b* of the image capture apparatus 1*b* in each of the image data captured by each of the image capture units 21-1 to 21-5, with which the disparity can be calculated with higher accuracy. For the same reason, it is preferable to set the width of the housing 10*b* of the image capture apparatus 1*b* smaller as much as possible. This is the same for the image capture apparatus 1*a* according to the first embodiment:

Annotation Input Method of Second Embodiment:

Hereinafter, a description is given of an annotation input method according to the second embodiment. As described above, in the information processing apparatus 100*b*, the UI unit 113 displays a screen used for inputting the annotation using the full view spherical image generated from the hemispherical images captured, for example, by one image capture unit (e.g., image capture unit 21-1) among the five image capture units 21-1 to 21-5 of the image capture apparatus 1*b*. That is, the UI unit 113 cuts an image of a part of the full view spherical image and displays the cut-out image on the screen 500, for example, as the partial image 5010 as illustrated in FIG. 20.

In this case, the UI unit 113 acquires the three-dimensional point group information generated in accordance with flowchart of FIG. 34 from the 3D information generation unit 120. The UI unit 113 can switch the display of the screen 500 between the partial image 5010 and the three-dimensional point group information, for example, in accordance with an operation on the menu button 5050. The UI unit 113 displays each point included in the three-dimensional point group information using different colors, for example, in accordance with the distance of each point.

Further, in the second embodiment, the annotation input process is performed in accordance with flowchart of FIG. 16 described above. The position designation in step S103 in the flowchart of FIG. 16 is performed using three-dimensional coordinates based on the three-dimensional point group information.

Figure 44A:
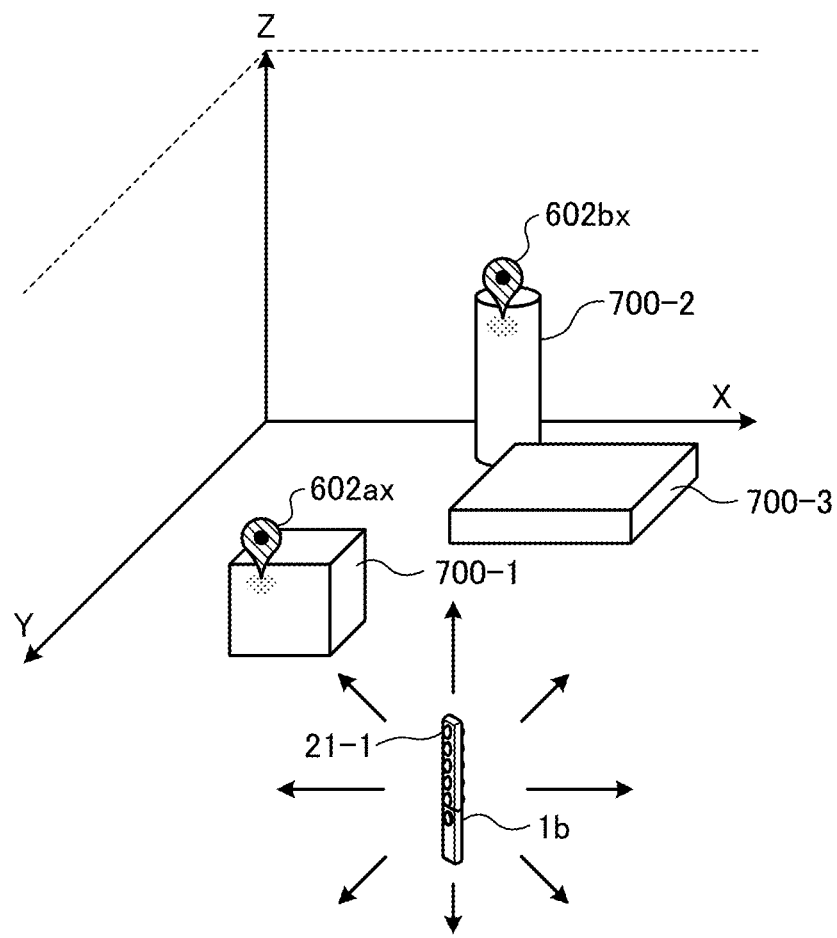
FIGS. 44A and 44B (FIG. 44) is an example of a diagram for describing a position designation according to the second embodiment.
Figure 44B:
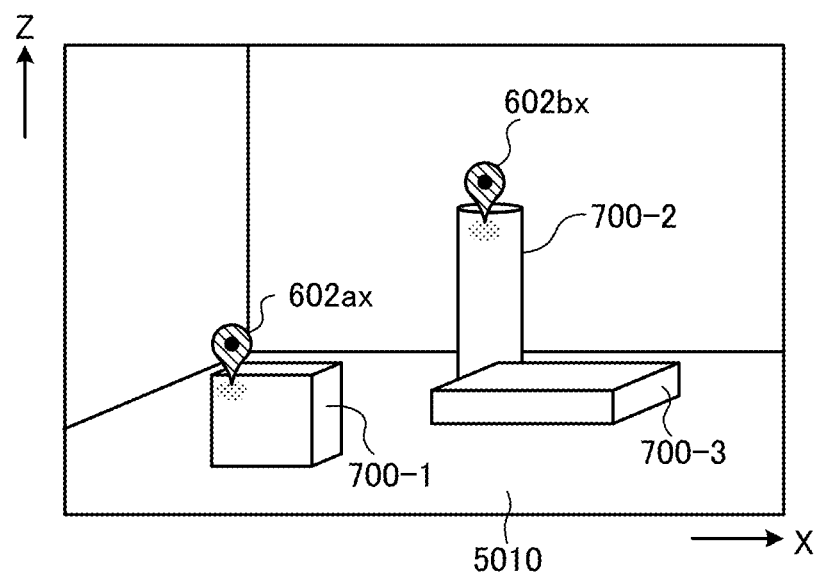

FIGS. 44A and 44B (FIG. 44) is an example of a diagram for describing a position designation according to the second embodiment. As illustrated in FIG. 44A, it is assumed that objects 700-1, 700-2, and 700-3 having three-dimensional structure are arranged in a three-dimensional space represented by the X-axis, the Y-axis, and the Z-axis, which are orthogonal to each other, and then the image capture apparatus 1*b* performs the image capture operation of the objects 700-1, 700-2, and 700-3. The three-dimensional point group information generated from the full view spherical image acquired by the image capture operation of the image capture apparatus 1b includes, for example, three-dimensional information at each point on a face of each of the objects 700-1, 700-2, and 700-3 facing the image capture position.

FIG. 44B is an example of the partial image 5010 cut from the full view spherical image captured by the image capture unit 21-1 of the image capture apparatus 1b in a condition of FIG. 44A. The UI 13 displays the partial image 5010 illustrated in FIG. 44B on the screen 500. Then, it is assumed that a user designates positions of points on the objects 700-1 and 700-2 using, for example, markers 602ax and 602bx on the partial image 5010 illustrated in FIG. 44B.

In the second embodiment, the three-dimensional point group information of the space including the objects 700-1 to 700-3, captured by the image capture apparatus 1b, can be acquired. Therefore, the position designation is performed at the positions indicated by the three-dimensional coordinates of each of the objects 700-1 and 700-2, as indicated by the markers 602ax and 602bx in FIG. 44A.

Further, when the position designation is performed by using the three-dimensional coordinates based on the three-dimensional point group information, it is possible to calculate a length of line or an area of polygon, for example, when the position is designated by the line or the polygon, as above described in the variant example according to the first embodiment.

Figure 45:
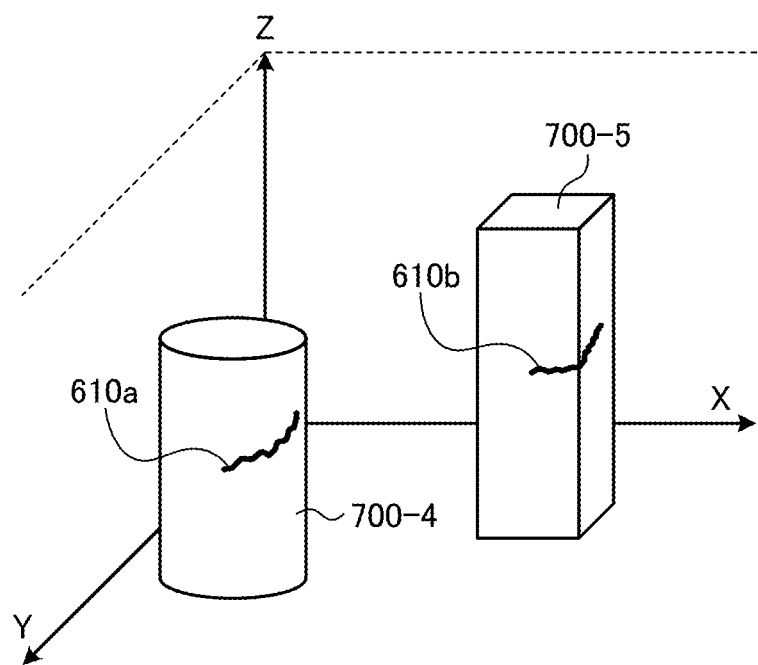
FIG. 45 is an example of a diagram for describing a position designation using a line.

FIG. 45 is an example of a diagram for describing a position designation using a line according to the second embodiment. Similar to FIG. 44A, in FIG. 45, objects 700-4 and 700-5 having three dimensional structure are arranged in a three-dimensional space represented by the X-axis, the Y-axis, and the Z-axis, which are orthogonal to each other. Further, a crack 610a is observed on a column face of the object 700-4 having a cylindrical shape, in which the crack 610a extends along a circumferential direction of the column face. Further, a crack 610b is observed across two side faces of the object 700-5 having a rectangular parallelepiped shape (square column).

It is difficult to calculate the length of crack 610a and the length of crack 610b having the depth from the two-dimensional captured image. For example, as to the crack 610 included in the partial image 5010 illustrated in FIG. 26 in the first embodiment, the length of crack 610 can be measured if the wall surface where the crack 610 exists is parallel to the face of the partial image 5010. By contrast, in the second embodiment, since the three-dimensional point group information of the objects 700-4 and 700-5 can be obtained, the length of the cracks 610a and 610b having the depth information can be easily calculated. This is the same for the calculation of the area of the polygon, the perimeter of the polygon, and the like.

As to the above described embodiments, a task of associating information of a target and position information of the target on an image can be easily performed.

Numerous additional modifications and variations are possible in light of the above teachings. It is therefore to be understood that, within the scope of the appended claims, the disclosure of this patent specification can be practiced otherwise than as specifically described herein. Any one of the above-described operations may be performed in various other ways, for example, in an order different from the one described above.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An input apparatus for inputting a diagnosis result of a diagnosis target detectable for a structure, comprising:
   circuitry configured to
   display a spherical image captured for the structure on a screen;
   receive an input of a position of the diagnosis target in the spherical image;
   store position information indicating the received position of the diagnosis target in the spherical image in a memory;
   display, on the screen, the spherical image and a diagnosis information input field used for inputting diagnosis information of the diagnosis target;
   receive an input of the diagnosis information of the diagnosis target, input via the diagnosis information input field; and
   store the diagnosis information and the position information indicating the received position of the diagnosis target in the spherical image, in the memory in association with each other.

2. The input apparatus according to claim 1,
   wherein the circuitry superimposes, on the spherical image, an image indicating the diagnosis target in accordance with the position information.

3. The input apparatus according to claim 1,
   wherein the circuitry receives an input of a diagnosis region including the diagnosis target on the spherical image, and stores the position information corresponding to the received diagnosis region and the diagnosis information of the diagnosis target in the memory in association with each other.

4. The input apparatus according to claim 3,
   wherein the circuitry displays an image in the diagnosis region on the spherical image, in the diagnosis information input field.

5. The input apparatus according to claim 1,
   wherein the circuitry displays an image different from the spherical image in the diagnosis information input field.

6. The input apparatus according to claim 1,
   wherein the circuitry displays the diagnosis information input field by superimposing the diagnosis information input field on a part of the spherical image.

7. The input apparatus according to claim 1,
   wherein when the circuitry receives an input of a group of positions including a plurality of positions defining the diagnosis target in the spherical image, the circuitry stores position information indicating the received group of positions in the memory.

8. The input apparatus according to claim 1,
   wherein the circuitry displays a drawing indicating a configuration of the structure and the spherical image on one screen.

9. The input apparatus according to claim 1,
   wherein the spherical image is a three-dimensional image having three-dimensional information, and the circuitry receives the input of the position having three-dimensional information indicating the diagnosis target.

10. A method of inputting a diagnosis result of a diagnosis target detectable for a structure, the method comprising:

- displaying a spherical image captured for the structure on a screen;
- receiving an input of a position of the diagnosis target in the spherical image;
- storing position information indicating the received position in a memory;
- displaying, on the screen, the spherical image and a diagnosis information input field used for inputting diagnosis information of the diagnosis target;
- receiving an input of the diagnosis information of the diagnosis target, input via the diagnosis information input field; and
- storing the diagnosis information and the position information in the memory in association with each other.

11. An output apparatus for outputting a diagnosis result of a diagnosis target detectable for a structure, comprising:

circuitry configured to

- acquire position information indicating a position of the diagnosis target in a spherical image, captured for the structure, and diagnosis information including a diagnosis result of the diagnosis target stored in a memory in association with each other, from the memory; and
- output the acquired diagnosis information of the diagnosis target based on the position information associated with the diagnosis information.

12. The output apparatus according to claim 11,

- wherein the memory stores an image based on the spherical image in association with the position information,
- wherein the circuitry acquires the image based on the spherical image from the memory, and outputs the acquired image together with the diagnosis information based on the position information.

13. The output apparatus according to claim 11,

- wherein the circuitry acquires the spherical image, and displays, on a screen, the spherical image together with information indicating the diagnosis information associated with the position information on the spherical image, by superimposing the information indicating the diagnosis information at a position indicated by the position information on the spherical image.

14. The output apparatus according to claim 11,

- wherein the circuitry receives an input of designating information indicating the diagnosis information to be superimposed and displayed on the spherical image, and outputs the diagnosis information designated by the input received by the circuitry.

* * * * *